US008839411B2

(12) United States Patent
Levien et al.

(10) Patent No.: US 8,839,411 B2
(45) Date of Patent: *Sep. 16, 2014

(54) PROVIDING PARTICULAR LEVEL OF ACCESS TO ONE OR MORE ITEMS IN RESPONSE TO DETERMINING PRIMARY CONTROL OF A COMPUTING DEVICE

(75) Inventors: Royce A. Levien, Lexington, MA (US); Richard T. Lord, Tacoma, WA (US); Robert W. Lord, Seattle, WA (US); Mark A. Malamud, Seattle, WA (US); John D. Rinaldo, Jr., Bellevue, WA (US); Clarence T. Tegreene, Bellevue, WA (US)

(73) Assignee: Elwha LLC, Bellevue, WA (US)

(*) Notice: Subject to any disclaimer, the term of this patent is extended or adjusted under 35 U.S.C. 154(b) by 118 days.

This patent is subject to a terminal disclaimer.

(21) Appl. No.: 13/135,392

(22) Filed: Jun. 30, 2011

(65) Prior Publication Data
US 2012/0254986 A1 Oct. 4, 2012

Related U.S. Application Data

(63) Continuation of application No. 13/135,314, filed on Jun. 29, 2011, and a continuation-in-part of application No. 13/065,885, filed on Mar. 30, 2011, and a continuation-in-part of application No. 13/065,964, filed on Mar. 31, 2011, and a continuation-in-part of application No. 13/066,848, filed on Apr. 25, 2011, now Pat. No. 8,402,535, and a continuation-in-part of application No. 13/066,917, filed on Apr. 26, 2011, now Pat. No. 8,347,399.

(51) Int. Cl.
G06F 7/04 (2006.01)
G06F 21/84 (2013.01)
G06F 21/31 (2013.01)
G06F 21/62 (2013.01)

(52) U.S. Cl.
CPC .............. G06F 21/31 (2013.01); G06F 21/84 (2013.01); G06F 21/6218 (2013.01); G06F 2221/2113 (2013.01)
USPC ................................. 726/17; 726/27; 726/28

(58) Field of Classification Search
USPC .......... 726/5, 7, 17, 22, 26, 28; 713/186, 189, 713/323
See application file for complete search history.

(56) References Cited

U.S. PATENT DOCUMENTS 6,002,427 A 12/1999 Kipust
6,961,912 B2 11/2005 Aoki et al.
(Continued)

OTHER PUBLICATIONS

U.S. Appl. No. 13/374,479, Levien et al.
(Continued)

Primary Examiner — Farid Homayounmehr
Assistant Examiner — Suman Debnath

(57) ABSTRACT

A computationally implemented system and method that is designed to, but is not limited to: determining which of a plurality of users detected in proximate vicinity of a computing device has primary control of the computing device; and providing a particular level of access, via the computing device, to one or more items, the particular level of access to be provided to the one or more items being in response, at least in part, to said determining. In addition to the foregoing, other method aspects are described in the claims, drawings, and text forming a part of the present disclosure.

49 Claims, 25 Drawing Sheets

(56) References Cited

U.S. PATENT DOCUMENTS

| | | | |
|---|---|---|---|
| 7,190,351 B1 | 3/2007 | Goren | |
| 7,200,248 B2 | 4/2007 | Horiguchi | |
| 7,260,726 B1 | 8/2007 | Doe et al. | |
| 7,437,765 B2 * | 10/2008 | Elms et al. | 726/26 |
| 7,649,444 B1 | 1/2010 | Fear et al. | |
| 7,774,486 B2 | 8/2010 | Clarke | |
| 7,868,778 B2 | 1/2011 | Kenwright | |
| 8,279,242 B2 | 10/2012 | Bentley | |
| 8,289,130 B2 | 10/2012 | Nakajima et al. | |
| 8,406,162 B2 | 3/2013 | Haupt et al. | |
| 2002/0176603 A1 | 11/2002 | Bauer et al. | |
| 2003/0016253 A1 | 1/2003 | Aoki et al. | |
| 2003/0107584 A1 | 6/2003 | Clapper | |
| 2005/0039027 A1 | 2/2005 | Shapiro | |
| 2005/0149726 A1 | 7/2005 | Joshi et al. | |
| 2006/0052132 A1 | 3/2006 | Naukkarinen et al. | |
| 2006/0277474 A1 | 12/2006 | Robarts et al. | |
| 2007/0005616 A1 | 1/2007 | Hay et al. | |
| 2007/0030824 A1 | 2/2007 | Ribaudo et al. | |
| 2007/0042714 A1 | 2/2007 | Ayed | |
| 2007/0052672 A1 | 3/2007 | Ritter et al. | |
| 2007/0118604 A1 | 5/2007 | Costa Requena | |
| 2007/0150827 A1 | 6/2007 | Singh et al. | |
| 2007/0162574 A1 | 7/2007 | Williamson et al. | |
| 2007/0174633 A1 | 7/2007 | Draper et al. | |
| 2007/0234209 A1 | 10/2007 | Williams | |
| 2007/0247425 A1 | 10/2007 | Liberty et al. | |
| 2008/0159496 A1 * | 7/2008 | Brown | 379/93.03 |
| 2008/0201783 A1 | 8/2008 | Tamai | |
| 2008/0233996 A1 | 9/2008 | Ogasawara et al. | |
| 2008/0266089 A1 | 10/2008 | Haren et al. | |
| 2008/0271109 A1 | 10/2008 | Singh et al. | |
| 2009/0005079 A1 | 1/2009 | Shields et al. | |
| 2009/0006962 A1 | 1/2009 | Ives et al. | |
| 2009/0015425 A1 | 1/2009 | Palmqvist et al. | |
| 2009/0179765 A1 | 7/2009 | Nymark et al. | |
| 2009/0210932 A1 | 8/2009 | Balakrishnan et al. | |
| 2009/0239587 A1 | 9/2009 | Negron et al. | |
| 2009/0240569 A1 | 9/2009 | Ramer et al. | |
| 2009/0253410 A1 | 10/2009 | Fitzgerald et al. | |
| 2009/0292930 A1 | 11/2009 | Marano et al. | |
| 2009/0297064 A1 | 12/2009 | Koziol et al. | |
| 2010/0053322 A1 | 3/2010 | Marti et al. | |
| 2010/0124363 A1 | 5/2010 | Ek et al. | |
| 2010/0157135 A1 | 6/2010 | Dossaji et al. | |
| 2010/0167783 A1 | 7/2010 | Alameh et al. | |
| 2010/0180210 A1 | 7/2010 | Toyama et al. | |
| 2010/0222141 A1 | 9/2010 | LaSalvia et al. | |
| 2010/0235667 A1 | 9/2010 | Mucignat et al. | |
| 2011/0025842 A1 | 2/2011 | King et al. | |
| 2011/0069940 A1 | 3/2011 | Shimy et al. | |
| 2011/0072452 A1 | 3/2011 | Shimy et al. | |
| 2011/0083109 A1 | 4/2011 | Hildebrandt et al. | |
| 2011/0093806 A1 | 4/2011 | Cohen et al. | |
| 2011/0107427 A1 | 5/2011 | Cohen et al. | |
| 2011/0110557 A1 | 5/2011 | Clark et al. | |
| 2011/0133908 A1 | 6/2011 | Leung | |
| 2011/0141011 A1 | 6/2011 | Lashina et al. | |
| 2011/0166972 A1 | 7/2011 | Cohen et al. | |
| 2011/0197121 A1 | 8/2011 | Kletter | |
| 2011/0202269 A1 | 8/2011 | Reventlow | |
| 2011/0227856 A1 | 9/2011 | Corroy et al. | |
| 2011/0231911 A1 | 9/2011 | White et al. | |
| 2011/0265179 A1 | 10/2011 | Newman et al. | |
| 2011/0317872 A1 | 12/2011 | Free | |
| 2011/0321143 A1 | 12/2011 | Angaluri et al. | |
| 2012/0017147 A1 | 1/2012 | Mark | |
| 2012/0028625 A1 | 2/2012 | Konig | |
| 2012/0062729 A1 | 3/2012 | Hart et al. | |
| 2012/0081392 A1 | 4/2012 | Arthur | |
| 2012/0088543 A1 | 4/2012 | Lindner et al. | |
| 2012/0108215 A1 | 5/2012 | Kameli | |
| 2012/0151339 A1 | 6/2012 | Zhang et al. | |
| 2012/0166966 A1 | 6/2012 | Wood et al. | |
| 2012/0191764 A1 | 7/2012 | Leibu et al. | |
| 2012/0235790 A1 | 9/2012 | Zhao et al. | |
| 2012/0256967 A1 | 10/2012 | Baldwin et al. | |
| 2012/0293528 A1 | 11/2012 | Larsen | |
| 2012/0311438 A1 | 12/2012 | Cranfill et al. | |
| 2012/0330660 A1 | 12/2012 | Jaiswal | |
| 2013/0065608 A1 | 3/2013 | Nakajima et al. | |
| 2013/0159939 A1 | 6/2013 | Krishnamurthi | |

OTHER PUBLICATIONS

U.S. Appl. No. 13/374,352, Levien et al.
U.S. Appl. No. 13/374,213, Levien et al.
U.S. Appl. No. 13/374,083, Levien et al.
U.S. Appl. No. 13/373,796, Levien et al.
U.S. Appl. No. 13/373,679, Levien et al.
U.S. Appl. No. 13/317,832, Levien et al.
U.S. Appl. No. 13/317,827, Levien et al.
U.S. Appl. No. 13/200,800, Levien et al.
U.S. Appl. No. 13/200,743, Levien et al.
U.S. Appl. No. 13/199,286, Levien et al.
U.S. Appl. No. 13/199,237, Levien et al.
U.S. Appl. No. 13/135,314, Levien et al.
U.S. Appl. No. 13/066,917, Levien et al.
U.S. Appl. No. 13/066,848, Levien et al.
U.S. Appl. No. 13/065,964, Levien et al.
U.S. Appl. No. 13/065,885, Levien et al.
"Computer Detecting User Presence Video Mockup [Ubuntu]"; Web Upd8.org; Bearing a date of Sep. 14, 2010; pp. 1-11; located at: http://www.webupd8.org/2010/09/computer-detecting-user-presence-video.html; printed on Mar. 30, 2011.
"How do I detect when a user is sitting in the chair in front of a computer?": Superuser.com; Bearing a date of Aug. 11, 2009; 5 Total pages; located at : http://superuser.com/questions/21364/how-do-i-detect-when-a-user-is-sitting-in-the-chair-in-front-of-a-computer.
Pike, John; "Homeland Security: Biometrics": GlobalSecurity.org; Bearing a date of Mar. 9, 2007; 4 Total pages; located at: http://www.globalsecurity.org/security/systems/biometrics.html
Hughes, Neil; "Apple Exploring Face Detection to Unlock, Customize & Interact with iOS Devices"; bearing a date of Apr. 5, 2012; pp. 1-4; AppleInsider; http://www.appleinsider.com/articles/12/04/05/apple_exploring_face_detection_to_unlock_customize_interact_with_ios_devices.html.
Kernchen et al.; "Multimodal user interfaces for context-aware mobile applications"; IEEE 16th International Symposium on Personal, Indoor and Mobile Radio Communications; bearing a date of Mar. 20, 2005; pp. 2268-2273; #1568961325; IEEE.
Noll et al.; "Integrating Mobile Devices into Semantic Services Environments"; The Fourth International Conference on Wireless and Mobile Communications; bearing a date of Mar. 4, 2008; pp. 137-143; IEEE Computer Society.

* cited by examiner

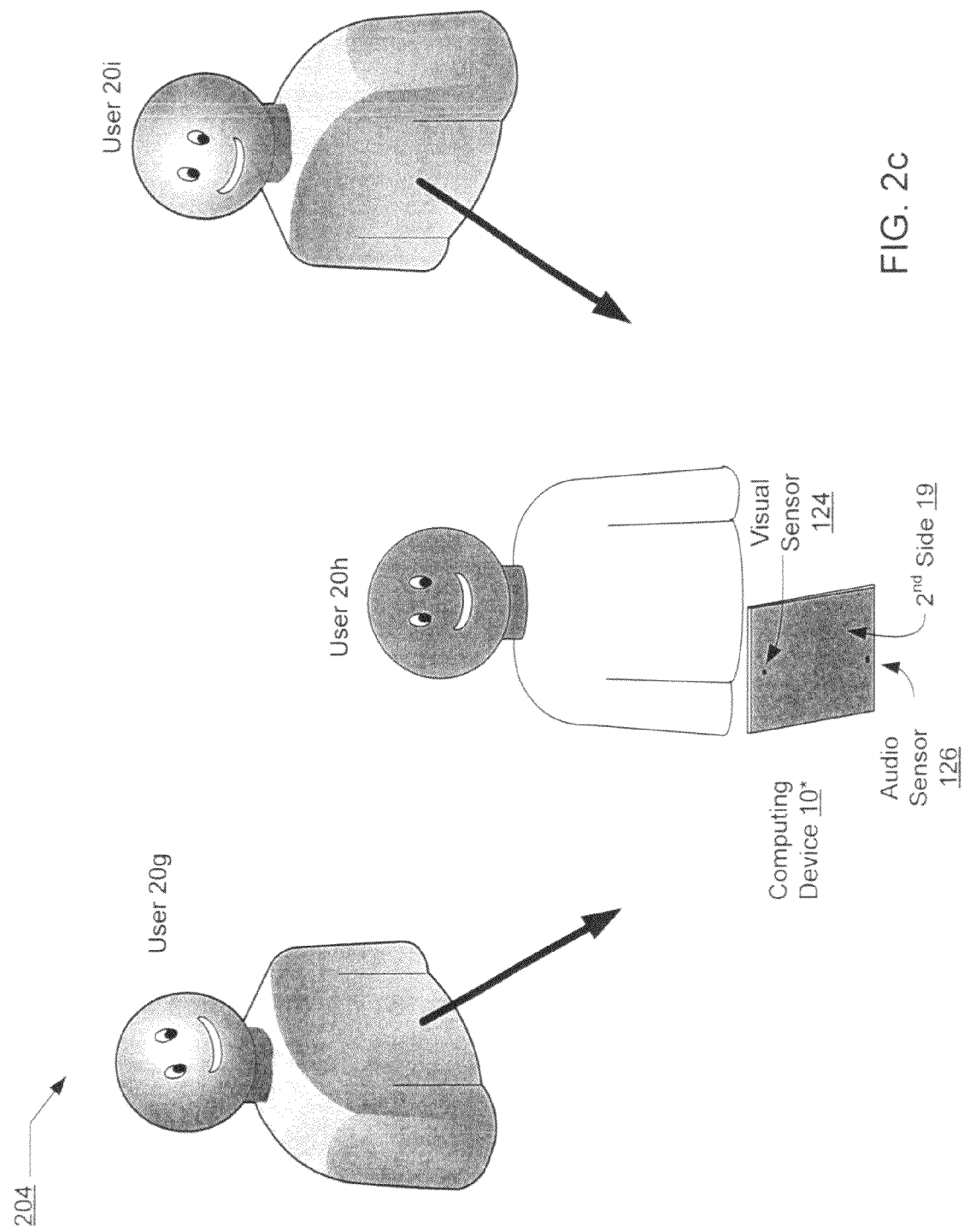

**104\* Access Providing Module**

- 230 Viewing Access Providing Module
  - 232 Visual Hiding Module
    - 234 Visual Representation Replacing Module
  - 236 Visual Representation Providing Module
    - 238 Locum Tenentes Replacing Module

- 240 Audio Access Providing Module
  - 242 Audio Hiding Module
    - 244 Audio Representation Replacing Module
  - 246 Audio Representation Providing Module
    - 248 Locum Tenentes Replacing Module

- 250 Editable Format Presenting Module

- 252 Non-editable Format Presenting Module

- 254 Functional Format Presenting Module

- 256 Entity Affiliation Ascertaining Module

FIG. 3d

PROVIDING PARTICULAR LEVEL OF ACCESS TO ONE OR MORE ITEMS IN RESPONSE TO DETERMINING PRIMARY CONTROL OF A COMPUTING DEVICE

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications, including any priority claims, is incorporated herein by reference to the extent such subject matter is not inconsistent herewith.

For purposes of the USPTO extra-statutory requirements, the present application constitutes a continuation of U.S. patent application Ser. No. 13/135,314, entitled PROVIDING PARTICULAR LEVEL OF ACCESS TO ONE OR MORE ITEMS IN RESPONSE TO DETERMINING PRIMARY CONTROL OF A COMPUTING DEVICE, naming Royce A. Levien; Richard T. Lord; Robert W. Lord; Mark A. Malamud; John D. Rinaldo, Jr.; Clarence T. Tegreene as inventors, filed 29 Jun. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/065,885, entitled ACCESS RESTRICTION IN RESPONSE TO DETERMINING DEVICE TRANSFER, naming Royce A. Levien; Richard T. Lord; Robert W. Lord; Mark A. Malamud; John D. Rinaldo, Jr.; Clarence T. Tegreene as inventors, filed 30 Mar. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/065,964, entitled ACCESS RESTRICTION IN RESPONSE TO DETERMINING DEVICE TRANSFER, naming Royce A. Levien; Richard T. Lord; Robert W. Lord; Mark A. Malamud; John D. Rinaldo, Jr.; Clarence T. Tegreene as inventors, filed 31 Mar. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/066,848, now U.S. Pat. No. 8,402,535 entitled PROVIDING GREATER ACCESS TO ONE OR MORE ITEMS IN RESPONSE TO DETERMINING DEVICE TRANSFER, naming Royce A. Levien; Richard T. Lord; Robert W. Lord; Mark A. Malamud; John D. Rinaldo, Jr.; Clarence T. Tegreene as inventors, filed 25 Apr. 2011, which is currently or is an application of which a currently application is entitled to the benefit of the filing date.

For purposes of the USPTO extra-statutory requirements, the present application constitutes a continuation-in-part of U.S. patent application Ser. No. 13/066,917, now U.S. Pat. No. 8,402,535 entitled PROVIDING GREATER ACCESS TO ONE OR MORE ITEMS IN RESPONSE TO DETERMINING DEVICE TRANSFER, naming Royce A. Levien; Richard T. Lord; Robert W. Lord; Mark A. Malamud; John D. Rinaldo, Jr.; Clarence T. Tegreene as inventors, filed 26 Apr. 2011, which is currently or is an application of which a currently application is entitled to the benefit of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, *Benefit of Prior-Filed Application*, USPTO Official Gazette Mar. 18, 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above, but expressly points out that such designation(s) are not to be construed in any way as any type of commentary and/or admission as to whether or not the present application contains any new matter in addition to the matter of its parent application(s).

SUMMARY

A computationally implemented method includes, but is not limited to determining which of a plurality of users detected in proximate vicinity of a computing device has primary control of the computing device, wherein said determining which of a plurality of users detected in proximate vicinity of a computing device has primary control of the computing device is performed via at least one of a machine, article of manufacture, or composition of matter; and providing a particular level of access, via the computing device, to one or more items, the particular level of access to be provided to the one or more items being in response, at least in part, to said determining. In addition to the foregoing, other method aspects are described in the claims, drawings, and text forming a part of the present disclosure.

In one or more various aspects, related machines, compositions of matter, or manufactures of systems may include, but are not limited to, virtually any combination of hardware, software, and/or firmware configured to effect the herein-referenced method aspects depending upon the design choices of the system designer.

A computationally implemented system includes, but is not limited to: means for determining which of a plurality of users detected in proximate vicinity of a computing device has primary control of the computing device; and means for providing a particular level of access, via the computing device, to one or more items, the particular level of access to be provided to the one or more items being in response, at least in part, to said determining. In addition to the foregoing, other system aspects are described in the claims, drawings, and text forming a part of the present disclosure.

A computationally implemented system includes, but is not limited to: circuitry for determining which of a plurality of users detected in proximate vicinity of a computing device has primary control of the computing device; and circuitry for providing a particular level of access, via the computing device, to one or more items, the particular level of access to be provided to the one or more items being in response, at least in part, to said determining. In addition to the foregoing, other system aspects are described in the claims, drawings, and text forming a part of the present disclosure.

An article of manufacture including a non-transitory signal-bearing storage medium bearing one or more instructions for determining which of a plurality of users detected in proximate vicinity of a computing device has primary control of the computing device; and one or more instructions for providing a particular level of access, via the computing device, to one or more items, the particular level of access to be provided to the one or more items being in response, at least in part, to said determining. In addition to the foregoing, other computer program product aspects are described in the claims, drawings, and text forming a part of the present disclosure.

A method for providing a particular level of access to one or more items via a computing device, the method includes determining which of a plurality of users detected in proximate vicinity of a computing device has primary control of the computing device, wherein said determining which of a plurality of users detected in proximate vicinity of a computing device has primary control of the computing device is performed via at least one of a machine, article of manufacture, or composition of matter; and providing a particular level of access, via the computing device, to one or more items, the particular level of access to be provided to the one or more items being in response, at least in part, to said determining.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 2c shows another exemplary environment 204 in which two users 20g and 20i join a third user 20h in using/accessing the computing device 10* of FIG. 1.

FIG. 3d shows another perspective of the access providing module 104* of FIGS. 3a and 3b.

DETAILED DESCRIPTION

Figure 1:
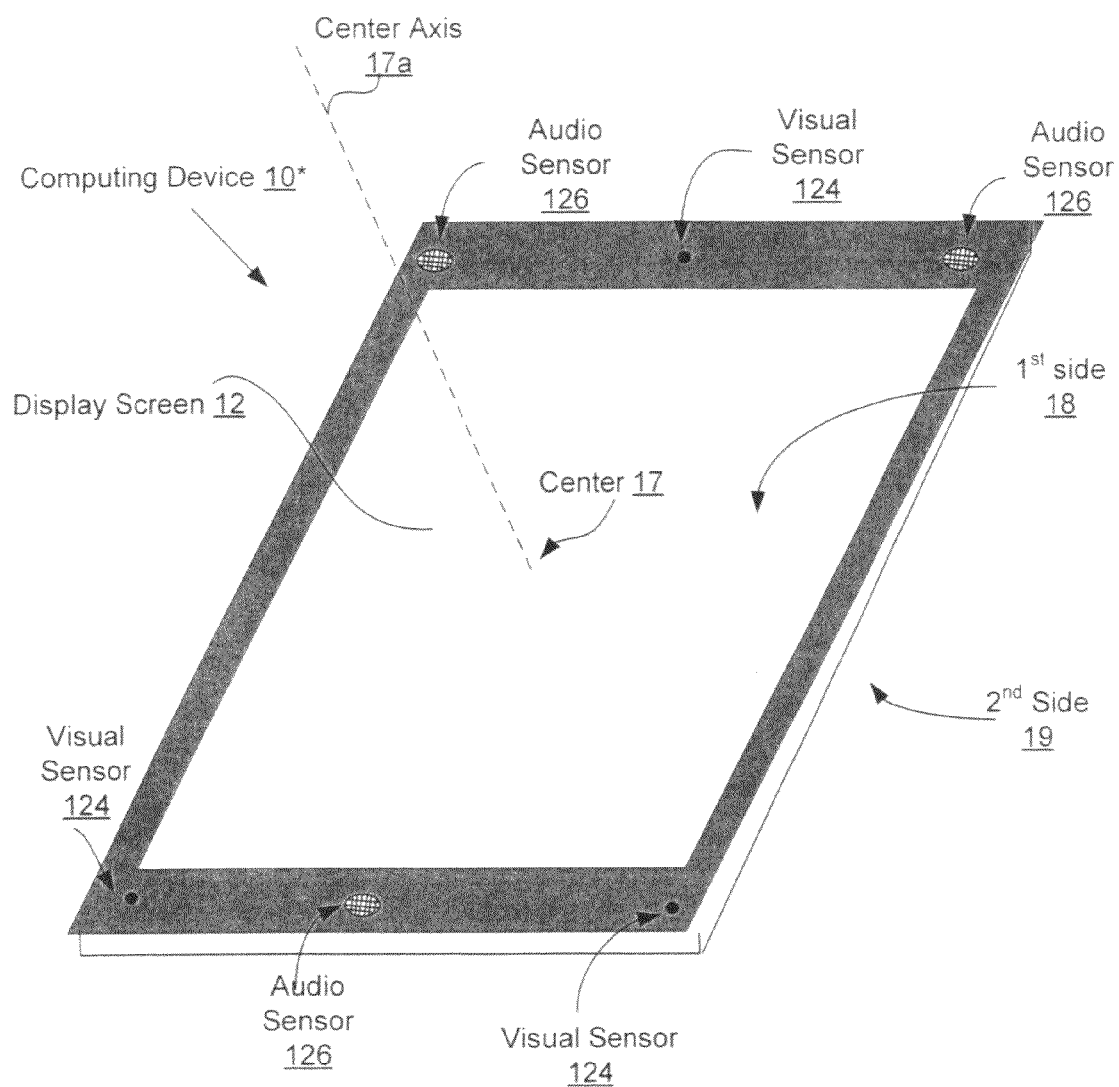
FIG. 1 shows an exemplary computing device 10* in accordance with various embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Advances in computing technologies and related technologies (e.g., visual display technology, battery technology, etc.) in recent years have greatly facilitated in the development of computing devices having increasingly smaller form factors while still maintaining exceptional processing capabilities. Examples of such mobile computing devices include, for example, laptops, Netbooks, tablet computers (i.e., "slate" computers), e-readers, Smartphones, personal digital assistants (PDAs), and so forth. Because of their compactness, such mobile computing devices (herein "computing devices") are becoming much easier to share among a plurality of users. That is, due to their small form factors, such devices allow owners of such devices to physically share such devices with friends, family, co-workers, clients, and so forth.

Unfortunately, when such devices are shared amongst a plurality of users having varying levels of accessing rights to such devices, confidential data/applications that are accessible through such devices may also become available to all of these users. For example, suppose a primary user (e.g., an owner) of a mobile computing device wants to show a particular electronic document being displayed through her computing device to a group of friends by handing-off the computing device to the group of friends. In doing so, the group of friends, in addition to being able to view the electronic document, may also have access to many other things that the primary user may not want the group of friends to have access to. For example, upon handed the computing device, the group of friends may be able to view any confidential documents, images, applications, websites, passwords, and so forth, that may be open or running at the time that the computing device was handed over to the group of friends. Even worse, the group of friends may be able to not just access open applications and content, but may be able to retrieve/use/modify any content (e.g., documents, image files, audio files, etc.) or any applications that may be stored in the computing device.

There are countless other situations, some of which will be described herein, where a mobile computing device (e.g., a tablet computer, an e-reader, a Smartphone, a laptop, and so forth) may be shared between a plurality of users having varying degrees of accessing rights to the device. Such situations could potentially result in comprising the confidentiality/usage of data/applications that may be stored/accessed through such a device.

In accordance with various embodiments, computationally implemented methods, systems, and articles of manufacture are presented that can provide a particular level of access, via a computing device, to one or more items (e.g., electronic documents or files including textual, image, audio or video files, applications, passwords, and so forth) in response, at least in part, to determining which of a plurality of users detected in the proximate vicinity of the computing device has primary control of the computing device. Note that although the "computing device" to be described herein will be described/illustrated as being a tablet computer, in alternative embodiments, a computing device may take on other form factors including a variety of other types of portable/mobile computing devices including, for example, a Smartphone, a laptop computer, a Netbook, an e-reader, a personal digital assistant (PDA), and so forth.

Referring now to FIG. 1 illustrating a computing device 10* in the form of a tablet computer in accordance with various embodiments. For the embodiments, the computing device 10* may have at least a first side 18 that includes a display screen 12 (e.g., a touch screen), and a second side 19 (not visible in FIG. 1 but shown in FIG. 2c) that is opposite of the first side 18. As further illustrated in FIG. 1, the first side 18 of the computing device 10* may include a center 17 (note that in FIG. 1 a center axis 17a has been drawn-in that represents an axis originating from the center 17 of the first side 18 of the computing device 10* and perpendicular to the surface of the display screen 12). In various embodiments, the first side 18 of the computing device 10* may include one or more sensors including one or more visual sensors 124 (e.g., one or more cameras including one or more digital cameras, webcams, infrared cameras, and/or other types of image capturing devices) and/or one or more audio sensors 126 (e.g., one or more microphones). Note that although the first side 18 of the computing device 10* of FIG. 1 is illustrated as having three visual sensors 124 and three audio sensors 126, in alternative embodiments, the first side 18 may include alternative number of visual sensors 124 and/or audio sensors 126 than what is depicted in FIG. 1. Further, and although not shown in FIG. 1, in various embodiments, the second side 19 of the computing device 10* may also include one or more sensors in the form of one or more visual sensors 124 and/or one or more audio sensors 126 (see, for example, FIG. 2c, which shows at least one visual sensor 124 and at least one audio sensor 126 included in the second side 19 of the computing device 10*).

Figure 3A:
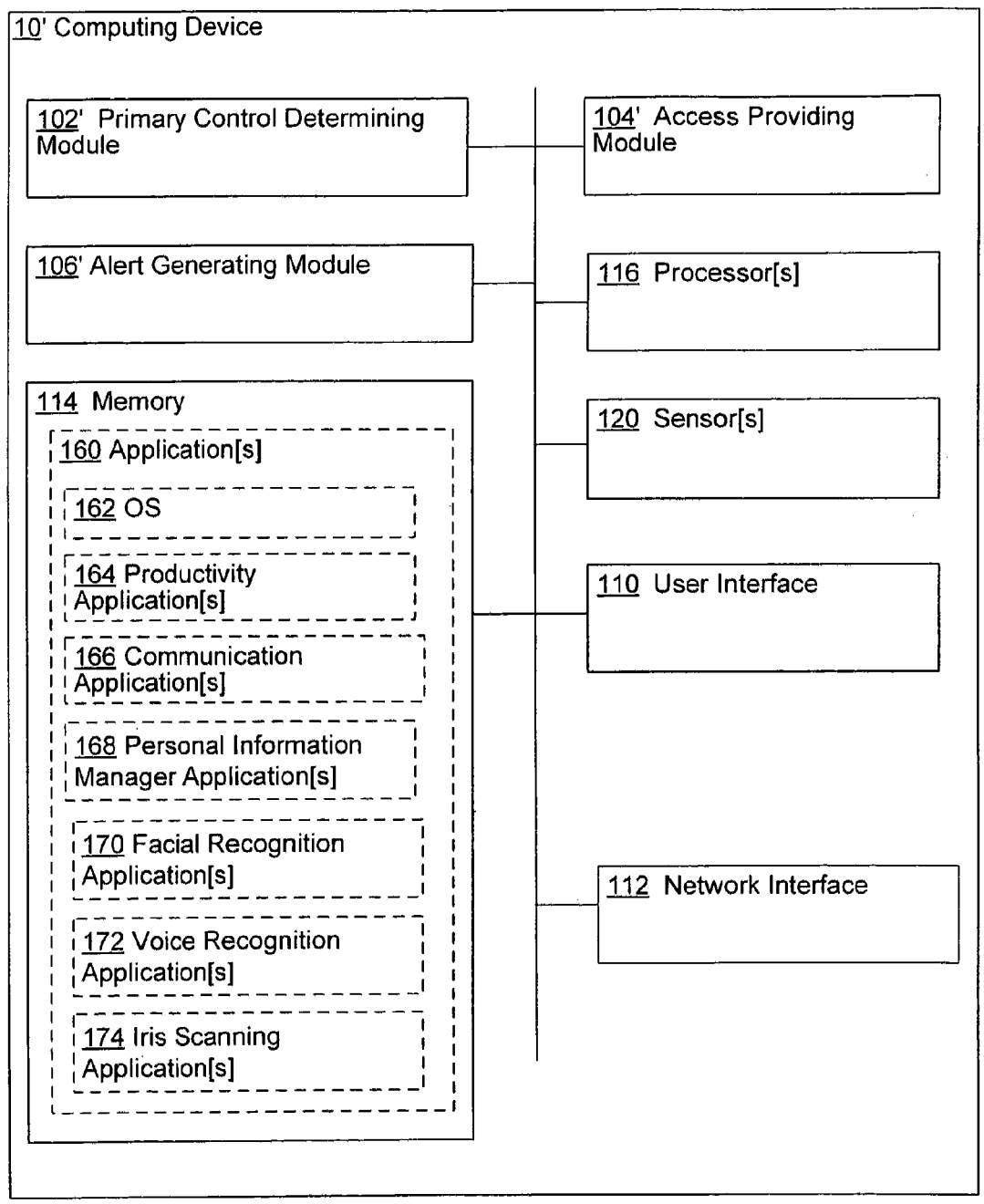
FIG. 3a shows a particular implementation of the computing device 10* of FIG. 1 illustrated as computing device 10'.
Figure 3B:
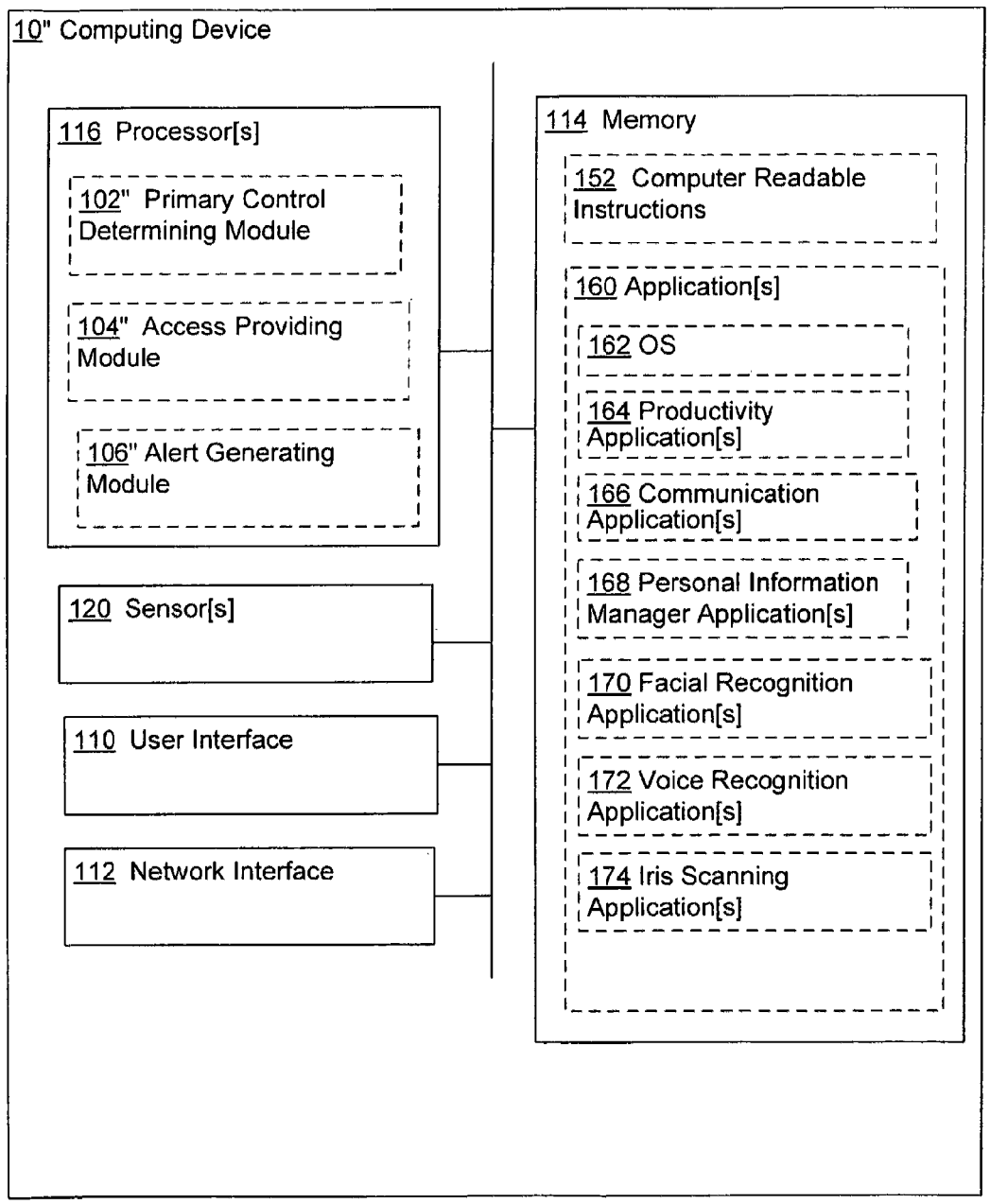
FIG. 3b shows another implementation of the computing device 10* of FIG. 1 illustrated as computing device 10".
Figure 3C:
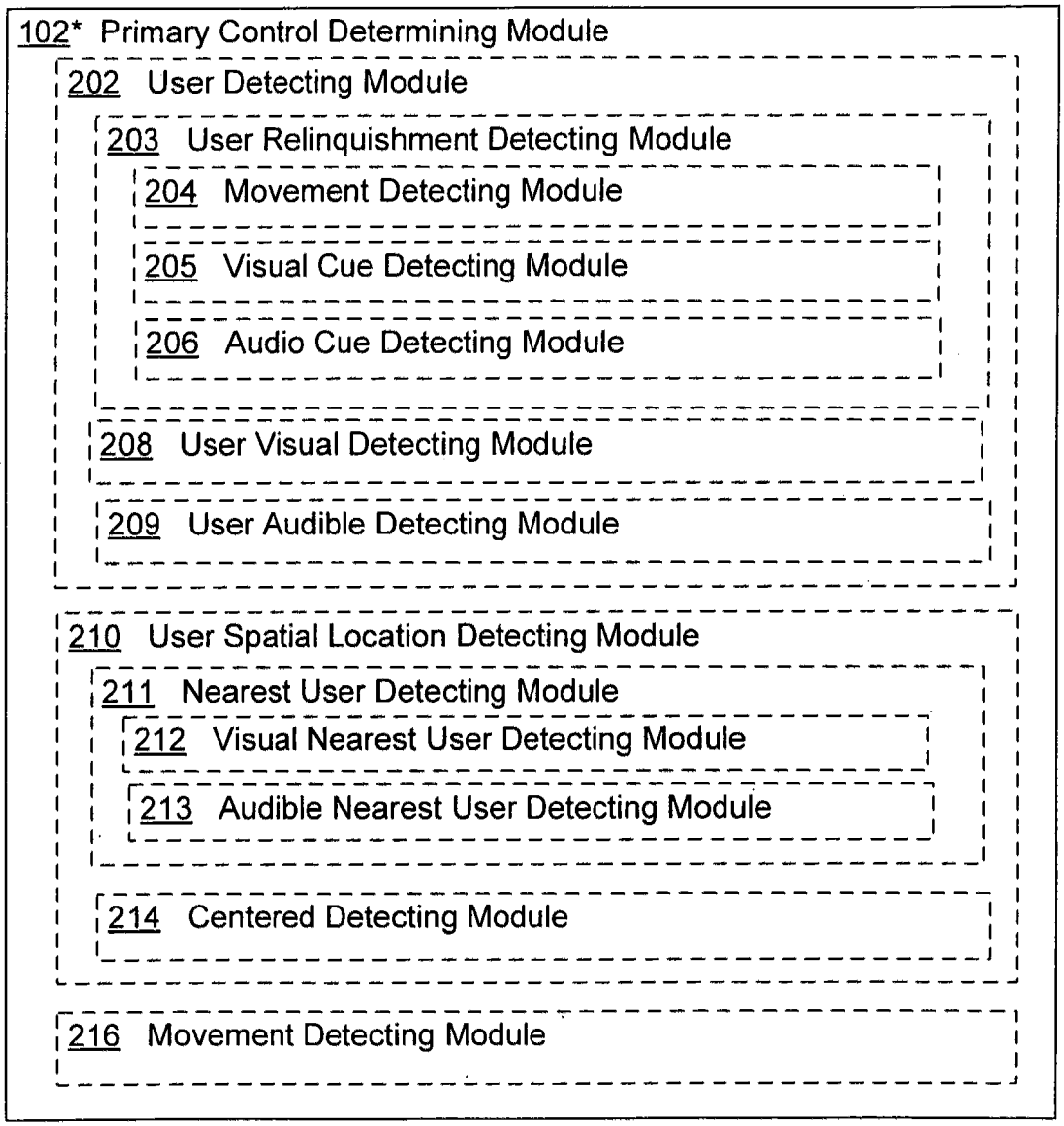
FIG. 3c shows another perspective of the primary control determining module 102* of FIGS. 3a and 3b.
Figure 3E:
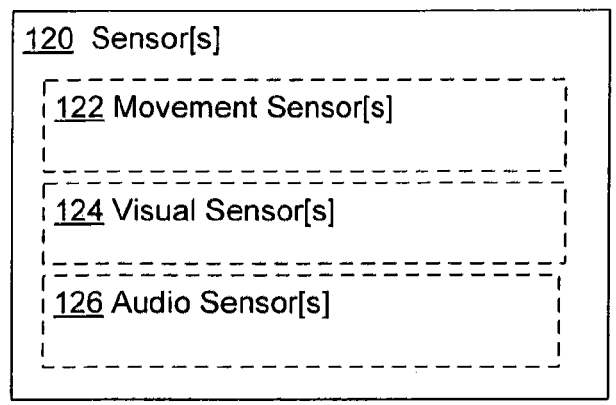
FIG. 3e shows various types of sensors 120 that may comprise the one or more sensors 120 that may be included with the computing device 10* of FIGS. 3a and 3b.

As will be further described herein, in various embodiments, data provided by such sensors (e.g., one or more visual sensors 124 and/or one or more audio sensors 126), as well as, in some cases, data provided by one or more movement sensors 122 that may be included with the computing device 10*(see FIG. 3e illustrating some of the types of sensors 120 that may be included with the computing device 10*), may be used to detect at least the presence of one or more users (e.g., one or more persons) in the proximate vicinity (e.g., immediate surrounding area) of the computing device 10*. Examples of movement sensors 122 include, for example, accelerometers, inertia sensors, gyroscopes, and so forth. In some embodiments, data from such sensors 120 may also be used/analyzed in order to detect the specific spatial locations, relative to the computing device 10*, of those users detected in the proximate vicinity of the computing device 10*. Still further, data from such sensors 120 may be used in some embodiments in order to identify users who have been detected as being in the proximate vicinity of the computing device 10*.

As will be further described herein, the illustrated computing device 10* may employ the computationally implemented methods, systems, and articles of manufacture in accordance with various embodiments for providing a particular level of access to one or more items in response to determining automatically which of a plurality of users detected in the proximate vicinity of the computing device 10* has primary control of the computing device 10*. In particular, the computing device 10* may be endowed with logic that is designed to, among other things, detect the presence of a plurality of users in the proximate vicinity of the computing device 10*, determine which of the plurality of users detected in the proximate vicinity of a computing device 10* has primary control of the computing device 10*, and provide a particular level of access, via the computing device 10*, to one or more items, the particular level of access to be provided to the one or more items being in response, at least in part, to determining which of the plurality of users detected in the proximate vicinity of the computing device 10* has primary control of the computing device 10*. As will be further described herein, in various embodiments, the determination as to which of the plurality of users detected in the proximate vicinity of the computing device 10* has "primary control" of the computing device 10* may be based on data provided by one or more sensors 120 (see FIG. 3e) that may be included with the computing device 10*.

Turning briefly to FIGS. 3a and 3b, FIGS. 3a and 3b are two block diagrams representing two different implementations of the computing device 10* of FIG. 1 illustrated in FIG. 3a as computing device 10' and in FIG. 3b as computing device 10". In particular, and as will be further described herein, FIG. 3a illustrates a computing device 10' that is the "hardwired" or "hard" implementation of the computing device 10* of FIG. 1 in which certain logic modules including a primary control determining module 102', an access providing module 104', and an alert generating module 106' are implemented using purely hardware or circuitry components (e.g., application specific integrated circuit or ASIC). In contrast, FIG. 3b illustrates a computing device 10" that is the "soft" implementation of the computing device 10* of FIG. 1 in which certain logic modules including a primary control determining module 102", an access providing module 104", and an alert generating module 106" are implemented using electronic circuitry such as one or more processors (e.g., microprocessors, controllers, etc.) executing one or more programming instructions (e.g., software).

For purposes of the following, "*" represents a wildcard. Thus, references in the following to "computing device 10*" may be in reference to the computing device 10' of FIG. 3a or to the computing device 10" of FIG. 3b unless indicated otherwise. It should be noted that the two implementations of the computing device 10* of FIG. 1 illustrated in FIGS. 3a and 3b are two extreme or opposite versions/implementations of the computing device 10* of FIG. 1 in which certain logic modules (e.g., the primary control determining module 102*, the access providing module 104*, and the alert generating module 106*) are implemented using purely "hardware solutions" (e.g., implemented using circuitry such as ASIC) as illustrated in FIG. 3a, or using purely "software solutions" (e.g., implemented using software executed by hardware such as one or more processors) as illustrated in FIG. 3b. That is, those having ordinary skill in the art will recognize that the computing device 10* or at least the logic modules (e.g., the primary control determining module 102*, the access providing module 104*, and the alert generating module 106*) illustrated in FIGS. 3a and 3b,3c, and 3d may be implemented using essentially any combination of hardware and software solutions. Since, there are many ways of combining hardware, software, and/or firmware in order to implement the various logic modules (e.g., the primary control determining module 102*, the access providing module 104*, and the alert generating module 106*), only the two extreme implementations illustrated in FIGS. 3a and 3b (e.g., the purely hardware solution as illustrated in FIG. 3a and the software solution of FIG. 3b) are illustrated here. It should be noted here that with respect to the "soft" implementation illustrated in FIG. 3b, hardware such as one or more processors 116 are still needed in order to execute the software. Further details related to the two implementations of computing device 10* illustrated in FIGS. 3a and 3b will be provided in greater detail below.

Figure 2A:
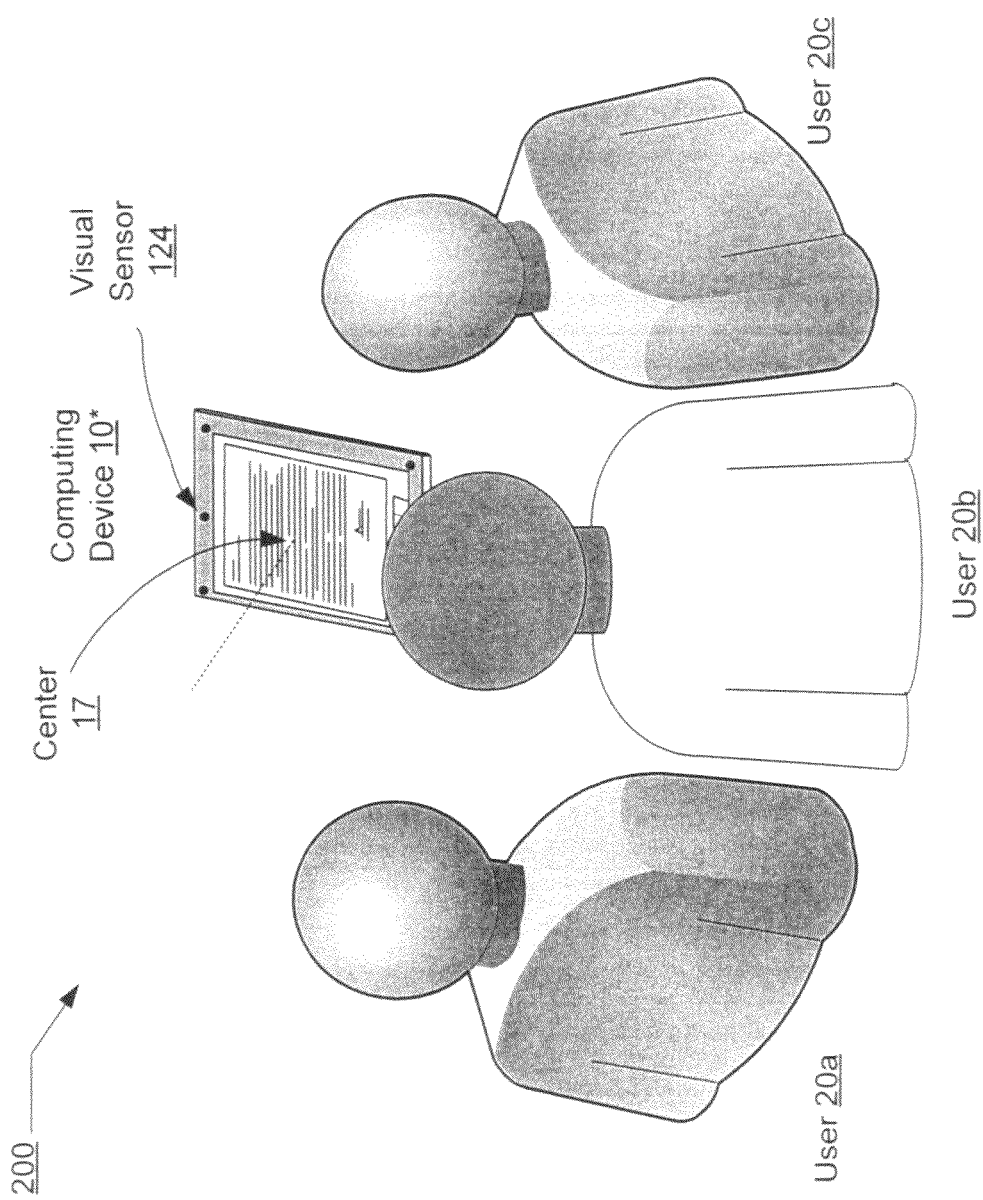
FIG. 2a shows an exemplary environment 200 in which a plurality of users 20a, 20b, and 20c are gathered around and being in the proximate vicinity of the computing device 10* of FIG. 1.

FIGS. 2a to 2d illustrate various exemplary environments in which a plurality of users 20* may be detected in the proximate vicinity of the computing device 10*. Referring particularly now to FIG. 2a illustrating an exemplary environment 200 in which a plurality of users 20a, 20b, and 20c are gathered around the computing device 10* of FIG. 1 in order to jointly use/access the computing device 10*. In some instances, the plurality of users 20a, 20b, and 20c, may have gathered around the computing device 10* even before the computing device 10* was initially powered-on or before the computing device 10* was awaken from a low power (e.g., sleep mode) state. For these situations, upon being awaken from a sleep or off-mode, the computing device 10* may be designed to automatically activate one or more sensors 120 (e.g., one or more visual sensors 124, one or more audio sensors 124, and/or one or more movement sensors 122) in order to detect presence of one or more users 20* in the proximate vicinity of the computing device 10*.

Various techniques may be employed in order to detect presence of users 20* in the proximate vicinity of the computing device 10*. For example, in some cases, a facial recognition system or software in combination with visual data provided by one or more visual sensors 124 (e.g., image capturing devices such as webcams and/or digital cameras) may be employed in order to detect whether the faces of one or more users 20* are in the proximate vicinity of the computing device 10*. Alternatively or additionally, a voice recognition system or software in combination with audio data provided by one or more audio sensors 126 (e.g., microphones) may be employed in order to detect whether the voices of one or more users 20* are detected to have originated from the proximate vicinity of the computing device 10*. In still other cases, movement data provided by one or more movement sensors 122 may additionally or alternatively be used in order to detect whether the computing device 10* is exhibiting one or more movements (e.g., a heart or pulse rate) that is determined to be associated with one or more users 20*(e.g., detection of such signature movements may at least infer that the computing device 10* is in physical contact with the one or more users 20*). As alluded to above, in some cases, data from a variety of sensors 120 (e.g., movement sensors 122, visual sensors 124 and/or audio sensors 126) may be employed in order to determine whether one or more users 20* are in the proximate vicinity of the computing device 10*.

If the computing device 10*, or the logic endowed with the computing device 10*, determines that a plurality of users 20* are in the proximate vicinity of the computing device 10*, then that computing device 10* may be designed to determine which of the plurality of users 20* determined to be in the proximate vicinity of the computing device 10* has primary control of the computing device 10*. In some embodiments, such a determination may be automatically executed whenever the computing device 10*(or its endowed logic) detects that there are a plurality of users 20* in the proximate vicinity of the computing device 10*. In some alternative embodiments, and as will be described below, the determination as to which of a plurality of users 20* detected in the proximate vicinity of the computing device 10* has primary control of the computing device 10* may be automatically done whenever a user 20*(e.g., a primary user or a secondary user having inferior access rights than the primary user) is detected relinquishing primary control of the computing device 10*. In various embodiments, the "proximate vicinity" of the computing device 10* may be the immediate area surrounding the computing device 10* from which a user 20* may access (e.g., hear, see, use, manipulate, modify, and so forth) one or more items (e.g., electronic files or documents, software applications, audio or image files, passwords, and so forth) through the computing device 10*.

As will be further described herein, the determination as to which users 20* detected in the proximate vicinity of the computing device 10* has primary control of the computing device 10* may be accomplished in a number of different ways in various alternative embodiments. For example, in some embodiments, the determination as to which users 20* detected in the proximate vicinity of the computing device 10* has primary control of the computing device 10* may involve at least initially detecting or determining the specific spatial locations of the plurality of users 20* with respect to the computing device 10*. In some cases, this may mean detecting the specific spatial locations of the faces or eyes of each of the plurality of the users 20* with respect to the computing device 10* or with respect to the specific orientation of the computing device 10*. That is, typically those users 20* detected as being on the backside or second side 19 (see FIG. 1) of the computing device 10* can be discounted as having primary control when determining which users 20* has primary control of the computing device 10* since users 20* who are determined to be on the second side 19 of the computing device 10* will have limited access at least to the display screen 12. Thus, a strong inference may be made that those users 20* detected as being on the second side 19 of the computing device 108 will not have primary control of the computing device 10*.

In various embodiments, the determination of the specific spatial locations of the plurality of users 20*(e.g., specific spatial locations of the faces or eyes of the plurality of users 20*) may be based on visual data provided by one or more visual sensors 124 and/or based on audio data provided by one or more audio sensors 126. By employing, for example, parallax techniques, and based on data provided by, for example, one or more visual sensors 124 (providing image data from different angles) the specific spatial locations of each of the plurality of users 20* detected in the proximate vicinity of the computing device 10* may be determined at least with respect to the computing device 10*(e.g., determined relative to the specific spatial location of the computing device 10*). In some embodiments, the computing device 10* may employ multiple visual sensors 124 and/or multiple audio sensors 126 in order to more accurately determine the specific spatial locations of each of the detected users 20* (e.g., parallax techniques for determining distances typically require a minimum of two different lines of sight) relative to the location of the computing device 10*. Thus, more accurate results may be obtained by using data provided by multiple sensors 120 (e.g., multiple visual sensors 124).

After the computing device 10*(or at least the logic endowed with the computing device 10*) determines the specific spatial locations of each of the plurality of users 20* detected in the proximate vicinity of the computing device 10*, a determination may be made by the computing device 10* as to which of the detected users 20* has primary control of the computing device 10* based on the specific spatial locations of the plurality of users 20*. In order to make such a determination, in some embodiments, the computing device 10* may be designed to determine which user 20* detected to be in the proximate vicinity of the computing device 10* is actually nearest or closest to the computing device 10*. More particularly, in some cases, the computing device 10* maybe designed to determine which of the plurality of users 20* is nearest to the first side 18 (or the display screen 12) of the computing device 10*. In various embodiments, those users 20* determined to be nearest to the computing device 10* or at least to the first side 18 of the computing device 10* may be determined to have primary control of the computing device 10*. In some embodiments, in order to determine which user 20* has primary control of the computing device 10*, the computing device 10*(or at least the logic endowed with the computing device 10*) may be additionally or alternatively designed to determine which of the plurality of users 20* is or are spatially located principally on the side of the first side of the computing device 10*. For these embodiments, the computing device 10* may be designed to determine which of the plurality of users 20*(e.g., determine which of the eyes or faces of the plurality of users 20*) is or are located centered on the 1$^{st}$ side or spatially centered closest to the center 17 of the first side 18 of the computing device 10*. For example, in FIG. 2a, user 20b appears to be nearest to the center 17 of the first side 18 and would, therefore, be considered to have primary control of the computing device 10*.

In some embodiments, in order to determine which of the plurality of users 20* detected in the proximate vicinity of the computing device 10* has primary control of the computing device 10*, the computing device 10* may be designed to detect whether the computing device is exhibiting one or more movements that at least substantially matches with one or more signature movements (e.g., heart or pulse rate) of one or more users 20* detected as being in the proximate vicinity of the computing device 10*. By making such a determination, an inference may be made that those users 20*, whose signature movements appears to be exhibited by the computing device 10*, may be in contact with the computing device 10*, and therefore, has primary control of the computing device 10*.

Note that in cases where multiple users 20* are deemed to have primary control of the computing device 10*, such as in the example scenario illustrated in FIG. 3f where two users 20s and 20t are located equal distance from the first side 18 of the computing device 10*, the computing device 10* may be designed to use tie-breaker rules in order to provide the proper level of access to the one or more items as will be described herein. For example, and as will be further described below, in some embodiments, if two or more users 20* are determined to have primary control of the computing device 10*(e.g., the faces of multiple users 20* are detected to be equal distance from the first side 18 of the computing device 10*), then the access to be provided to the one or more items will be based on the access rights of the user 20* having the least or lowest access rights among the two or more users 20* who were determined to have primary control of the computing device 10*. In alternative embodiments, however, the access to be provided to the one or more items will be based on the access rights of the user 20* having the highest access rights among the two or more users 20* who were determined to have primary control of the computing device 10*.

In addition to determining which of the plurality of users 20* detected in the proximate vicinity of the computing device 10* has primary control of the computing device 10*, the computing device (or at least the logic endowed with the computing device 10*) may be designed to determine the identities of the one or more users determined to have primary control of the computing device 10*. That is, at a minimum, the computing device 10* should be able to determine whether those users 20* determined to have primary control of the computing device 10* is or are primary users (e.g., users such as owners who have superior access rights to the computing device 10* or to the content/applications that are available through the computing'device 10*) or secondary users (e.g., users having access rights that are inferior to those of a primary user). Such a determination may be made prior to, during, or after determining which of the plurality of users 20* detected in the proximate vicinity of the computing device 10* has primary control of the computing device 10*.

At this time, it should be noted that although only two groups of users (e.g., primary and second users) having two distinct levels of accessing rights thus far have been discussed for illustrative purposes and for ease of understanding, those having ordinary skill in the arts will recognize that users 20* of the computing device 10* could very well be classified into three or more groups of users having three or more distinct levels of accessing rights to the computing device 10*(or to the content/applications accessed through the computing device 10*). Thus, the general concepts that were described here although were directed to systems where only two levels of access rights exists, these concepts could be equally applicable to scenarios in which three or more groups of users having three or more distinct levels of accessing rights exists.

In some embodiments, the computing device 10* rather than merely determining whether a particular user 20* detected as having primary control of the computing device 10* is a primary user or a secondary user, may determine the actual identity (e.g., legal name, username, and so forth) of the particular user 20*. Such a determination may be made based on data provided by one or more sensors 120 (e.g., one or more movement sensors 122, one or more visual sensors 124, and/or one or more audio sensors 126) and using, for example, facial or voice recognition application. Also, when one or more movement sensors 122 (e.g., accelerometers, inertia devices, gyroscopes, and so forth) are employed, the movement data provided by the one or more movement sensors 122 may be used in order to determine whether the computing device 10* is exhibiting movements that at least substantially matches with the signature movements (e.g., heart or pulse rate) of one or more identifiable persons. If the computing device 10* does indeed exhibit movements that match with the signature movements of a specific identifiable person then the identification of the user 20* having primary control of the computing device 10* may be made (although may not be conclusive since signature movements of each identifiable person may not be unique to that particular identifiable person).

After determining which user 20* has primary control of the computing device 10*, the computing device 10* as alluded to earlier may be designed to provide a particular level of access, via the computing device, to one or more items, the particular level of access to be provided being in response, at least in part, to determining which of the plurality of users 20* detected in the proximate vicinity of the computing device 10* has primary control of the computing device 10*. The type of access to be provided to the one or more items will depend on a number of factors including, for example, what types of items is access to be or not to be provided to, and the security preferences of the owner of the computing device 10* or system/network administrators. At least three levels of access to the one or more items may be provided via the computing device 10* in response to determining which of the plurality of users 20* detected in the proximate vicinity of the computing device 10* has primary control of the computing device 10*. The three levels of access that could be provided to the one or more items are full access, partial access, and/or no access.

Further, depending on whether the one or more items are, for example, textual, image, or audio files, the access that may or may not be provided may be related to visual and/or audio access to the one or more items. In cases where the one or more items are, for example, one or more productivity documents (e.g., word processing documents, spreadsheet documents, and so forth), the access that is or is not to be provided may be the right to edit or not edit such documents (e.g., in other words providing the documents in read-only format, partially editable format, or fully editable format). In embodiments where the one or more items include one or more software applications, the access that may or may not be provided to the one or more items include access to one or more functionalities of the one or more software applications. A more detailed discussion related to the various types of access that may or may not be provided to the one or more items will be provided below with respect to the operations and processes to be described herein.

In some embodiments, the particular level of access to be provided to the one or more items may, in addition to being in response to determining which of the users 20* has primary control of the computing device 10*, may be in response to ascertaining that the one or more items are affiliated with one or more particular entities (e.g., persons, businesses, websites, and so forth). For example, suppose a primary user of a computing device 10* wishes to conceal her relationship with a particular entity. In order to keep such a relationship confidential, the computing device 10*(or the logic endowed with the computing device 10*) may be designed to obfuscate any items that are ascertained to be affiliated with the particular entity whenever the computing device 10* is in the primary control of, for example, a secondary user. Thus, when the computing device 10* detects that a secondary user has primary control of the computing device 10*, the computing device 10* may seek out all items that are ascertained to be affiliated with the particular entity, and to restrict access to such items by hiding/disguising these items. Further, upon detecting that the primary control of the computing device 10* has been returned to the primary user, greater access may be provided to the items ascertained to be affiliated with the particular entity. A more detailed discussion related to the above "ascertainment" discussion will be provided below with respect to the operations and processes to be described herein.

In some embodiments, the computing device 10* in response to providing the particular level of access to the one or more items may generate an alert that indicates that the computing device 10* has been reconfigured to provide the particular level of access to the one or more items. By generating such an alert, users 20* may be notified to the change in the configuration of the computing device 10*(e.g., to indicate that the computing device is in a "safe" or "secure" mode or to indicate that the computing device 10* is in an "unrestricted" mode). Various types of alerts may be generated in various alternative embodiments including, for example, an audio alert (e.g., a ring, a buzz, or a voice with a vocal message), a particular vibration (e.g., the computing device 10* generating a particular vibration), and/or visual alerts (e.g., a symbol displayed on a display screen 12 of the computing device 10* or the background color of the display screen 12 changing to a pre-defined color).

Figure 2B:
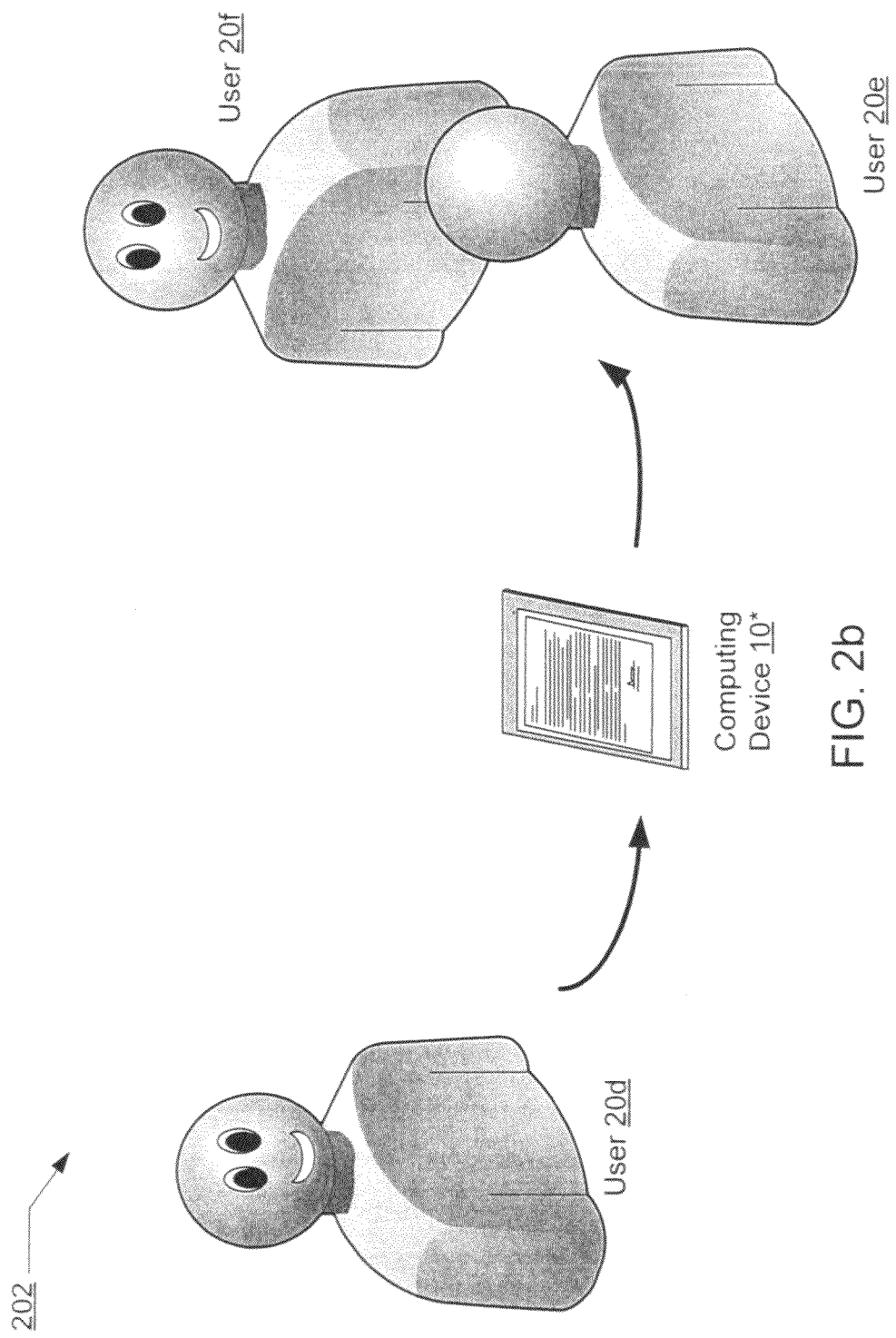
FIG. 2b shows another exemplary environment 202 in which primary control of the computing device 10* of FIG. 1 is being relinquished by a user 20d and being transferred to a plurality of users 20e and 20f.

Turning now to FIG. 2b illustrating another exemplary environment 202 in which primary control of the computing device 10* of FIG. 1 is being relinquished by a user 20d by transferring the computing device 10* to a plurality of users 20e and 20f. In various embodiments, user 20d may be a primary user or a secondary user of the computing device 10*. Similarly, each of the users 20e and 20f may be a primary user or a secondary user. In various embodiments, the computing device 10* may be designed to detect that the primary control of the computing device 10* is being relinquished by user 20d based on, for example, data provided by one or more sensors 120 (e.g., one or more movement sensors 122, one or more visual sensors 124, and/or one or more audio sensors 126). In some embodiments, the computing devices 10* may additionally or alternatively be designed to detect the presence of multiple users 20e and 20f in the proximate vicinity of the computing device 10*.

The detection of the users 20e and 20f in the proximate vicinity of the computing device 10* in some cases may be based on data provided by one or more sensors 120 (e.g., one or more movement sensors 122, one or more visual sensors 124, and/or one or more audio sensors 126). After detecting the presence of multiple users 20e and 20f in the proximate vicinity of the computing device 10*, the computing device 10* may be designed to determine which of the multiple users 20e and 20f has primary control of the computing device 10*. In various embodiments, such a determination may be based on the spatial locations of the multiple users 20e and 20f(e.g., spatial locations of the faces or eyes of users 20e and 20f)

relative to, for example, the specific orientation of the computing device 10*(e.g., relative to the first side 18 of the computing device 10*). For example, in some cases, the computing device 10* may be designed to determine which of the users 20e and 20f (or the faces or eyes of the users 20e and 20f) detected in the proximate vicinity of the computing device 10* is centered on the first side 18 of the computing device 10* or centered nearest to the center 17 (e.g., nearest to center axis 17a) of first side 18 of the computing device 10*. Based on the accessing rights of the user (e.g., user 20e or user 20f) determined to have primary control of the computing device 10*, a particular level of access may be provided to one or more items (e.g., electronic documents and/or software applications) via the computing device 10*.

Referring now to FIG. 2c illustrating another exemplary environment 204 in which two users, user 20g and user 20i joins a third user, user 20h in accessing (e.g., viewing and/or listening to visual and/or audio output via display screen and/or speakers, and/or providing input via, for example touchscreen) the computing device 10* of FIG. 1. In various embodiments, user 20h may be a primary user or a secondary user of the computing device 10*. Similarly, each of the users 20g and 20h may be a primary user or a secondary user. In various embodiments, the computing device 10* may be designed to detect the presence of multiple users 20g, 20h, and 20i in the proximate vicinity of the computing device 10*. The detection of the users 20g, 20h, and 20i in the proximate vicinity of the computing device 10* in some cases may be based on data provided by one or more sensors 120 (e.g., one or more movement sensors 122, one or more visual sensors 124, and/or one or more audio sensors 126). After detecting the presence of multiple users 20g, 20h, and 20i in the proximate vicinity of the computing device 10*, the computing device 10* may be designed to determine which of the multiple users 20g, 20h, and 20i has primary control of the computing device 10*. In various embodiments, such a determination may be based on the spatial locations of the multiple users 20g, 20h, and 20i (e.g., spatial locations of the faces or eyes of users 20g, 20h, and 20i) relative to, for example, the specific orientation of the computing device 10*(e.g., relative to the first side 18 of the computing device 10*). For example, in some cases, the computing device 10* may be designed to determine which of the users 20g, 20h, and 20i (or the faces or eyes of the users 20g, 20h, and 20i) detected in the proximate vicinity of the computing device 10* is centered on the first side 18 of the computing device 10* or centered nearest to the center 17 of first side 18 of the computing device 10*(see FIG. 1). Based on the accessing rights of the user (e.g., user 20g, user 20h, or user 20i) determined to have primary control of the computing device 10*, a particular level of access may be provided to one or more items (e.g., electronic documents and/or software applications) via the computing device 10*.

Figure 2D:
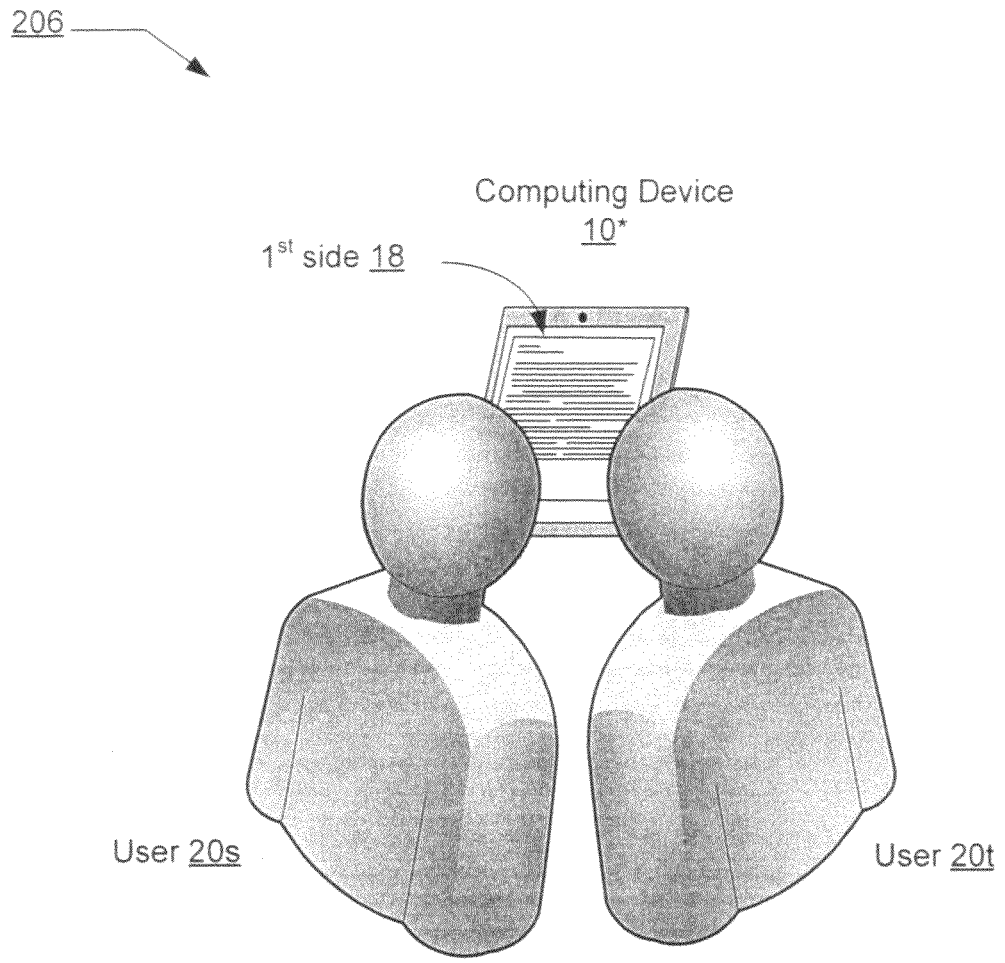
FIG. 2d shows another exemplary environment 206 in which two users 20s and 20t have joint primary control of the computing device 10* of FIG. 1.

Referring now to FIG. 2d illustrating another exemplary environment 206 in which two users, user 20s and user 20t, have joint primary control of the computing device 10*. In various embodiments, each of the users 20s and 20t may be a primary user or a secondary user. As before, the computing device 10* may be designed to detect the presence of multiple users 20s and 20t in the proximate vicinity of the computing device 10*. After detecting the presence of multiple users 20s and 20t in the proximate vicinity of the computing device 10*, the computing device 10* may be designed to determine which of the multiple users 20s and 20t has primary control of the computing device 10*. In various embodiments, such a determination may be based on the spatial locations of each of the multiple users 20s and 20t (e.g., spatial locations of the faces or eyes of user 20s and 20t) relative to, for example, the specific orientation of the computing device 10*(e.g., relative to the first side 18 of the computing device 10*).

For example, in some cases, the computing device 10* may be designed to determine which of the users 20s and 20t (or the faces or eyes of the users 20s and 20t) detected in the proximate vicinity of the computing device 10* is centered on the first side 18 of the computing device 10* or centered nearest to the center 17 of first side 18 of the computing device 10*(see FIG. 1). If the computing device 10*(or at least the logic endowed the computing device 10*) determines that multiple users 20s and 20t have joint primary control of the computing device 10*(e.g., users 20s and 20t are determined to be equal distance from the first side 18 or the center 17 of the first side 18 of the computing device 10*), then the computing device 10* may be designed to use one or more tiebreaker rules to determine/select the particular level of access that may be provided to one or more items via the computing device 10*. For example, in some embodiments, the particular level of access to be provided to the one or more items via the computing device 10* may be based on the access rights to the computing device 10*(or to the one or more items) enjoyed by a particular user (e.g., user 20s or user 20t) from the plurality of users (e.g., user 20s and user 20t) determined to have primary control of the computing device 10*, the access rights of the particular user being the basis for the particular level of access to be provided to the one or more items based, at least in part, on the particular user having the lowest (e.g., least) access rights to the one or more items among the plurality of users (e.g., user 20s and user 20t) determined to have primary control of the computing device 10*. In some alternative embodiments, the particular level of access to be provided to the one or more items via the computing device 10* may be based on the access rights to the computing device 10*(or to the one or more items) enjoyed by a particular user (e.g., user 20s or user 20t) from the plurality of users (e.g., user 20s and user 20t) determined to have primary control of the computing device 10*, the access rights of the particular user being the basis for the particular level of access to be provided to the one or more items based, at least in part, on the particular user having the highest (e.g., most) access rights to the one or more items among the plurality of users (e.g., user 20s and user 20t) determined to have primary control of the computing device 10*.

Referring now to FIGS. 3a and 3b illustrating two embodiments (illustrated in FIG. 3a as computing device 10' and in FIG. 3b as computing device 10") of the computing device 10* of FIGS. 1, 2a,2b,2c, and 2d. Referring particularly now to FIG. 3a, which illustrates a computing device 10' that includes a primary control determining module 102', an access providing module 104', an alert generating module 106', a memory 114 (which may store one or more applications 160), one or more processors 116 (e.g., microprocessors, controllers, etc.), one or more sensors 120, user interface 110 (e.g., a display screen such as a touchscreen, a keypad, a mouse, a microphone, a speaker, and/or other user input/output devices), and a network interface 112 (e.g., network interface card or NIC).

In brief, the primary control determining module 102' of FIG. 3a is a logic module that is designed to at least determine which of a plurality of users 20* detected in proximate vicinity of a computing device 10' has primary control of the computing device 10'. In contrast, the access providing module 104' is a logic module that is designed to provide a particular level of access, via the computing device 10', to one or more items, the particular level of access to be provided to the one or more items being in response; at least in part, to said determining which of the plurality of users 20* detected in proximate vicinity of a computing device 10' has primary control of the computing device 10'. In further contrast, the alert generating module 106' is a logic module that is designed to generate an alert to indicate that the particular level of access has been provided to the one or more items in response to said providing of the particular level of access to the one or more items. For this particular embodiment of the computing device 10* of FIGS. 1, 2a,2b,2c, and 2d, the three logic modules (e.g., the primary control determining module 102', the access providing module 104', and the alert generating module 106') are depicted in FIG. 3a as being implemented using purely circuitry components (e.g., hardware components) such as application specific integrated circuit or ASIC. Thus, the computing device 10' illustrated in FIG. 3a may be referred to as the "hardwired" or "hard" embodiment of the computing device 10* of FIGS. 1, 3a, 3b, 3c, and 3d.

Turning now to FIG. 3b, which illustrate a "soft" embodiment of the computing device 10* of FIGS. 1, 2a,2b,2c, and 2d in the form of computing device 10*. In particular, FIG. 3b shows a computing device 10" that has components similar or the same as the components of the computing device 10' of FIG. 3a. For example, the computing device 10", similar to computing device 10' of FIG. 3a, may comprise of a memory 114 (storing one or more applications 160), one or more processors 116, one or more sensors 120, user interface 110, and/or a network interface 112. And similar to the computing device 10' of FIG. 3a, the computing device 10" of FIG. 3b may include logic modules including a primary control determining module 102", an access providing module 104", and an alert generating module 106" that functionally correspond to and mirror the primary control determining module 102', the access providing module 104', and the alert generating module 106' of the computing device 10' of FIG. 3a. However, unlike the logic modules (e.g., the primary control determining module 102', the access providing module 104', and the alert generating module 106') of the computing device 10' of FIG. 3a, the logic modules (e.g., the primary control determining module 102", the access providing module 104", and the alert generating module 106") of the computing device 10" of FIG. 3b are implemented by one or more processors 116 executing computer readable instructions 152 (e.g., software and/or firmware) that may be stored in the memory 114.

Note that although FIG. 3a illustrates all of the logic modules (e.g., the primary control determining module 102', the access providing module 104', and the alert generating module 106') being implemented using purely hardware components such as ASIC, and although FIG. 3b illustrates all of the logic modules (e.g., the primary control determining module 102", the access providing module 104", and the alert generating module 106") being implemented using one or more processors 116 executing computer readable instructions 152, in other embodiments, such logic modules may be implemented using a combination of hardware components (e.g., ASIC) and software components in the form of computer readable instructions 152 that may be executed using one or more processors 116 (or other types of circuitry such as field programmable gate arrays or FPGAs). For example, in some embodiments, at least one of the logic modules (e.g., primary control determining module 102') may be implemented using specially designed circuitry (e.g., ASIC) while a second logic module (e.g., access providing module 104") may be implemented using a processor 116 (or other types of programmable circuitry such as FPGA) executing computer readable instructions 152 (e.g., software and/or firmware).

In various embodiments, the memory 114 of the computing device 10' of FIG. 3a and the computing device 10" of FIG. 3b may comprise of one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In various embodiments, the one or more applications 160 stored in memory 114 of FIGS. 3a and 3b may include, for example, an operating system (OS) 162, one or more productivity applications 164 such as a word processing application or a spreadsheet application, one or more communication applications 166 such as an email or IM application, one or more personal information manager applications 168 (e.g., Microsoft Outlook), one or more facial recognition applications 170, one or more voice recognition applications 172, and/or one or more iris scanning applications 174.

Turning now to FIG. 3c illustrating a particular implementation of the primary control determining module 102*(e.g., the primary control determining module 102' or the primary control determining module 102") of FIGS. 3a and 3b. As illustrated, the primary control determining module 102* may include one or more sub-logic modules in various alternative implementations. For example, in various implementations, the primary control determining module 102* may include a user detecting module 202 that may further comprise of a user relinquishment detecting module 203 (which may further include a movement detecting module 204, a visual cue detecting module 205, and/or an audio cue detecting module 206), a user visual detecting module 208, and/or user audible detecting module 209. In some embodiments, the primary control determining module 102* may also or alternatively include a user spatial location detecting module 210 that further comprises a nearest user detecting module 211 (which may include a visual nearest user detecting module 212 and/or an audible nearest user detecting module 213) and/or a centered detecting module 214. In some cases, the primary control determining module 102* may additionally or alternatively include a movement detecting module 216. Specific details related to the primary control determining module 102* as well as the above-described sub-modules of the primary control determining module 102* will be provided below with respect to the operations and processes to be described herein.

Referring now to FIG. 3d illustrating a particular implementation of the access providing module 104*(e.g., the access providing module 104' or the access providing module 104") of FIGS. 3a and 3b. As illustrated, the access providing module 104* may include one or more sub-logic modules in various alternative implementations. For example, in various implementations, the access providing module 104* may include a viewing access providing module 230 that may additionally include a visual hiding module 232 (which may further include a visual representation replacing module 234) and/or a visual representation providing module 236 (which may further include a locum tenentes replacing module 238). In some implementations, the access providing module 104* may additionally or alternatively include an audio access providing module 240 that includes an audio hiding module 242 (which may further include an audio representation replacing module 244) and/or an audio representation providing module 246 (which may further include a locum tenentes replacing module 248). In the same or different implementations, the access providing module 104* may include an editable format presenting module 250, a non-editable format presenting module 252, a functional format presenting module 254, and/or an entity affiliation ascertaining module 256. Specific details related to the access providing module 104* as well as the above-described sub-modules of the access providing module 104* will be provided below with respect to the operations and processes to be described herein.

FIG. 3e illustrates a particular implementation of the one or more sensors 120 that may be included with the computing device 10*(e.g., the computing device 10' of FIG. 3a or the computing device 10" of FIG. 3b) of FIGS. 1, 2a,2b,2c, and 2d. As illustrated, the one or more sensors 120 that may be included with the computing device 10* may include one or more movement sensors 122 (e.g., one or more accelerometers, inertia sensors, and/or gyro sensors), one or more visual sensors 124 (e.g., a web cam, a digital camera, an infrared camera, and/or other image capturing devices), and/or one or more audio sensors 126 (e.g., microphones).

Figure 3F:
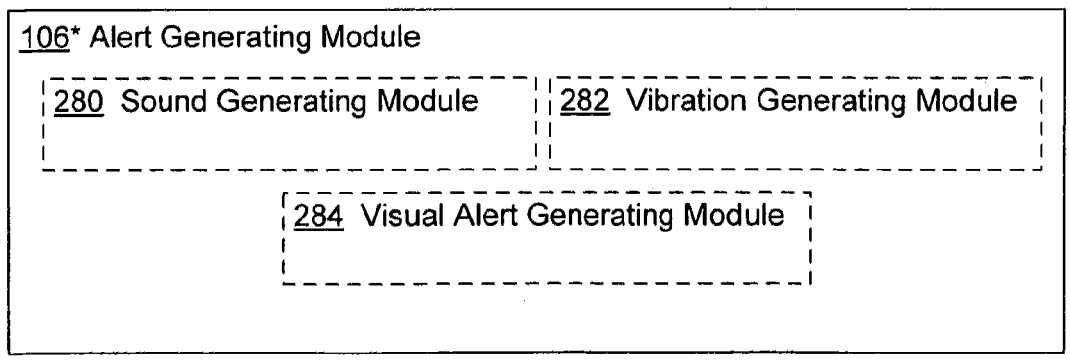
FIG. 3f shows another perspective of the alert generating module 106* of FIGS. 3a and 3b.

Referring to FIG. 3f illustrating a particular implementation of the alert generating module 106*(e.g., the alert generating module 106' or the alert generating module 106") of FIGS. 3a and 3b. As further illustrated in FIG. 3f, the alert generating module 106* may include a sound generating module 280, a vibration generating module 282, and/or a visual alert generating module 284. Specific details related to the alert generating module 106* as well as the above-described sub-modules of the alert generating module 106* will be provided below with respect to the operations and processes to be described herein.

Figure 4:
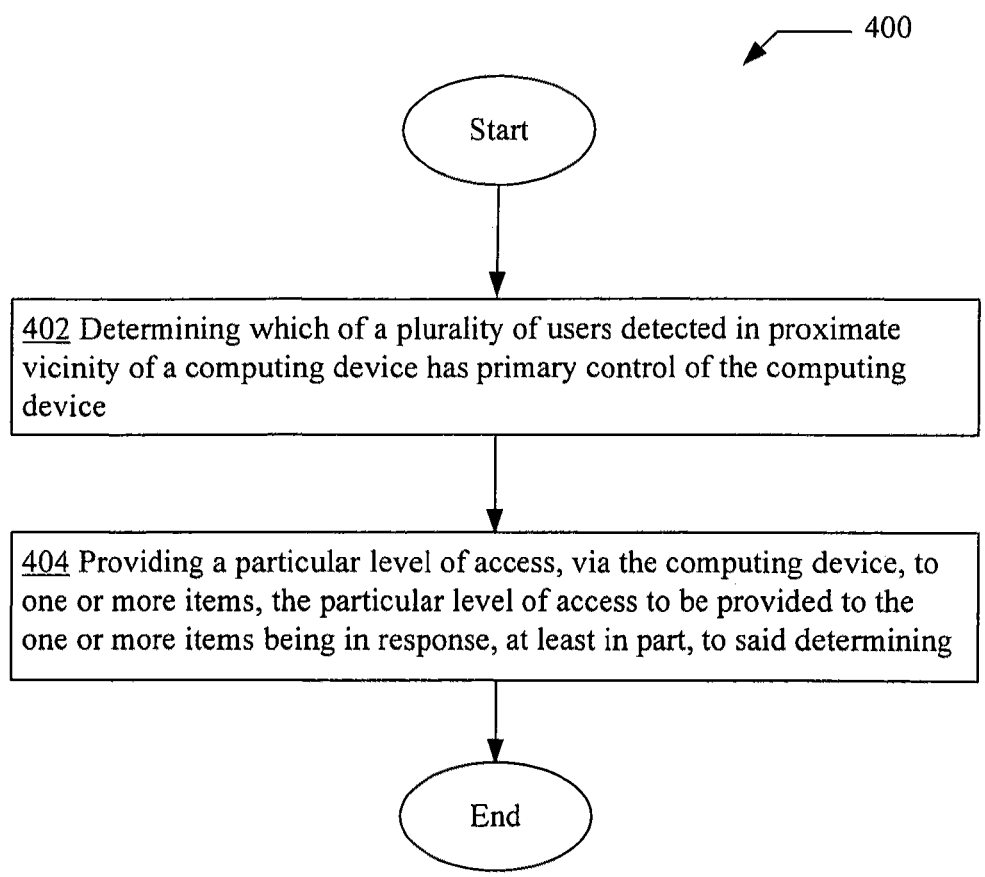
FIG. 4 is a high-level logic flowchart of a process.

A more detailed discussion related to the computing device 10* of FIGS. 1, 2a, 2b,2c, and 2d (e.g., the computing device 10' of FIG. 3a or the computing device 10" of FIG. 3b) will now be provided with respect to the processes and operations to be described herein. FIG. 4 illustrates an operational flow 400 representing example operations for, among other things, providing a particular level of access, via the computing device 10*, to one or more items (e.g., software applications, electronic documents including productivity documents, audio or image files, electronic messages including emails and voice mails, passwords, so forth), the particular level of access to be provided to the one or more items being in response, at least in part, to determining which of a plurality of users detected in the proximate vicinity of the computing device 10* has primary control of the computing device 10*. In FIG. 4 and in the following figures that include various examples of operational flows, discussions and explanations will be provided with respect to the exemplary environment 100 described above and as illustrated in FIG. 1 and/or with respect to other examples (e.g., as provided in FIGS. 1, 2a, 2b, 2c, 2d, 3a, 3b, 3c, 3d, 3e, and 3f) and contexts. However, it should be understood that the operational flows may be executed in a number of other environments and contexts, and/or in modified versions of FIGS. 1, 2a,2b,2c,2d,3a,3b, 3c,3d,3e, and 3f. Also, although the various operational flows are presented in the sequence(s) illustrated, it should be understood that the various operations may be performed in other orders other than those which are illustrated, or may be performed concurrently.

Further, in FIG. 4 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 4 as well as the other operations to be described herein are performed by at least one or more of a machine, an article of manufacture, and/or a composition of matter unless indicated otherwise.

In any event, after a start operation, the operational flow 400 of FIG. 4 may move to a primary control determining operation 402 for determining which of a plurality of users detected in proximate vicinity of a computing device has primary control of the computing device. For instance, and as an illustration, the primary control determining module 102* (e.g., the primary control determining module 102' of FIG. 3a or the primary control determining module 102" of FIG. 3b) of the computing device 10* of FIG. 1 (e.g., the computing device 10' of FIG. 3a or the computing device 10" of FIG. 3b) determining which of a plurality of users 20* detected in proximate vicinity of a computing device 10* has primary control of the computing device 10*. In various implementations, such an operation may be performed by at least one of a machine, article of manufacture, or composition of matter. Note that in various implementations, and as will be further described herein, a particular user 20*(or a group of particular users 20*) from a plurality of users 20* detected in the proximate vicinity of a computing device 10* may have "primary control" of the computing device 10* when the user 20* (or users 20*) is located nearest or closest to the computing device 10*, is situated in a particular location or locations with respect to the computing device 10 such as being located directly in "front" of the computing device 10*, and/or is in physical contact with the computing device 10*. For purposes of the following, and unless indicated otherwise, the phrase "proximate vicinity" may be in reference to the immediate area surrounding a computing device 10* from which a user 20* may directly interact (e.g., the immediate area surrounding a computing device 10* from which a user 20* may see/hear output generated by the computing device via display screen and/or speakers, and/or from which the user 20* can provide direct input to the computing device 10* via, touch screen, keyboard, or microphone) with the computing device 10*.

In addition to the primary determining operation 402, operational flow 400 may also include an access providing operation 404 for providing a particular level of access, via the computing device, to one or more items, the particular level of access to be provided to the one or more items being in response, at least in part, to said determining as further illustrated in FIG. 4. For instance, the access providing module 104*(e.g., access providing module 104' of FIG. 3a or access providing module 104" of FIG. 3b) of the computing device 10* of FIG. 1 (e.g., the computing device 10' of FIG. 3a or the computing device 10" of FIG. 3b) providing a particular level of access, via the computing device 10*, to one or more items (e.g, applications, documents, image or audio files, passwords, and so forth), the particular level of access (e.g., full, partial, or no access to the one or more items) to be provided to the one or more items being in response, at least in part, to said determining which of the plurality of users 20* detected in the proximate vicinity of the computing device 10* has primary control of the computing device 10*.

The types of access to be or not to be provided to the one or more items may, in some instances, depend on the type of items are the access being provided to. For example, if the one or more items that the particular level of access is provided to are one or more software applications, then providing access to such items may involve allowing (or not allowing) use of one or more functionalities associated with such items, which may or may not have been previously available for use prior to the determination that the computing device 10* was in the primary control of a particular user 20*. For example, if the one or more items include a productivity application such as a word processing application, then providing a particular level of access to such an application may involve enabling (or disabling) one or more functionalities such as editing functions of the application or other functions such as a saving function, which may or may not have been available prior to determining which of the plurality of users 20* detected in the proximate vicinity of the computing device 10* had primary control of the computing device 10*.

If, on the other hand, the one or more items that the particular level of access is provided to includes a messaging application such as an email application then the particular level of access to be provided may be related to a sending or saving functionality. In contrast, if the one or more items include one or more electronic documents or files such as, for example, productivity documents including word processing documents, image or audio files, and electronic messages (emails or voicemails) then the particular level of access that may be provided to such items may be related to editorial access to such items and/or general visual and/or audio accessibility to view/listen to such items. In any event, the various levels of access (which may include no access) to the various types of items that may be provided will be described in greater herein.

Figure 5A:
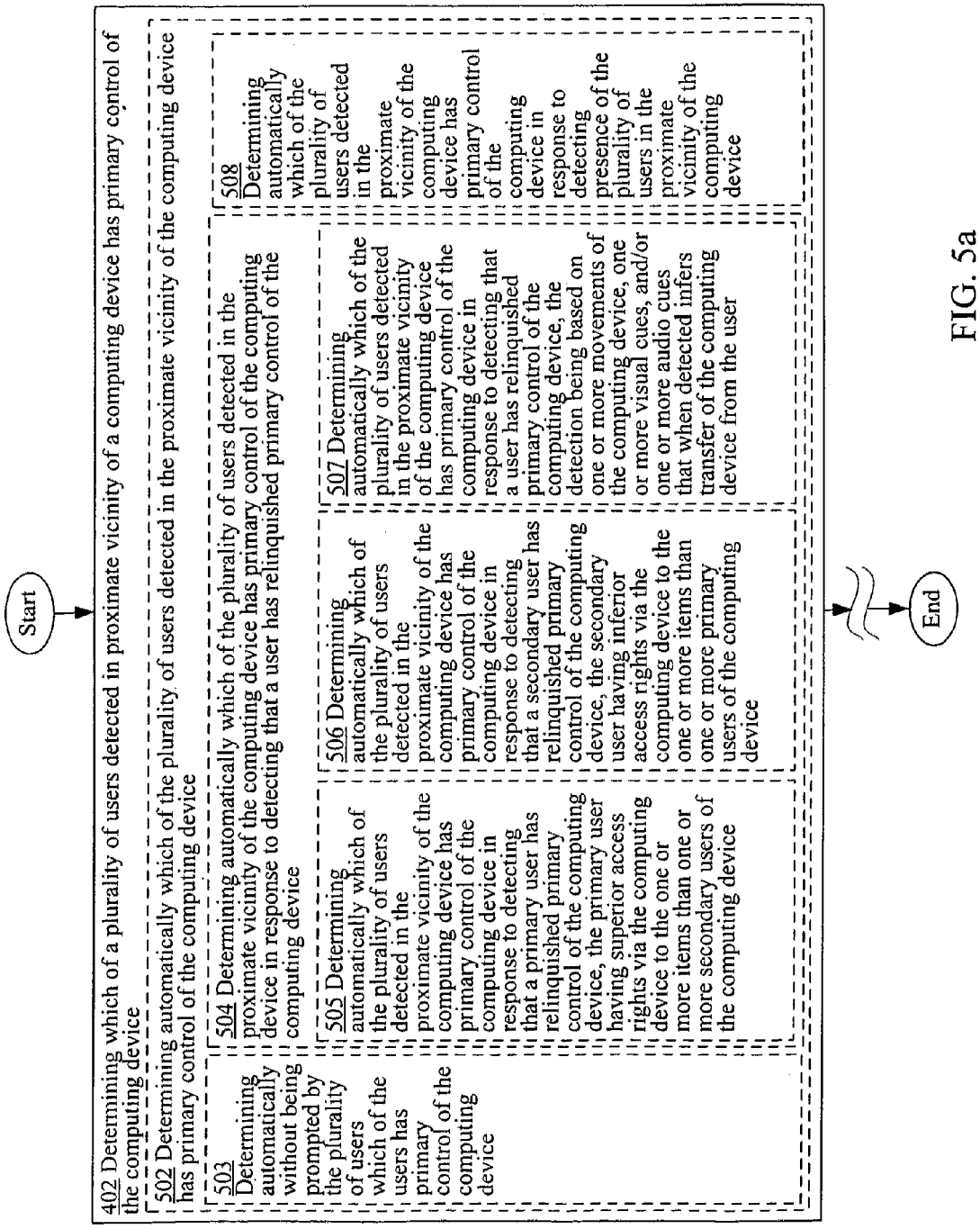
FIG. 5a is a high-level logic flowchart of a process depicting alternate implementations of the primary control determining operation 402 of FIG. 4.

As will be described below, the primary control determining operation 402 and the access providing operation 404 of FIG. 4 may be executed in a variety of different ways in various alternative implementations. FIGS. 5a,5b,5c,5d, and 5e for example, illustrate at least some of the alternative ways that the primary control determining operation 402 of FIG. 4 may be executed in various alternative implementations. For example, in various implementations, the primary control determining operation 402 of FIG. 4 may include an operation 502 for determining automatically which of the plurality of users detected in the proximate vicinity of the computing device has primary control of the computing device as depicted in FIG. 5a. For instance, the primary control determining module 102*(e.g., the primary control determining module 102' of FIG. 3a or the primary control determining module 102" of FIG. 3b) including the user detecting module 202 (see FIG. 3c) of the computing device 10* of FIG. 1 (e.g., the computing device 10' of FIG. 3a or the computing device 10" of FIG. 3b) determining automatically (e.g., without interference from the users 20*) which of the plurality of users 20* detected by the user detecting module 202 as being in the proximate vicinity of the computing device 10* has primary control of the computing device 10*.

The operation 502 for automatically determining which of the plurality of users 20* detected in the proximate vicinity of the computing device 10* has primary control of the computing device 10* may be implemented in a number of different ways in various alternative embodiments as further illustrated in FIG. 5a. For example, in some implementations, operation 502 may include an operation 503 for determining automatically without being prompted by the plurality of users which of the users has primary control of the computing device. For instance, the primary control determining module 102* of the computing device 10* of FIG. 1 (e.g., the computing device 10' of FIG. 3a or the computing device 10" of FIG. 3b) determining automatically without being prompted (or initiated) by any of the plurality of users 20* which of the users 20* detected in the proximate vicinity of the computing device 10* has primary control of the computing device 10*.

In the same or alternative implementations, operation 502 may include an operation 504 for determining automatically which of the plurality of users detected in the proximate vicinity of the computing device has primary control of the computing device in response to detecting that a user has relinquished primary control of the computing device. For instance, the primary control determining module 102* including the user relinquishment detecting module 203 (see FIG. 3c) of the computing device 10* of FIG. 1 (e.g., the computing device 10' of FIG. 3a or the computing device 10" of FIG. 3b) determining automatically which of the plurality of users 20* detected in the proximate vicinity of the computing device 10* has primary control of the computing device 10* in response to detecting by the user relinquishment detecting module 203 that a user 20*(e.g., user 20d in FIG. 2b) has relinquished primary control of the computing device 10*. In various implementations, the detection of a user relinquishing primary control of the computing device 10* may be as a result of analyzing data provided by one or more sensors 120 including one or more movement sensors 122 (e.g., sensors for detecting movements of the computing device 10* such as an accelerometer), visual sensors 124 (e.g., digital or webcam), and/or one or more audio sensors 126 (e.g., microphones). Data collected by such sensors may provide visual, audio, and/or movement cues that at least infers that primary control over the computing device 10* is or has been relinquished by a user 20*(e.g., the computing device 10* has been transferred from one user 20* to another user 20*).

As further illustrated in FIG. 5a, operation 504 may be implemented in a number of different ways in various alternative implementations. For example, in some implementations, operation 504 may include an operation 505 for determining automatically which of the plurality of users detected in the proximate vicinity of the computing device has primary control of the computing device in response to detecting that a primary user has relinquished primary control of the computing device, the primary user having superior access rights via the computing device to the one or more items than one or more secondary users of the computing device as further depicted in FIG. 5a. For instance, the primary control determining module 102* including the user relinquishment detecting module 203 of the computing device 10* of FIG. 1 determining automatically which of the plurality of users 20* detected in the proximate vicinity of the computing device 10* has primary control of the computing device 10* in response to detecting by the user relinquishment detecting module 203 that a primary user has relinquished primary control (e.g., actual or constructive possession) of the computing device 10*, the primary user having superior (greater) access rights via the computing device 10* to the one or more items than one or more secondary users of the computing device 10*.

A determination as to whether a particular user is a primary user or a secondary user may be made using a number of different techniques. For example, in some embodiments, a biometric system or software may be employed in order to automatically determine whether a particular user 20* including a user 20* detected as having primary control of the computing device 10* is a primary user or a secondary user. Examples of such systems include, for example, facial recognition systems, eye or iris scanning systems, voice recognition systems, and so forth. Other techniques may additionally or alternatively be used in order to determine whether a particular user, such as the user having primary control over the computing device 10*, is a primary user or a second user of the computing device 10*. For example, well-known security techniques, such as password requirements, may be used in order to determine, for example, whether the user having primary control over the computing device 10* is a primary user of the computing device 10*(e.g., if the computing device 10* determines that the appropriate password has not been entered than an inference may be made that the user having primary control over the computing device 10* may not be a primary user, and instead, may be a secondary user).

In some implementations, operation 504 may include an operation 506 for determining automatically which of the plurality of users detected in the proximate vicinity of the computing device has primary control of the computing device in response to detecting that a secondary user has relinquished primary control of the computing device, the secondary user having inferior access rights via the computing device to the one or more items than one or more primary users of the computing device. For instance, the primary control determining module 102* including the user relinquishment detecting module 203 of the computing device 10* of FIG. 1 determining automatically which of the plurality of users 20* detected in the proximate vicinity of the computing device 10* has primary control of the computing device 10* in response to detecting by the user relinquishment detecting module 203 that a secondary user has relinquished primary control of the computing device 10*, the secondary user having inferior access rights via the computing device 10* to the one or more items than one or more primary users of the computing device 10*.

In some implementations, operation 504 may include an operation 507 for determining automatically which of the plurality of users detected in the proximate vicinity of the computing device has primary control of the computing device in response to detecting that a user has relinquished primary control of the computing device, the detection being based on one or more movements of the computing device, one or more visual cues, and/or one or more audio cues that when detected infers transfer of the computing device from the user. For instance, the primary control determining module 102* including the user relinquishment detecting module 203 of the computing device 10* of FIG. 1 determining automatically which of the plurality of users 20* detected in the proximate vicinity of the computing device 10* has primary control of the computing device 10* in response to detecting by the user relinquishment detecting module 203 that a user 20* has relinquished primary control of the computing device 10*, the detection being based on one or more movements of the computing device 10*(as detected by the movement detecting module 204 based on data provided by one or more movement sensors 122), one or more visual cues (as detected by the visual cue detecting module 205 based on data provided by one or more visual sensors 124), and/or one or more audio cues (as detected by the audio cue detecting module 206 based on data provided by one or more audio sensors 126) that when detected infers transfer of the computing device 10* from the user 20*.

In some implementations, the operation 502 for determining automatically which of the plurality of users detected in the proximate vicinity of the computing device has primary control of the computing device may additionally or alternatively include an operation 508 for determining automatically which of the plurality of users detected in the proximate vicinity of the computing device has primary control of the computing device in response to detecting presence of the plurality of users in the proximate vicinity of the computing device as depicted in FIG. 5a. For instance, the primary control determining module 102* including the user detecting module 202 of the computing device 10* of FIG. 1 determining automatically which of the plurality of users 20* detected in the proximate vicinity of the computing device 10* has primary control of the computing device 10* in response to detecting, by the user detecting module 202, presence of the plurality of users 20* in the proximate vicinity of the computing device 10*.

Figure 5B:
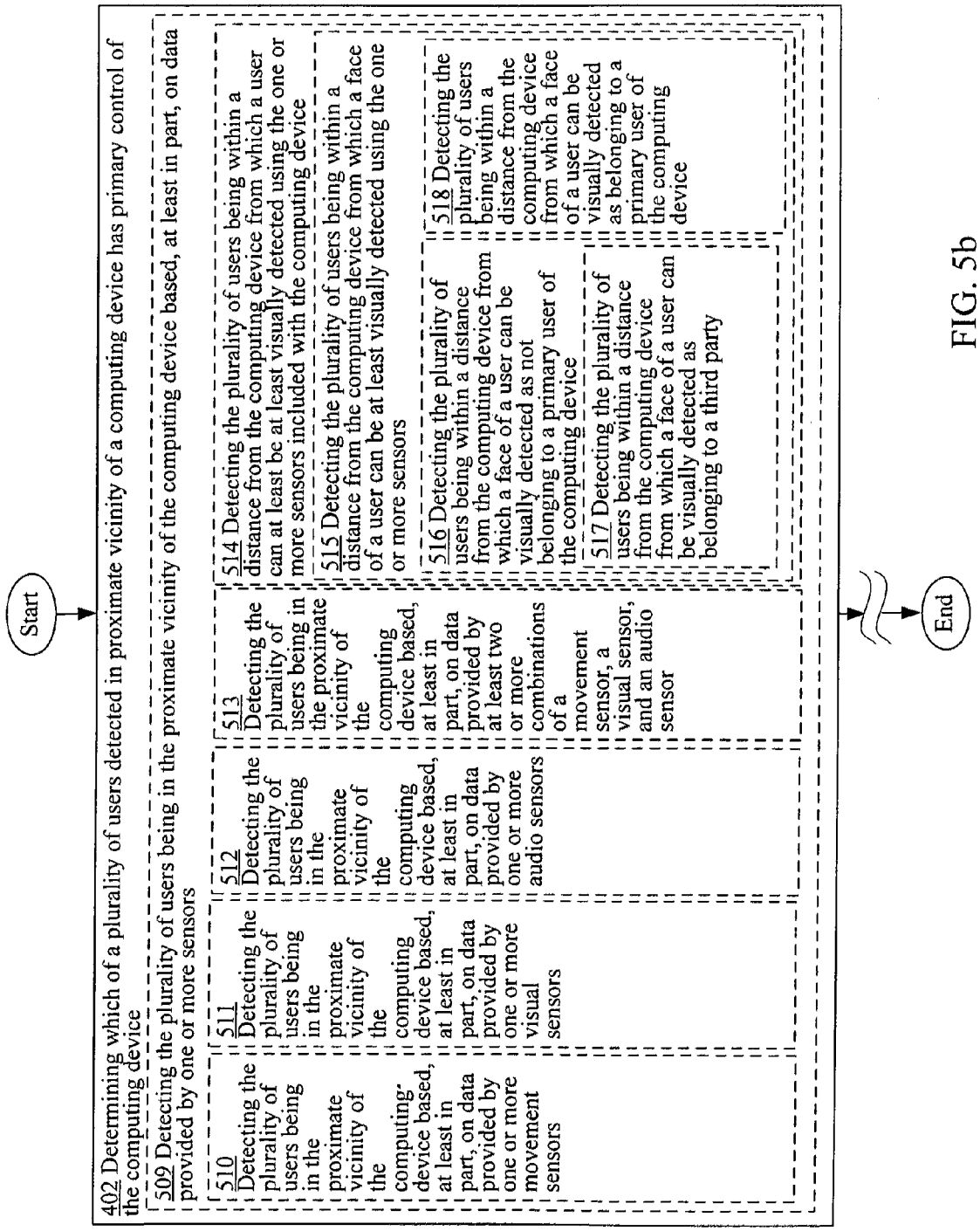
FIG. 5b is a high-level logic flowchart of a process depicting alternate implementations of the primary control determining operation 402 of FIG. 4.

Turning now to FIG. 5b, in some cases, the primary control determining operation 402 of FIG. 4 may include an operation 509 for detecting the plurality of users being in the proximate vicinity of the computing device based, at least in part, on data provided by one or more sensors. For instance, the user detecting module 202 of the computing device 10* detecting the plurality of users 20* being in the proximate vicinity of the computing device 10* based, at least in part, on data provided by one or more sensors 120. In some cases, the one or more sensors 120 may be integrated into the computing device 10*.

As further illustrated in FIG. 5b, in various implementations operation 509 may include one or more operations including, for example, operation 510 for detecting the plurality of users being in the proximate vicinity of the computing device based, at least in part, on data provided by one or more movement sensors. For instance, the user detecting module 202 of the computing device 10* detecting the plurality of users being in the proximate vicinity of the computing device 10* based, at least in part, on data provided by one or more movement sensors 122 (e.g., one or more inertia sensors, accelerometers such as three-axis or 3D accelerometers, gyroscopes, and so forth). Such movement sensors 122 may be designed to detect a variety of movements that may be exhibited by the computing device 10* including, for example, vibration or spatial movements as a result of being in contact with one or more users 20*.

In the same or different implementations, operation 509 may include an operation 511 for detecting the plurality of users being in the proximate vicinity of the computing device based, at least in part, on data provided by one or more visual sensors. For instance, the user detecting module 202 of the computing device 10* detecting the plurality of users 20* being in the proximate vicinity of the computing device 10* based, at least in part, on data provided by one or more visual sensors 124 (e.g., digital cameras, webcams, infrared cameras, and so forth).

In the same or different implementations, operation 509 may include an operation 512 for detecting the plurality of users being in the proximate vicinity of the computing device based, at least in part, on data provided by one or more audio sensors. For instance, the user detecting module 202 of the computing device 10* detecting the plurality of users 20* being in the proximate vicinity of the computing device 10* based, at least in part, on data provided by one or more audio sensors 126 (e.g., one or more microphones).

In some cases, operation 509 may include an operation 513 for detecting the plurality of users being in the proximate vicinity of the computing device based, at least in part, on data provided by at least two or more combinations of a movement sensor, a visual sensor, and an audio sensor. For instance, the user detecting module 202 of the computing device 10* detecting the plurality of users 20* being in the proximate vicinity of the computing device 10* based, at least in part, on data provided by at least two or more combinations of a movement sensor 122, a visual sensor 124, and an audio sensor 126.

In the same or different implementations, operation 509 may include an operation 514 for detecting the plurality of users being within a distance from the computing device from which a user can at least be at least visually detected using the one or more sensors included with the computing device. For instance, the user detecting module 202 of the computing device 10* detecting the plurality of users 20* being within a distance from the computing device 10* from which a user 20* can at least be at least visually detected by, for example, the user visual detecting module 208 (see FIG. 3c) using the one or more sensors 120 (e.g., one or more visual sensors 124) included with the computing device 10*.

As further illustrated in FIG. 5b, in some cases, operation 514 may further include an operation 515 for detecting the plurality of users being within a distance from the computing device from which a face of a user can be at least visually detected using the one or more sensors. For instance, the user detecting module 202 of the computing device 10* detecting the plurality of users 20 being within a distance from the computing device 10* from which a face of a user 20* can be at least visually detected by, for example, the user visual detecting module 208 using the one or more sensors 120 (e.g., one or more visual sensors 124). In some cases, in order to facilitate such an operation, the user visual detecting module 208 may comprise of a facial recognition system or software.

In some implementations, operation 515 may include an operation 516 for detecting the plurality of users being within a distance from the computing device from which a face of a user can be visually detected as not belonging to a primary user of the computing device. For instance, the user detecting module 202 of the computing device 10* detecting the plurality of users 20* being within a distance from the computing device 10* from which a face of a user 20 can be visually detected by, for example, the user visual detecting module 208, as not belonging to a primary user of the computing device 10*. The primary user of the computing device 10* may be any user having via the computing device 10* superior access rights to one or more items than other users such as secondary users of the computing device 10*. In some cases, a primary user of a computing device 10* may be an actual or constructive owner of the computing device 10*(a constructive owner is a person who has been assigned to or is somehow particularly associated with the computing device 10* such that the person has superior access rights to the computing device 10* than a third party).

As further illustrated in FIG. 5b, in some implementations, operation 516 may in turn include an operation 517 for detecting the plurality of users being within a distance from the computing device from which a face of a user can be visually detected as belonging to a third party. For instance, the user detecting module 202 of the computing device 10* detecting the plurality of users 20* being within a distance from the computing device 10* from which a face of a user 20* can be visually detected by, for example, the user visual detecting module 208, as belonging to a third party (e.g., a secondary user having inferior access rights to the one or more items than a primary user of the computing device 10*).

In some alternative implementations, operation 515 for detecting the plurality of users being within a distance-from the computing device from which a face of a user can be at least visually detected using the one or more sensors may include an operation 518 for detecting the plurality of users being within a distance from the computing device from which a face of a user can be visually detected as belonging to a primary user of the computing device. For instance, the user detecting module 202 of the computing device 10* detecting the plurality of users 20* being within a distance from the computing device 10* from which a face of a user 20* can be visually detected by, for example, the user visual detecting module 208, as belonging to a primary user of the computing device 10*.

Figure 5C:
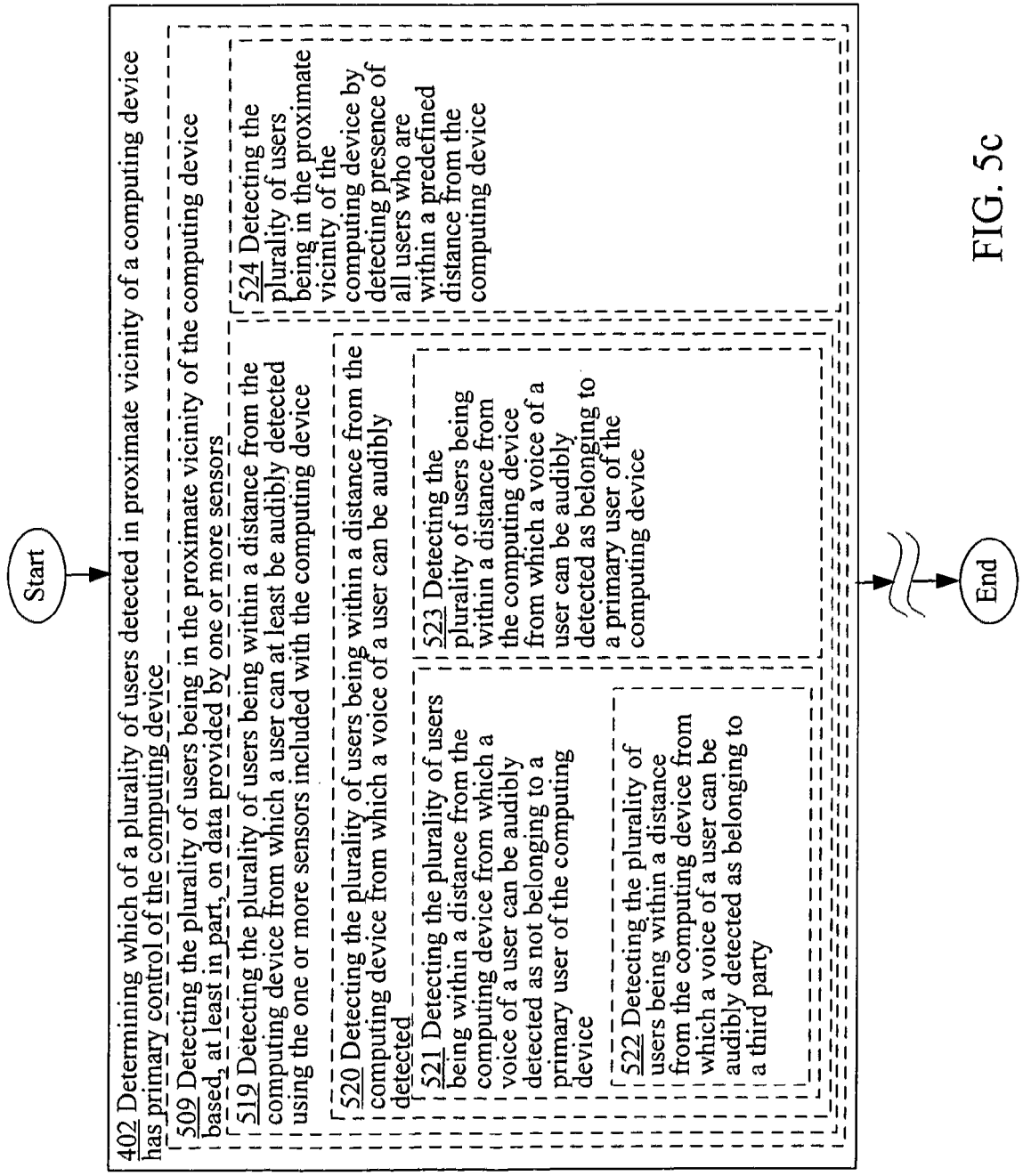
FIG. 5c is a high-level logic flowchart of a process depicting alternate implementations of the primary control determining operation 402 of FIG. 4.

Turning to FIG. 5c, in some cases, operation 509 for detecting the plurality of users being in the proximate vicinity of the computing device based, at least in part, on data provided by one or more sensors may include an operation 519 for detecting the plurality of users being within a distance from the computing device from which a user can at least be audibly detected using the one or more sensors included with the computing device. For instance, the user detecting module 202 of the computing device 10* detecting the plurality of users 20* being within a distance from the computing device 10* from which a user 20* can at least be audibly detected by, for example, the user audible detecting module 209 using the one or more sensors 120 included with the computing device 10*.

As further illustrated in FIG. 5c, in various implementations, operation 519 may include one or more additional operations including, for example, an operation 520 for detecting the plurality of users being within a distance from the computing device from which a voice of a user can be audibly detected. For instance, the user detecting module 202 of the computing device 10* detecting the plurality of users 20* being within a distance from the computing device 10* from which a voice of a user can be audibly detected by, for example, the user audible detecting module 209. In some cases, the user audible detecting module 209 may employ a voice recognition system or software in order to facilitate such an operation.

In some implementations, operation 520 may include an operation 521 for detecting the plurality of users being within a distance from the computing device from which a voice of a user can be audibly detected as not belonging to a primary user of the computing device. For instance, the user detecting module 202 of the computing device 10* detecting the plurality of users 10* being within a distance from the computing device 10* from which a voice of a user 20* can be audibly detected by, for example, the user audible detecting module 209 as not belonging to a primary user of the computing device 10*.

In some instances, operation 521 may include an operation 522 for detecting the plurality of users being within a distance from the computing device from which a voice of a user can be audibly detected as belonging to a third party. For instance, the user detecting module 202 of the computing device 10* detecting the plurality of users 10* being within a distance from the computing device 10* from which a voice of a user can be audibly detected by, for example, the user audible detecting module 209 as belonging to a third party (e.g., a secondary user having inferior access rights to the one or more items than a primary user of the computing device 10*).

In some implementations, operation 520 may include an operation 523 for detecting the plurality of users being within a distance from the computing device from which a voice of a user can be audibly detected as belonging to a primary user of the computing device. For instance, the user detecting module 202 of the computing device 10* detecting the plurality of users 10* being within a distance from the computing device 10* from which a voice of a user 20* can be audibly detected by, for example, the user audible detecting module 209 as belonging to a primary user (e.g., owner) of the computing device 10*.

In various implementations, operation 509 for detecting the plurality of users being in the proximate vicinity of the computing device based, at least in part, on data provided by one or more sensors may include an operation 524 for detecting the plurality of users being in the proximate vicinity of the computing device by detecting presence of all users who are within a predefined distance from the computing device. For instance, the user detecting module 202 of the computing device 10* detecting the plurality of users 20* being in the proximate vicinity of the computing device 10* by detecting presence of all users who are within a predefined distance (e.g., within three feet, four feet, five feet, or within some other distance) from the computing device 10*.

Figure 5D:
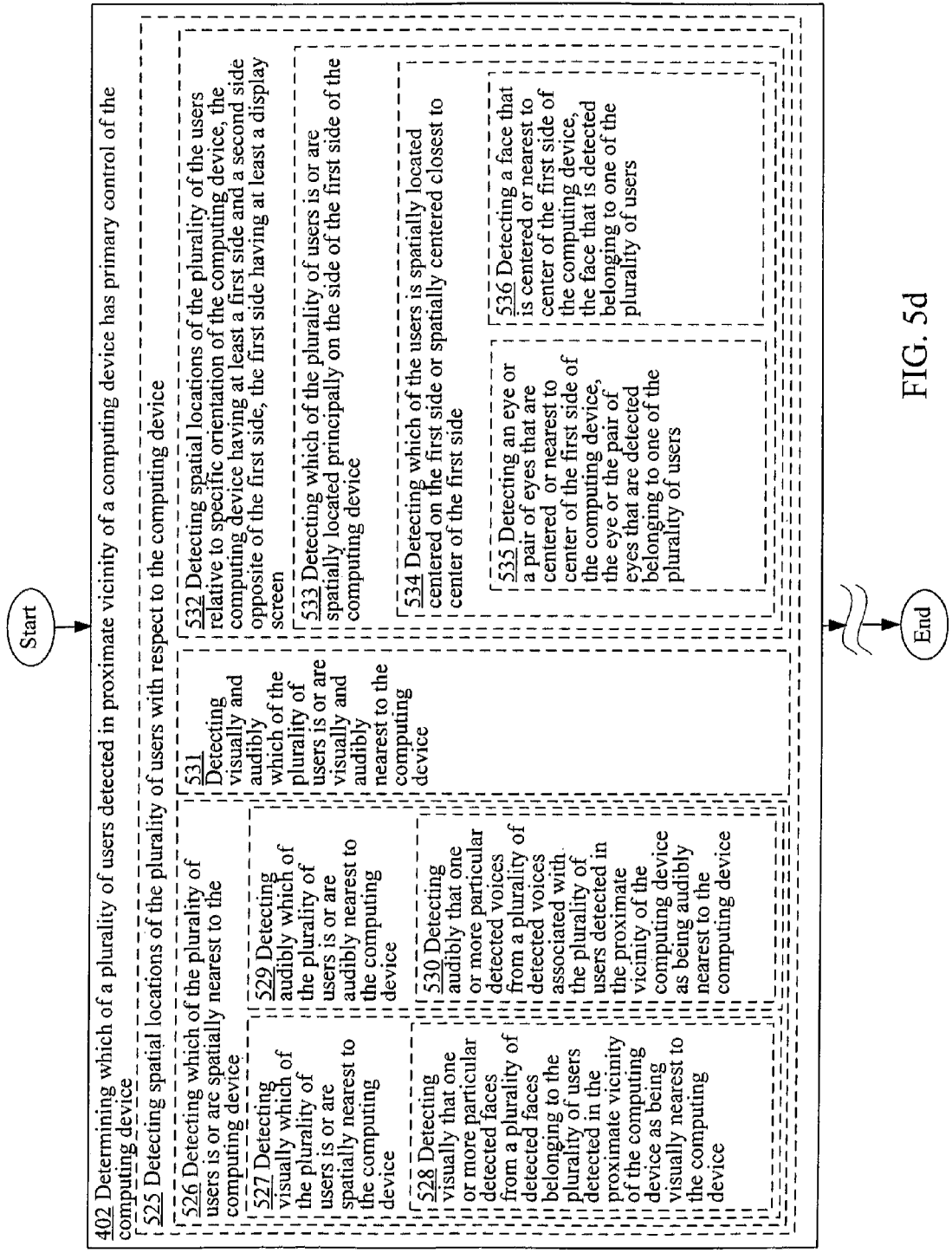
FIG. 5d is a high-level logic flowchart of a process depicting alternate implementations of the primary control determining operation 402 of FIG. 4.

Turning to FIG. 5d, the primary control determining operation 402 of FIG. 4 may employ a number of different techniques in order to determine which of the plurality of users 20* detected in the proximate vicinity of the computing device 10* has primary control of the computing device 10*. For example, in various implementations, the primary control determining operation 402 may include an operation 525 for detecting spatial locations of the plurality of users with respect to the computing device. For instance, the user spatial location detecting module 210 (see FIG. 3c) of the computing device 10* detecting spatial locations of the plurality of users 20* with respect to the computing device 10* (e.g., detecting spatial locations of the plurality of users 20* with respect to the side of the computing device 10* that comprises a display screen 12.

As further illustrated in FIG. 5d, operation 525 may include one or more additional operations in various alternative implementations. For example, in some cases, operation 525 may include an operation 526 for detecting which of the plurality of users is or are spatially nearest to the computing device. For instance, the nearest user detecting module 211 (see FIG. 2c) of the computing device 10* of FIG. 3a or FIG. 3b detecting which of the plurality of users 20* is or are spatially nearest to the computing device 10*. In some cases, those users 20* determined to be spatially nearest to the computing device 10* may at least be inferred as having primary control of the computing device 10*.

In some cases operation 526 may include an operation 527 for detecting visually which of the plurality of users is or are spatially nearest to the computing device. For instance, the visual nearest user detecting module 212 (see FIG. 3c) of the computing device 10* detecting visually via, for example, one or more visual sensors 124, which of the plurality of users 20* is or are spatially nearest to the computing device 10*.

In some cases, operation 527 may further include an operation 528 for detecting visually that one or more particular detected faces from a plurality of detected faces belonging to the plurality of users detected in the proximate vicinity of the computing device as being visually nearest to the computing device. For instance, the visual nearest user detecting module 212 of the computing device 10* detecting visually that one or more particular detected faces from a plurality of detected faces belonging to the plurality of users 20* detected in the proximate vicinity of the computing device 10* as being visually nearest to the computing device 10*. In other words, the visual nearest user detecting module 212 may detect which faces of the plurality of users 20* detected in the proximate vicinity of the computing device 10* as being visually nearest to the computing device 10*.

In the same or different implementations, operation 526 for detecting which of the plurality of users is or are spatially nearest to the computing device may include an operation 529 for detecting audibly which of the plurality of users is or are audibly nearest to the computing device. For instance, the audible nearest user detecting module 213 (see FIG. 3c) of the computing device 10* detecting audibly via, for example, one or more audio sensors 126, which of the plurality of users 20* is or are audibly nearest to the computing device 10*.

As further illustrated in FIG. 5d, operation 529 may further include in some implementations an operation 530 for detecting audibly that one or more particular detected voices from a plurality of detected voices associated with the plurality of users detected in the proximate vicinity of the computing device as being audibly nearest to the computing device. For instance, the audible nearest user detecting module 213 of the computing device 10* detecting audibly that one or more particular detected voices from a plurality of detected voices associated with the plurality of users 20* detected in the proximate vicinity of the computing device 10* as being audibly nearest to the computing device 10*. In other words, the audible nearest user detecting module 213 may detect which voices of the plurality of users 20* detected in the proximate vicinity of the computing device 10* as being audibly originating from a point or points nearest to the computing device 10*.

In the same or different implementations, operation 529 may include an operation 531 for detecting visually and audibly which of the plurality of users is or are visually and audibly nearest to the computing device as further depicted in FIG. 5d. For instance, the visual nearest user detecting module 212 and the audible nearest user detecting module 213 of the computing device 10* respectively detecting visually and audibly which of the plurality of users 20* is or are visually and audibly nearest to the computing device 10*. Those determined to be nearest to the computing device 10* may be inferred as having primary control of the computing device 10* in some implementations.

In the same or different implementations, operation 525 may additionally or alternatively include an operation 532 for detecting spatial locations of the plurality of the users relative to specific orientation of the computing device, the computing device having at least a first side and a second side opposite of the first side, the first side having at least a display screen as further illustrated in FIG. 5d. For instance, the user spatial location detecting module 210 of the computing device 10* detecting spatial locations of the plurality of the users 20 relative to specific orientation of the computing device 10*, the computing device 10* having at least a first side 18 and a second side 19 opposite of the first side 18 (see, for example, FIG. 1), the first side 18 having at least a display screen 12.

As further illustrated in FIG. 5d, in some implementations, operation 532 may include one or more additional operations including an operation 533 for detecting which of the plurality of users is or are spatially located principally on the side of the first side of the computing device. For instance, the user spatial location detecting module 210 of the computing device 10* detecting which of the plurality of users 20* is or are spatially located principally on the side of the first side 18 of the computing device 10*.

In some cases, operation 533 may further include an operation 534 for detecting which of the users is spatially located centered on the first side or spatially centered closest to center of the first side. For instance; the centered detecting module 214 (see FIG. 3c) of the computing device 10* detecting which of the users 20* is spatially located centered on the first side 18 or spatially centered closest to center 17 of the first side 18.

In some implementations, operation 534 may include an operation 535 for detecting an eye or a pair of eyes that are centered or nearest to center of the first side of the computing device, the eye or the pair of eyes that are detected belonging to one of the plurality of users. For instance, the centered detecting module 214 (see FIG. 3c) of the computing device 10* detecting an eye or a pair of eyes (e.g., iris or a pair of irises) that are centered or nearest to center 17 of the first side 18 of the computing device 10*, the eye or the pair of eyes that are detected belonging to one of the plurality of users 20*.

In the same or different implementations, operation 534 may include an operation 536 for detecting a face that is centered or nearest to center of the first side of the computing device, the face that is detected belonging to one of the plurality of users. For instance, the centered detecting module 214 (see FIG. 3c) of the computing device 10* detecting a face that is centered or nearest to center 17 of the first side 18 of the computing device 10*, the face that is detected belonging to one of the plurality of users 20*.

Figure 5E:
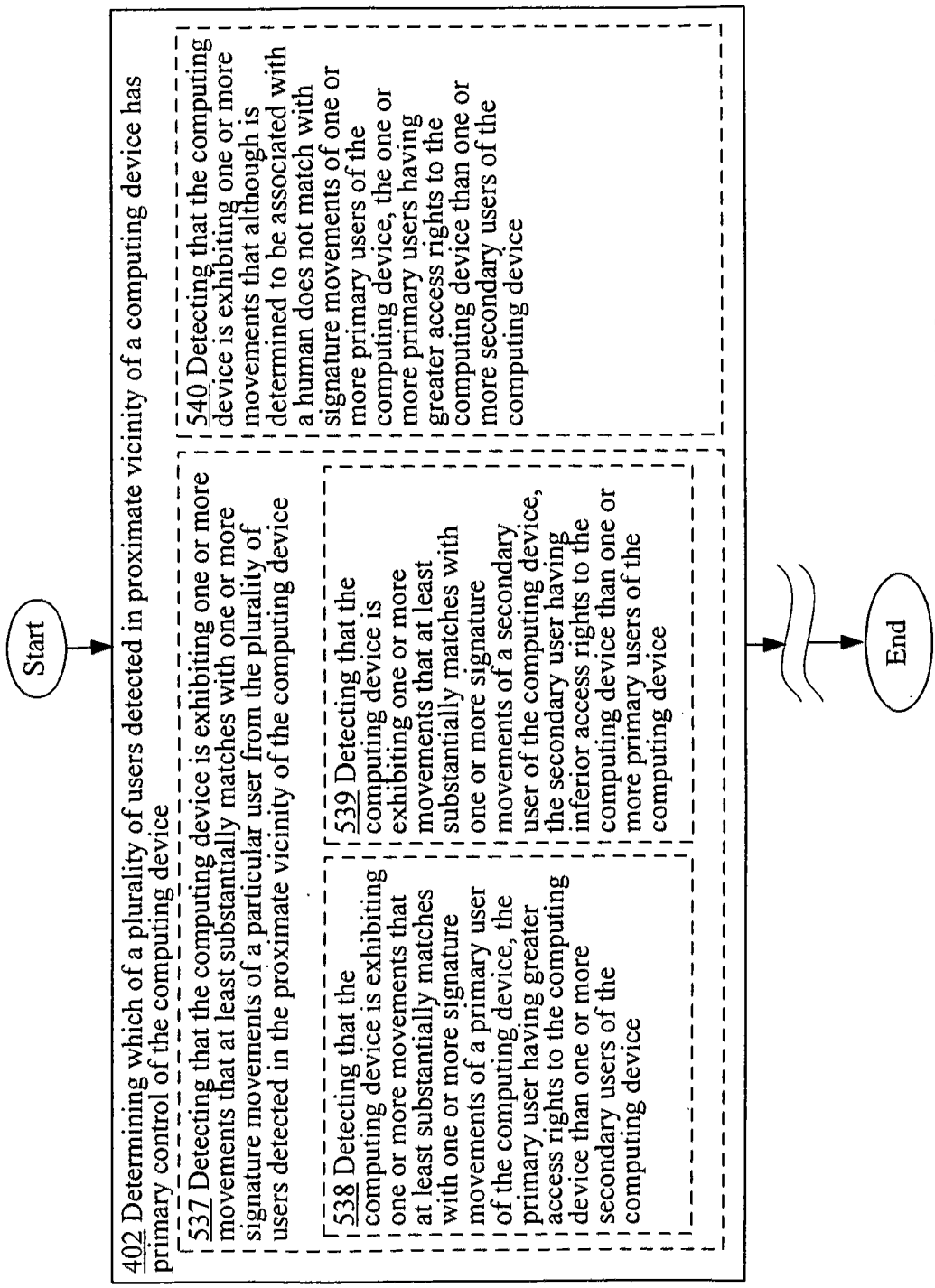
FIG. 5e is a high-level logic flowchart of a process depicting alternate implementations of the primary control determining operation 402 of FIG. 4.

In some implementations, in order to determine which user 20* detected in the proximate vicinity of the computing device 10* has primary control of the computing device 10* the primary control determining operation 402 of FIG. 4 may include one or more operations for detecting movements of the computing device 10*. For example, in some cases, the primary control determining operation 402 may include an operation 537 for detecting that the computing device is exhibiting one or more movements that at least substantially matches with one or more signature movements of a particular user from the plurality of users detected in the proximate vicinity of the computing device as illustrated in FIG. 5e. For instance, the movement detecting module 216 (see FIG. 3c) of the computing device 10* detecting that the computing device 10* is exhibiting one or more movements that at least substantially matches with one or more signature movements (e.g., heart beat or pulse rate) of a particular user 20* from the plurality of users 20* detected in the proximate vicinity of the computing device 10*. Such detected movements of the computing device 10* may be as a result of the computing device 10* being in contact with the particular user 20*.

As further illustrated in FIG. 5e, operation 537 may, in some implementations, include an operation 538 for detecting that the computing device is exhibiting one or more movements that at least substantially matches with one or more signature movements of a primary user of the computing device, the primary user having greater access rights to the computing device than one or more secondary users of the computing device. For instance, the movement detecting module 216 of the computing device 10* detecting that the computing device 10* is exhibiting one or more movements that at least substantially matches with one or more signature movements of a primary user of the computing device 10*, the primary user (e.g., owner of the computing device 10*) having greater access rights to the computing device 10* than one or more secondary users of the computing device 10*.

In the same or different implementations, operation 537 may include an operation 539 for detecting that the computing device is exhibiting one or more movements that at least substantially matches with one or more signature movements of a secondary user of the computing device, the secondary user having inferior access rights to the computing device than one or more primary users of the computing device. For instance, the movement detecting module 216 of the computing device 10* detecting that the computing device 10* is exhibiting one or more movements that at least substantially matches with one or more signature movements of a secondary user of the computing device 10*, the secondary user having inferior access rights to the computing device 10* than one or more primary users of the computing device 10*.

In the same or different implementations, primary control determining operation 402 of FIG. 4 may include an operation 540 for detecting that the computing device is exhibiting one or more movements that although is determined to be associated with a human does not match with signature movements of one or more primary users of the computing device, the one or more primary users having greater access rights to the computing device than one or more secondary users of the computing device as illustrated. For instance, the movement detecting module 216 of the computing device 10* detecting that the computing device 10* is exhibiting one or more movements that although is determined to be associated with a human (e.g., exhibiting movements such as vibration caused by the pulse or heart rate of a human user when the human user is in contact with the computing device 10*) does not match with signature movements of one or more primary users of the computing device 10*, the one or more primary users having greater access rights to the computing device 10* than one or more secondary users of the computing device 10*. Such an operation may be particularly relevant, for example, when there is only interest in determining whether a primary user of the computing device 10* does or does not have primary control of the computing device 10*. That is, in some implementations, there may only be two available levels of access to the one or more items, one level of access when a primary user has primary control of the computing device 10* and a second level of access whenever the primary user does not have primary control of the computing device 10*.

Figure 6A:
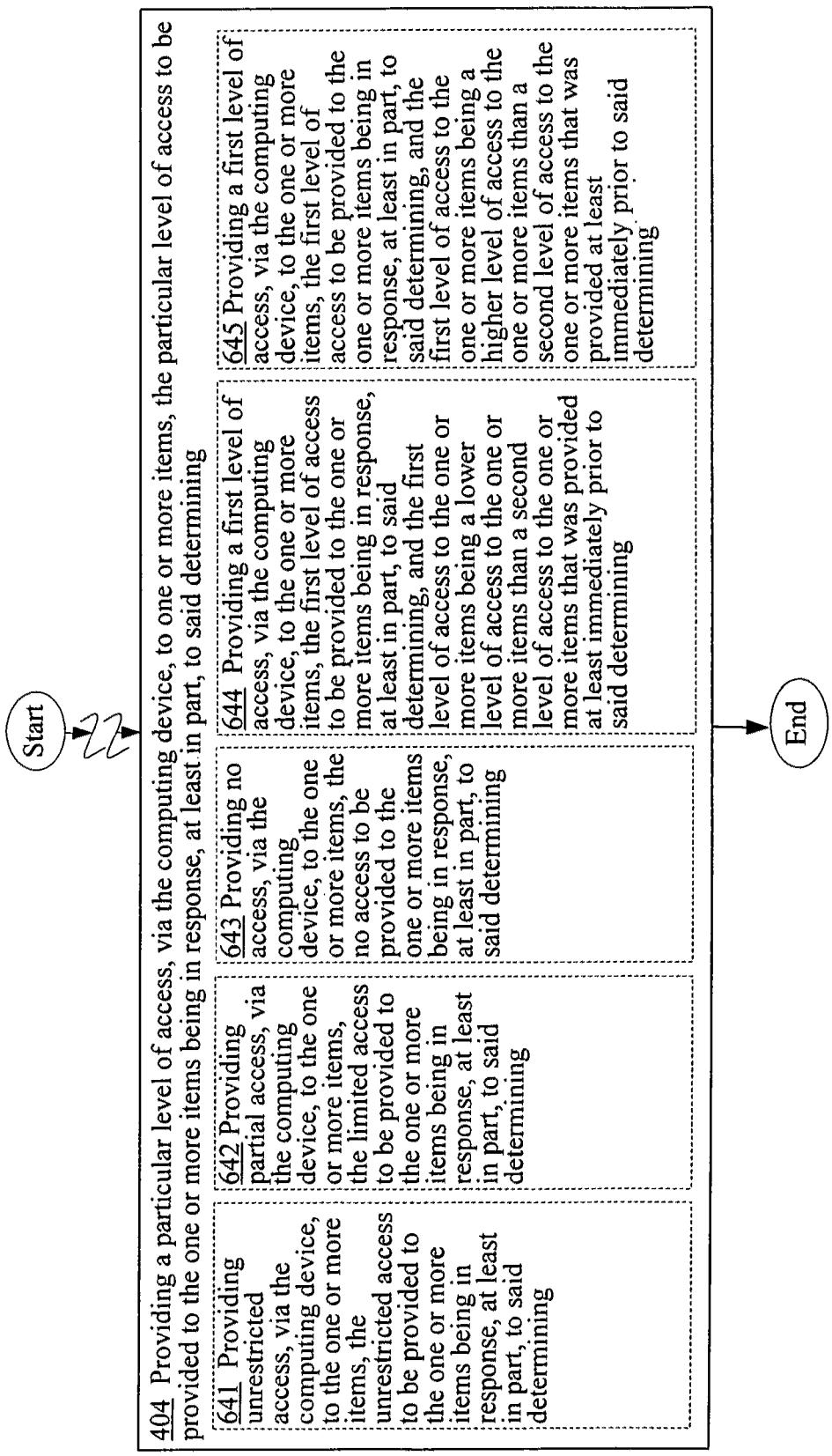
FIG. 6a is a high-level logic flowchart of a process depicting alternate implementations of the access providing operation 404 of FIG. 4.

Referring back to the access providing operation 404 of FIG. 4, the access providing operation 404 similar to the primary control determining operation 402 of FIG. 4 may be executed in a number of different ways in various alternative embodiments as illustrated in FIGS. 6a, 6b, 6c, 6d, 6e, 6f, 6g, and 6h. For example, various levels of access as well as various types of access to the one or more items may be provided by the access process operation 404 in various alternative implementations. In some implementations, for example, the access providing operation 404 of FIG. 4 may include an operation 641 for providing unrestricted access, via the computing device, to the one or more items, the unrestricted access to be provided to the one or more items being in response, at least in part, to said determining as illustrated in FIG. 6a. For instance, the access providing module 104* of the computing device 10*(e.g., the computing device 10' of FIG. 3a or the computing device 10" of FIG. 3b) providing unrestricted access, via the computing device 10*, to the one or more items (e.g., one or more applications, documents, image or audio files, textual or audio messages, passwords, and so forth), the unrestricted access to be provided to the one or more items being in response, at least in part, to said determining which of the plurality of users 20* detected in the proximate vicinity of the computing device 10* has primary control of the computing device 10*.

In some implementations, the access providing operation 404 may include an operation 642 for providing partial access, via the computing device, to the one or more items, the limited access to be provided to the one or more items being in response, at least in part, to said determining. For instance, the access providing module 104* of the computing device 10* providing partial access (e.g., restricted access), via the computing device 10*, to the one or more items, the limited access to be provided to the one or more items being in response, at least in part, to said determining which of the plurality of users 20* detected in the proximate vicinity of the computing device 10* has primary control of the computing device 10*.

In some implementations, the access providing operation 404 may include an operation 643 for providing no access, via the computing device, to the one or more items, the no access to be provided to the one or more items being in response, at least in part, to said determining as further depicted in FIG. 6a. For instance, the access providing module 104* of the computing device 10* providing no access, via the computing device 10*, to the one or more items, the no access to be provided to the one or more items being in response, at least in part, to said determining which of the plurality of users 20* detected in the proximate vicinity of the computing device 10* has primary control of the computing device 10*.

In some implementations, the access providing operation 404 may additionally or alternatively include an operation 644 for providing a first level of access, via the computing device, to the one or more items, the first level of access to be provided to the one or more items being in response, at least in part, to said determining, and the first level of access to the one or more items being a lower level of access to the one or more items than a second level of access to the one or more items that was provided at least immediately prior to said determining. For instance, the access providing module 104* of the computing device 10* providing a first level of access, via the computing device 10*, to the one or more items (e.g., productivity documents such as a word processing document), the first level of access to be provided to the one or more items being in response, at least in part, to said determining which of the plurality of users 20* detected in the proximate vicinity of the computing device 10* has primary control of the computing device 10*, and the first level of access (e.g., read-only access) to the one or more items being a lower (diminished or reduced) level of access to the one or more items than a second level of access (e.g., full editorial access) to the one or more items that was provided via the computing device 10* at least immediately prior to said determining.

In some implementations, the access providing operation 404 may alternatively include an operation 645 for providing a first level of access, via the computing device, to the one or more items, the first level of access to be provided to the one or more items being in response, at least in part, to said determining, and the first level of access to the one or more items being a higher level of access to the one or more items than a second level of access to the one or more items that was provided at least immediately prior to said determining. For instance, the access providing module 104* of the computing device 10* providing a first level of access, via the computing device 10*, to the one or more items (e.g., image or audio files), the first level of access to be provided to the one or more items being in response, at least in part, to said determining which of the plurality of users 20* detected in the proximate vicinity of the computing device 10* has primary control of the computing device 10*, and the first level of access (e.g., viewing or audio access) to the one or more items being a higher level of access to the one or more items than a second level of access (e.g., no viewing or audio access) to the one or more items that was provided at least immediately prior to said determining.

Figure 6B:
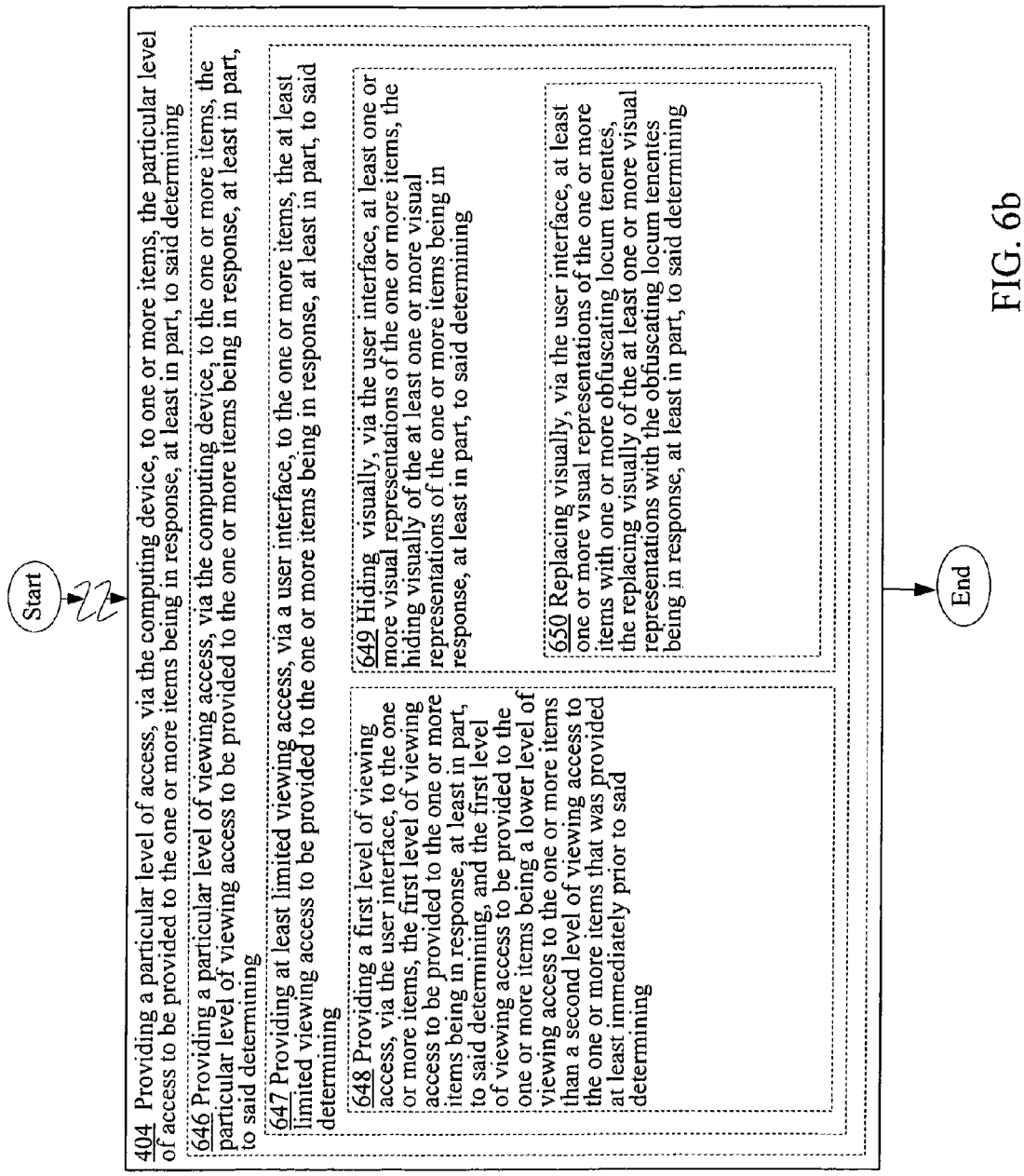
FIG. 6b is a high-level logic flowchart of a process depicting alternate implementations of the access providing operation 404 of FIG. 4.

Referring to FIG. 6b, in various implementations, the access providing operation 404 of FIG. 4 may include an operation 646 for providing a particular level of viewing access, via the computing device, to the one or more items, the particular level of viewing access to be provided to the one or more items being in response, at least in part, to said determining. For instance, the viewing access providing module 230 (see FIG. 3d) of the computing device 10* providing a particular level of viewing access (e.g., full, partial, or no viewing access), via the computing device 10*, to the one or more items (e.g., email message), the particular level of viewing access to be provided to the one or more items being in response, at least in part, to said determining which of the plurality of users 20* detected in the proximate vicinity of the computing device 10* has primary control of the computing device 10*.

In some cases, and as illustrated in FIG. 6b, operation 646 may include an operation 647 for providing at least limited viewing access, via a user interface, to the one or more items, the at least limited viewing access to be provided to the one or more items being in response, at least in part, to said determining. For instance, the viewing access providing module 230 of the computing device 10* providing at least limited viewing access, via a user interface 110 (e.g., a display screen), to the one or more items (e.g., email messages), the at least limited viewing access (e.g., display only subject headings of the messages) to be provided to the one or more items being in response, at least in part, to said determining which of the plurality of users 20* detected in the proximate vicinity of the computing device 10* has primary control of the computing device 10*.

As further depicted in FIG. 6b, in various implementations, operation 647 may, in turn, include one or more additional operations including, for example, an operation 648 for providing a first level of viewing access, via the user interface, to the one or more items, the first level of viewing access to be provided to the one or more items being in response, at least in part, to said determining, and the first level of viewing access to be provided to the one or more items being a lower level of viewing access to the one or more items than a second level of viewing access to the one or more items that was provided at least immediately prior to said determining. For instance, the viewing access providing module 230 of the computing device 10* providing a first level of viewing access, via the user interface 110, to the one or more items (e.g., digital images), the first level of viewing access to be provided to the one or more items being in response, at least in part, to said determining which of the plurality of users 20* detected in the proximate vicinity of the computing device 10* has primary control of the computing device 10*, and the first level of viewing access (e.g., no viewing access) to be provided to the one or more items being a lower level of viewing access to the one or more items than a second level of viewing access (e.g., full viewing access) to the one or more items that was provided at least immediately prior to said determining.

In some cases, operation 647 may include an operation 649 for hiding visually, via the user interface, at least one or more visual representations of the one or more items, the hiding visually of the at least one or more visual representations of the one or more items being in response, at least in part, to said determining. For instance, the visual hiding module 232 (see FIG. 3d) of the computing device 10* hiding visually (disguising or obfuscating visually), via the user interface 110 (e.g., a display screen such as a touchscreen), at least one or more visual representations (e.g., name of an electronic document or subject heading of an email message or the electronic document or email message itself) of the one or more items (e.g., electronic document or email message), the hiding visually of the at least one or more visual representations of the one or more items being in response, at least in part, to said determining which of the plurality of users 20* detected in the proximate vicinity of the computing device 10* has primary control of the computing device 10*.

It is noteworthy to note at this time that many if not most items (e.g., electronic documents, image or audio files, software applications, and so forth) that may presented via a computing device 10* are usually presented, at least initially, by presenting the name, tile, or other representations of the items in, for example, an index, a dropdown menu, or the desktop of a graphical user interface (GUI). Thus, in order to hide the existence of a particular item (e.g., a document or an application), one may only need to hide or disguise all representations of the particular item that may exist in the index, menu, or the desktop of the GUI. In order to disguise a representation of the particular item that may be included in, for example, an index, the representation (e.g., a name of a file) may be replaced with a substitute representation (e.g., an obfuscating locum tenens) to hide the existence of the particular item.

As further illustrated in FIG. 6b, operation 649 may, in turn, include an operation 650 for replacing visually, via the user interface, at least one or more visual representations of the one or more items with one or more obfuscating locum tenentes, the replacing visually of the at least one or more visual representations with the obfuscating locum tenentes being in response, at least in part, to said determining. For instance, the visual representation replacing module 234 (see FIG. 3d) of the computing device 10* replacing visually, via the user interface 110, at least one or more visual representations (sender's name or subject heading) of the one or more items (e.g., email messages) with one or more obfuscating locum tenentes (e.g., fictional name or fictional subject heading), the replacing visually of the at least one or more visual representations with the obfuscating locum tenentes being in response, at least in part, to said determining.

Figure 6C:
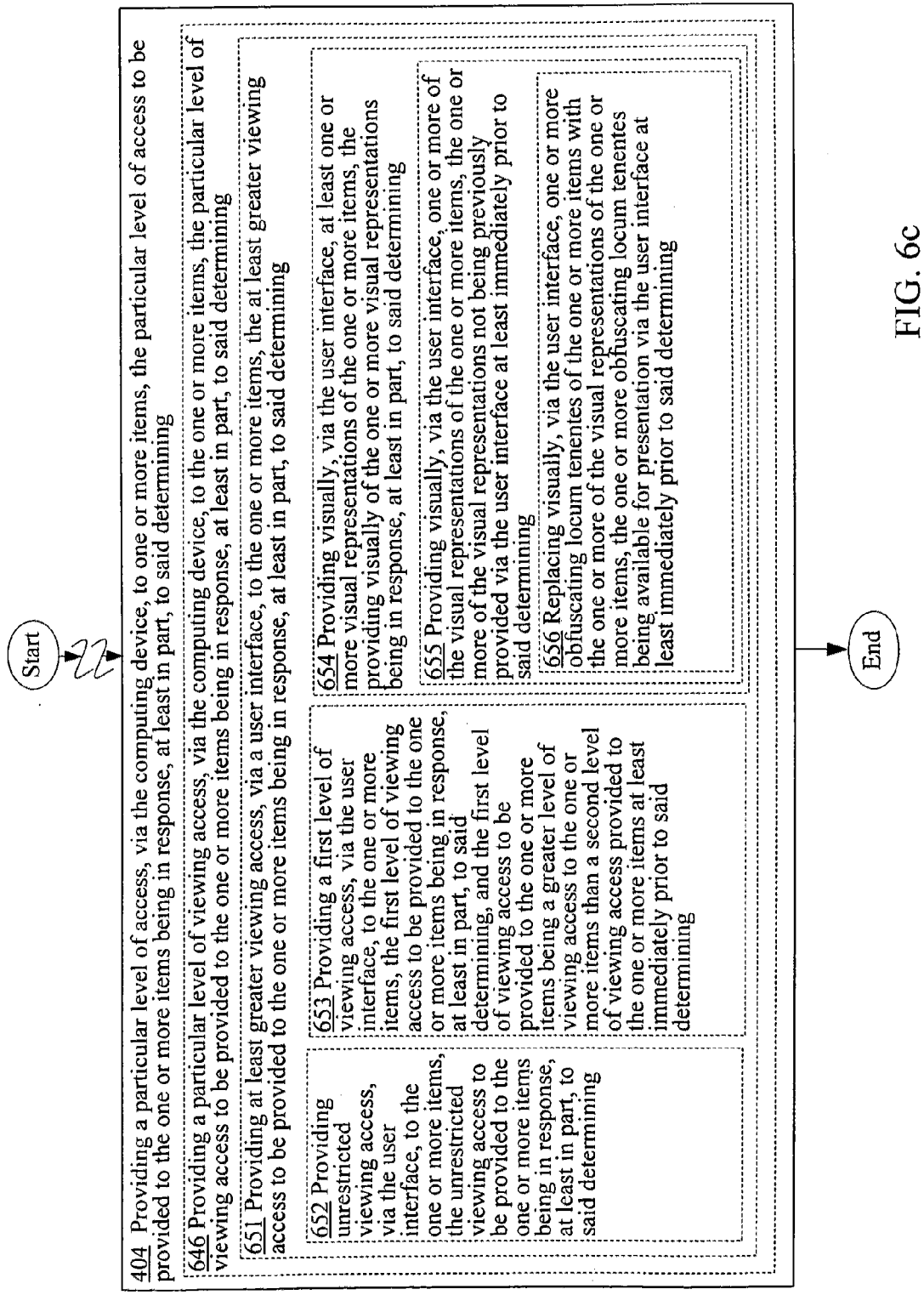
FIG. 6c is a high-level logic flowchart of a process depicting alternate implementations of the access providing operation 404 of FIG. 4.

Turning now to FIG. 6c, in some instances, operation 646 for providing a particular level of viewing access, via the computing device, to the one or more items, the particular level of viewing access to be provided to the one or more items being in response, at least in part, to said determining may include an operation 651 for providing at least greater viewing access, via a user interface, to the one or more items, the at least greater viewing access to be provided to the one or more items being in response, at least in part, to said determining. For instance, the viewing access providing module 230 of the computing device 10* providing at least greater viewing access, via a user interface 110, to the one or more items (e.g., an email message), the at least greater viewing access (e.g., partial or full viewing access) to be provided to the one or more items being in response, at least in part, to said determining which of the plurality of users 20* detected in the proximate vicinity of the computing device 10* has primary control of the computing device 10*. For example, if the one or more items that the greater viewing access is to be provided to include an email message, then providing access to such an item such that only the subject heading of the email message is viewable (e.g., partial viewing access) or providing access such that the entire email message is viewable (e.g., full viewing access).

As further illustrated in FIG. 6c, operation 651 may include one or more additional operations in various alternative implementations. For example, in some implementations, operation 651 may include an operation 652 for providing unrestricted viewing access, via the user interface, to the one or more items, the unrestricted viewing access to be provided to the one or more items being in response, at least in part, to said determining. For instance, the viewing access providing module 230 of the computing device 10* providing unrestricted viewing access, via the user interface 110, to the one or more items, the unrestricted viewing access to be provided to the one or more items being in response, at least in part, to said determining.

In the same or different implementations, operation 651 may involve an operation 653 for providing a first level of viewing access, via the user interface, to the one or more items, the first level of viewing access to be provided to the one or more items being in response, at least in part, to said determining, and the first level of viewing access to be provided to the one or more items being a greater level of viewing access to the one or more items than a second level of viewing access provided to the one or more items at least immediately prior to said determining. For instance, the viewing access providing module 230 of the computing device 10* providing a first level of viewing access, via the user interface 110, to the one or more items, the first level of viewing access to be provided to the one or more items being in response, at least in part, to said determining, and the first level of viewing access to be provided to the one or more items being a greater level of viewing access to the one or more items than a second level of viewing access provided to the one or more items at least immediately prior to said determining.

In the same or different implementations, operation 651 may additionally or alternatively include an operation 654 for providing visually, via the user interface, at least one or more visual representations of the one or more items, the providing visually of the one or more visual representations being in response, at least in part, to said determining. For instance, the visual representation providing module 236 (see FIG. 3d) of the computing device 10* providing visually, via the user interface 110, at least one or more visual representations (e.g., subject headings or titles) of the one or more items (e.g., productivity documents or text messages), the providing visually of the one or more visual representations being in response, at least in part, to said determining. Note that in some cases, the providing visually of the one or more visual representations of the one or more items may be achieved by simply providing visually the one or more items themselves. For example, if the one or more items include a text message or an instant message, then providing the one or more visual representations by visually presenting the text message or instant message themselves.

In some implementations, operation 654 may further include an operation 655 for providing visually, via the user interface, one or more of the visual representations of the one or more items, the one or more of the visual representations not being previously provided via the user interface at least immediately prior to said determining. For instance, the visual representation providing module 236 of the computing device 10* providing visually, via the user interface 110 (e.g., a touch screen), one or more of the visual representations (e.g., subject heading or name of sender of an email message) of the one or more items, the one or more of the visual representations not being previously provided via the user interface 110 at least immediately prior to said determining which of the plurality of users 20* detected in the proximate vicinity of the computing device 10* has primary control of the computing device 10*.

In some cases, operation 655 may, in turn, further include an operation 656 for replacing visually, via the user interface, one or more obfuscating locum tenentes of the one or more items with the one or more of the visual representations of the one or more items, the one or more obfuscating locum tenentes being available for presentation via the user interface at least immediately prior to said determining. For instance, the locum tenentes replacing module 238 (see FIG. 3d) of the computing device 10* replacing visually, via the user interface 110, one or more obfuscating locum tenentes (e.g., obfuscating substitute representations) of the one or more items with the one or more of the true visual representations of the one or more items, the one or more obfuscating locum tenentes being available for presentation via the user interface 110 at least immediately prior to said determining. For example, replacing fake names of electronic documents that may be displayed through the user interface 110 (e.g., a touch screen) with the true or actual names of the electronic documents.

Figure 6D:
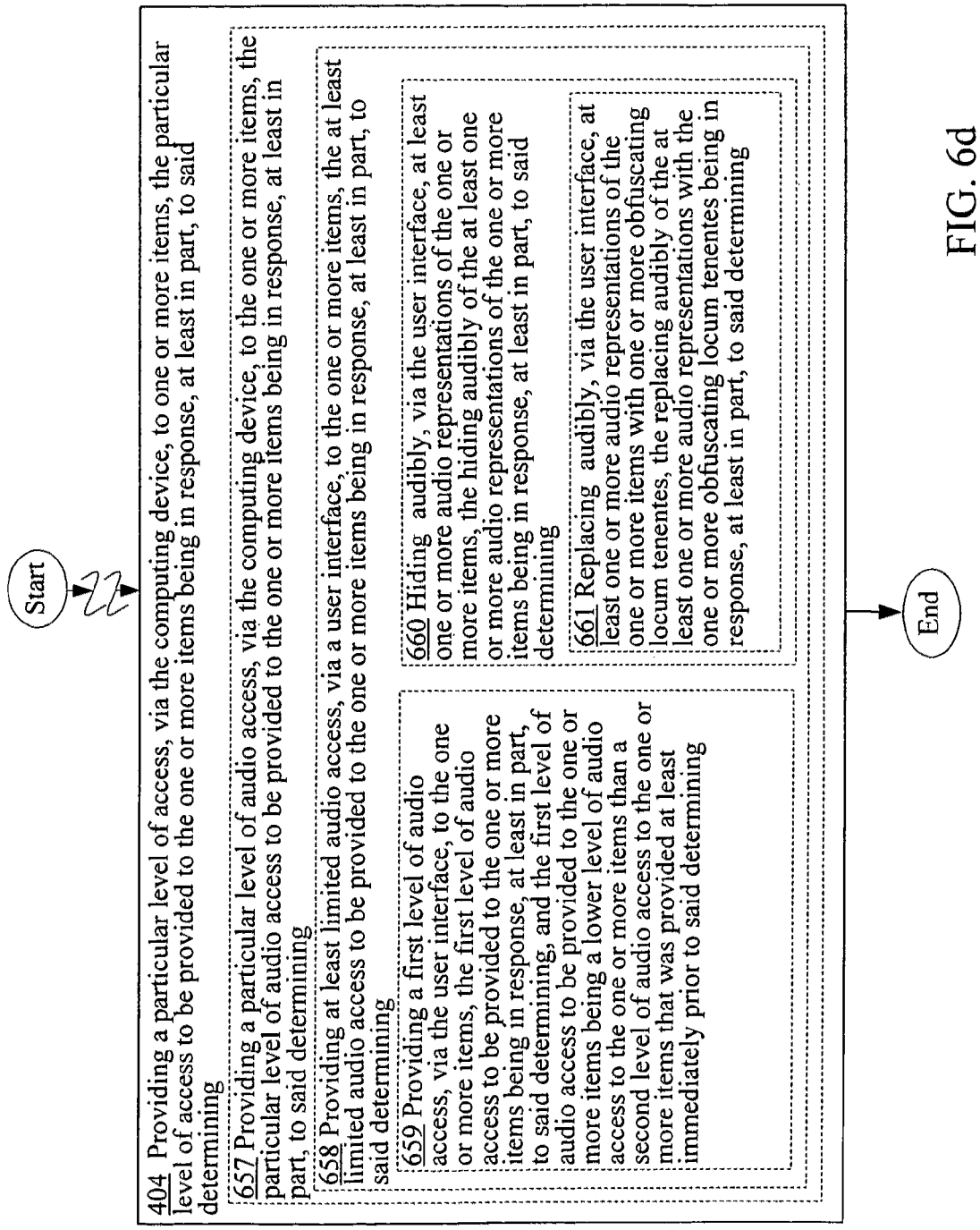
FIG. 6d is a high-level logic flowchart of a process depicting alternate implementations of the access providing operation 404 of FIG. 4.

Referring now to FIG. 6d, in some implementations, the access providing operation 404 of FIG. 4 may include an operation 657 for providing a particular level of audio access, via the computing device, to the one or more items, the particular level of audio access to be provided to the one or more items being in response, at least in part, to said determining. For instance, the audio access providing module 240 (see FIG. 3*d*) of the computing device 10* providing a particular level of audio access (e.g., full, partial, or no audio access), via the computing device 10*, to the one or more items, the particular level of audio access to be provided to the one or more items being in response, at least in part, to said determining which of the plurality of users 20* detected in the proximate vicinity of the computing device 10* has primary control of the computing device 10*.

As further illustrated in FIG. 6*d*, in some implementations, operation 657 may include an operation 658 for providing at least limited audio access, via a user interface, to the one or more items, the at least limited audio access to be provided to the one or more items being in response, at least in part, to said determining. For instance, the audio access providing module 240 of the computing device 10* providing at least limited audio access, via a user interface 110, to the one or more items (e.g., a video file), the at least limited audio access to be provided to the one or more items being in response, at least in part, to said determining.

In various implementations, operation 658 may include one or more additional operations including, for example, an operation 659 for providing a first level of audio access, via the user interface, to the one or more items, the first level of audio access to be provided to the one or more items being in response, at least in part, to said determining, and the first level of audio access to be provided to the one or more items being a lower level of audio access to the one or more items than a second level of audio access to the one or more items that was provided at least immediately prior to said determining. For instance, the audio access providing module 240 of the computing device 10* providing a first level of audio access, via the user interface 110, to the one or more items, the first level of audio access to be provided to the one or more items being in response, at least in part, to said determining which of the plurality of users 20* detected in the proximate vicinity of the computing device 10* has primary control of the computing device 10*, and the first level of audio access to be provided to the one or more items being a lower (e.g., diminished) level of audio access to the one or more items than a second level of audio access to the one or more items that was provided at least immediately prior to said determining.

In the same or different implementations, operation 658 may include an operation 660 for hiding audibly, via the user interface, at least one or more audio representations of the one or more items, the hiding audibly of the at least one or more audio representations of the one or more items being in response, at least in part, to said determining. For instance, the audio hiding module 242 (see FIG. 3*d*) of the computing device 10* hiding audibly, via the user interface 110 (e.g., one or more speakers), at least one or more audio representations of the one or more items (e.g., one or more voice messages), the hiding audibly of the at least one or more audio representations of the one or more items being in response, at least in part, to said determining. For example, if the one or more items include one or more voice messages then the one or more audio representations may be hidden by hiding all or some audio indications (e.g., a ring or a synthesized voice indicator) of existence of such messages.

In some cases, operation 660 may further include an operation 661 for replacing audibly, via the user interface, at least one or more audio representations of the one or more items with one or more obfuscating locum tenentes, the replacing audibly of the at least one or more audio representations with the one or more obfuscating locum tenentes being in response, at least in part, to said determining. For instance, the audio representation replacing module 244 (see FIG. 3*d*) of the computing device 10* replacing audibly, via the user interface 110, at least one or more audio representations (e.g., true or actual audio representations) of the one or more items with one or more obfuscating locum tenentes, the replacing audibly of the at least one or more audio representations with the one or more obfuscating locum tenentes being in response, at least in part, to said determining. For example, if the one or more items include one or more voice messages, than replacing the true or actual voice of the voice messages with a substitute voice or altered version of the true or actual voice.

Figure 6E:
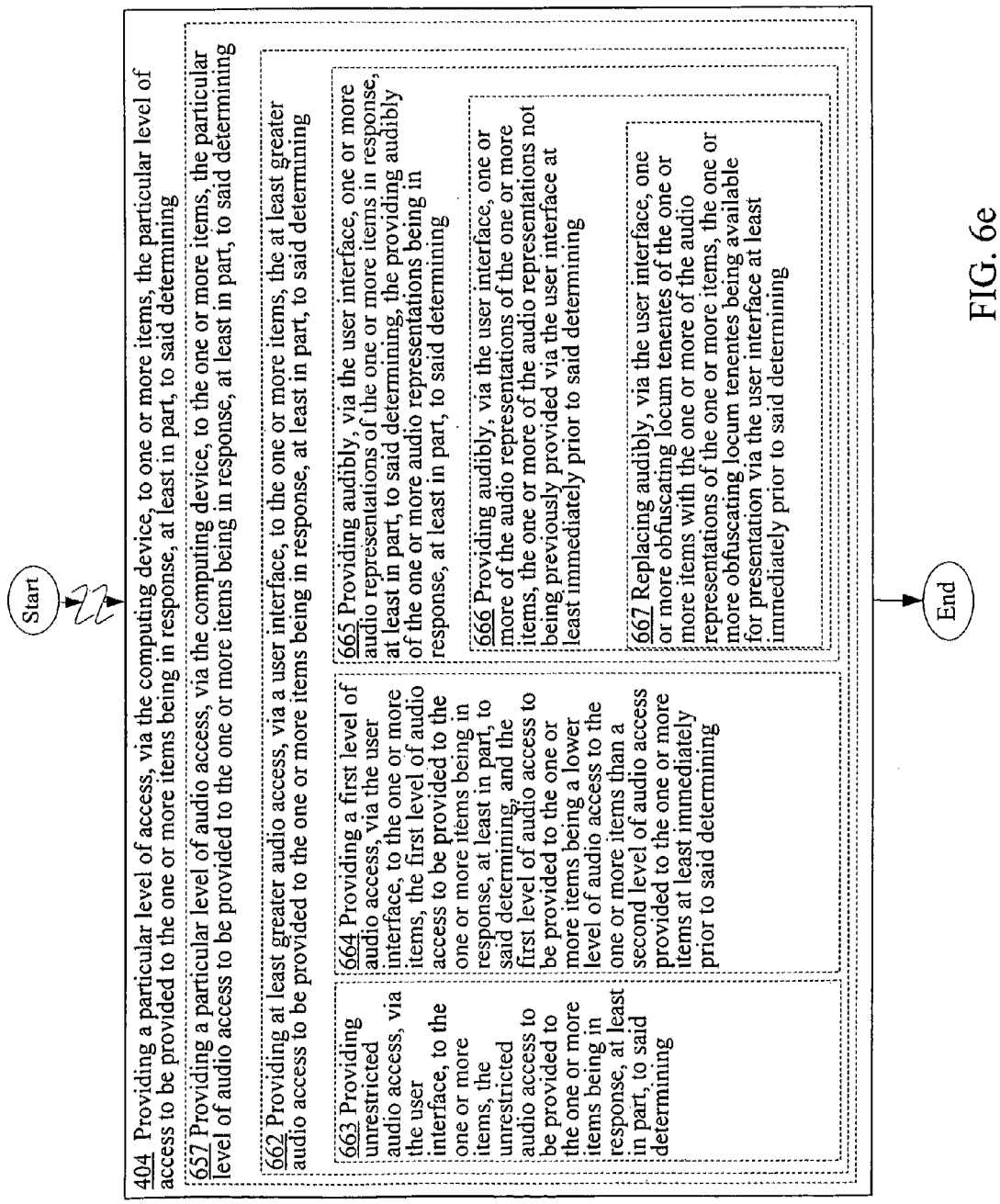
FIG. 6e is a high-level logic flowchart of a process depicting alternate implementations of the access providing operation 404 of FIG. 4.

As illustrated in FIG. 6*e*, in some implementations, operation 657 for providing a particular level of audio access, via the computing device, to the one or more items, the particular level of audio access to be provided to the one or more items being in response, at least in part, to said determining may include an operation 662 for providing at least greater audio access, via a user interface, to the one or more items, the at least greater audio access to be provided to the one or more items being in response, at least in part, to said determining. For instance, the audio access providing module 240 of the computing device 10* providing at least greater audio access, via a user interface 110, to the one or more items than the audio access that was provided to the one or more items immediately prior to said determining, the at least greater audio access to be provided to the one or more items being in response, at least in part, to said determining.

As further illustrated in FIG. 6*e*, operation 662 may include one or more additional operations in various alternative implementations. For example, in some implementations, operation 662 may include an operation 663 for providing unrestricted audio access, via the user interface, to the one or more items, the unrestricted audio access to be provided to the one or more items being in response, at least in part, to said determining. For instance, the audio access providing module 240 of the computing device 10* providing unrestricted audio access, via the user interface 110, to the one or more items, the unrestricted audio access to be provided to the one or more items being in response, at least in part, to said determining which of the plurality of users 20* detected in the proximate vicinity of the computing device 10* has primary control of the computing device 10*.

In the same or alternative implementations, operation 662 may include an operation 664 for providing a first level of audio access, via the user interface, to the one or more items, the first level of audio access to be provided to the one or more items being in response, at least in part, to said determining, and the first level of audio access to be provided to the one or more items being a lower level of audio access to the one or more items than a second level of audio access provided to the one or more items at least immediately prior to said determining. For instance, the audio access providing module 240 of the computing device 10* providing a first level of audio access, via the user interface 110, to the one or more items, the first level of audio access to be provided to the one or more items being in response, at least in part, to said determining which of the plurality of users 20* detected in the proximate vicinity of the computing device 10* has primary control of the computing device 10*, and the first level of audio access to be provided to the one or more items being a lower (reduced or diminished) level of audio access to the one or more items than a second level of audio access provided to the one or more items at least immediately prior to said determining.

In the same or alternative implementations, operation 662 may include an operation 665 for providing audibly, via the user interface, one or more audio representations of the one or more items in response, at least in part, to said determining, the providing audibly of the one or more audio representations being in response, at least in part, to said determining. For instance, the audio representation providing module 246 (see FIG. 3d) of the computing device 10* providing audibly, via the user interface 110, one or more audio representations of the one or more items in response, at least in part, to said determining, the providing audibly of the one or more audio representations being in response, at least in part, to said determining. The one or more audio representations of the one or more items that may be provided may come in a variety of different forms in various alternative implementations. For example, in cases where the one or more items are one or more voice messages, the one or more audio representations that may be provided may be the voice messages themselves or, alternatively, may merely be one or more audio pings (alerts) that indicate the existence of the voice messages.

In some cases, operation 665 may include an operation 666 for providing audibly, via the user interface, one or more of the audio representations of the one or more items, the one or more of the audio representations not being previously provided via the user interface at least immediately prior to said determining. For instance, the audio representation providing module 246 of the computing device 10* providing audibly, via the user interface 110, one or more of the audio representations of the one or more items, the one or more of the audio representations not being previously provided via the user interface 110 at least immediately prior to said determining.

As further illustrated in FIG. 6e, operation 666 in some instances may further include an operation 667 for replacing audibly, via the user interface, one or more obfuscating locum tenentes of the one or more items with the one or more of the audio representations of the one or more items, the one or more obfuscating locum tenentes being available for presentation via the user interface at least immediately prior to said determining. For instance, the locum tenentes replacing module 248 of the computing device 10* replacing audibly, via the user interface 110, one or more obfuscating locum tenentes (e.g., altered voice patterns) of the one or more items (e.g., voice message) with the one or more of the true audio representations (e.g., true voice pattern) of the one or more items, the one or more obfuscating locum tenentes being available for presentation via the user interface 110 at least immediately prior to said determining.

Figure 6F:
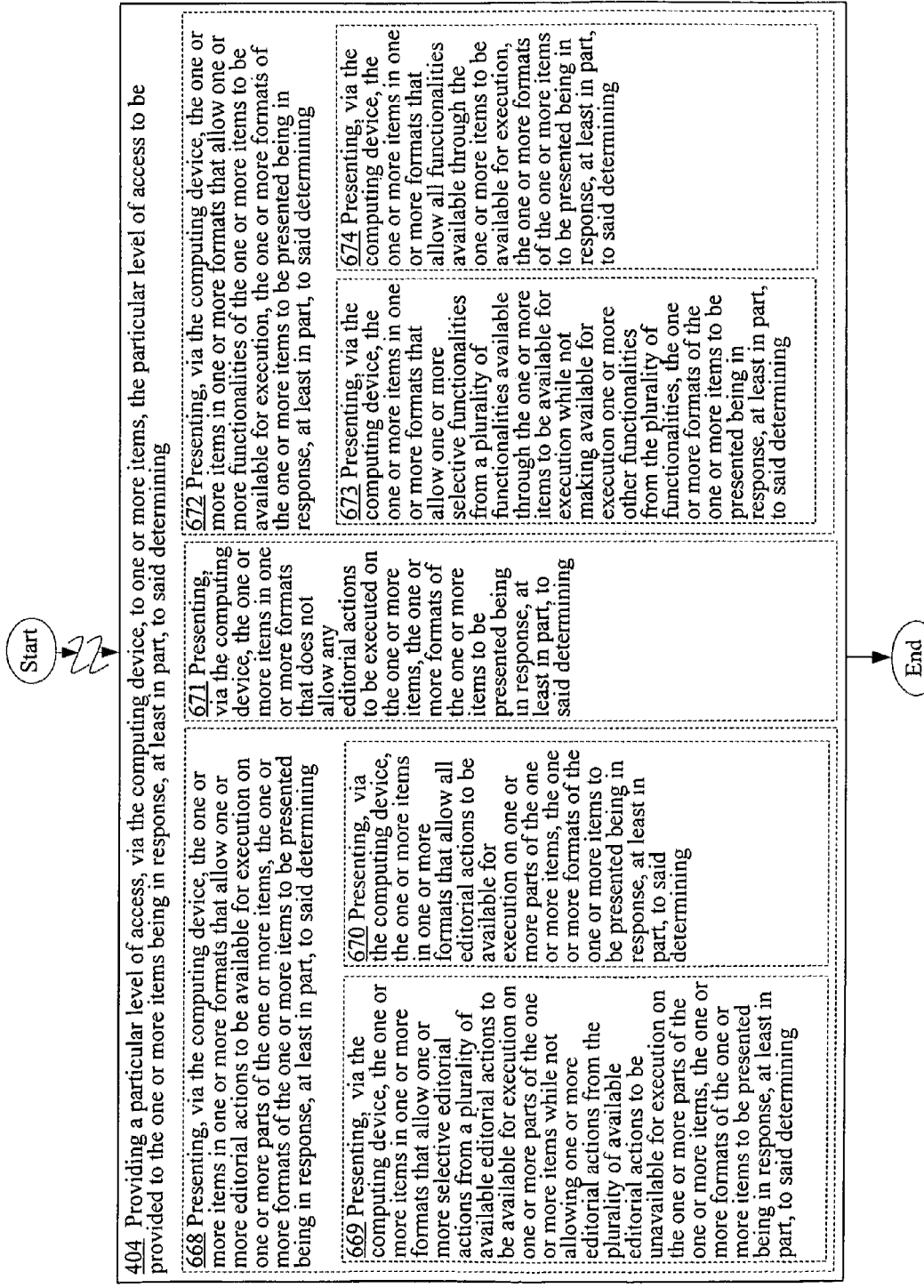
FIG. 6f is a high-level logic flowchart of a process depicting alternate implementations of the access providing operation 404 of FIG. 4.

Referring to now to FIG. 6f, the access providing operation 404 of FIG. 4 in various implementations may include an operation 668 for presenting, via the computing device, the one or more items in one or more formats that allow one or more editorial actions to be available for execution on one or more parts of the one or more items, the one or more formats of the one or more items to be presented being in response, at least in part, to said determining. For instance, the editable format presenting module 250 (see FIG. 3d) of the computing device 10* presenting (e.g., displaying), via the computing device 10*, the one or more items (e.g., word processing documents) in one or more formats that allow one or more editorial actions (e.g., modifications, addition, deletion, copying, etc.) to be available for execution on one or more parts of the one or more items, the one or more formats of the one or more items to be presented being in response, at least in part, to said determining which of the plurality of users 20* detected in the proximate vicinity of the computing device 10* has primary control of the computing device 10*.

In some cases, operation 668 may include an operation 669 for presenting, via the computing device, the one or more items in one or more formats that allow one or more selective editorial actions from a plurality of available editorial actions to be available for execution on one or more parts of the one or more items while not allowing one or more editorial actions from the plurality of available editorial actions to be unavailable for execution on the one or more parts of the one or more items, the one or more formats of the one or more items to be presented being in response, at least in part, to said determining. For instance, the editable format presenting module 250 (see FIG. 3d) of the computing device 10* presenting, via the computing device 10*, the one or more items (e.g., spreadsheet document) in one or more formats that allow one or more selective editorial actions (e.g., copying) from a plurality of available editorial actions to be available for execution on one or more parts of the one or more items while not allowing one or more editorial actions (e.g., adding or deleting) from the plurality of available editorial actions to be unavailable for execution on the one or more parts of the one or more items, the one or more formats of the one or more items to be presented being in response, at least in part, to said determining.

In some alternative implementations, operation 668 may alternatively include an operation 670 for presenting, via the computing device, the one or more items in one or more formats that allow all editorial actions to be available for execution on one or more parts of the one or more items, the one or more formats of the one or more items to be presented being in response, at least in part, to said determining. For instance, the editable format presenting module 250 (see FIG. 3d) of the computing device 10* presenting, via the computing device 10*, the one or more items in one or more formats that allow all editorial actions to be available for execution on one or more parts of the one or more items, the one or more formats of the one or more items to be presented being in response, at least in part, to said determining.

In some implementations, the access providing operation 404 of FIG. 4 may alternatively include an operation 671 for presenting, via the computing device, the one or more items in one or more formats that does not allow any editorial actions to be executed on the one or more items, the one or more formats of the one or more items to be presented being in response, at least in part, to said determining. For instance, the non-editable format presenting module 252 (see FIG. 3d) of the computing device 10* presenting, via the computing device 10*, the one or more items in one or more formats (e.g., read-only-format) that does not allow any editorial actions to be executed on the one or more items, the one or more formats of the one or more items to be presented being in response, at least in part, to said determining which of the plurality of users 20* detected in the proximate vicinity of the computing device 10* has primary control of the computing device 10*.

As also illustrated in FIG. 6f, the access providing operation 404 of FIG. 4 may include in various implementations an operation 672 for presenting, via the computing device, the one or more items in one or more formats that allow one or more functionalities of the one or more items to be available for execution, the one or more formats of the one or more items to be presented being in response, at least in part, to said determining. For instance, the functional format presenting module 254 (see FIG. 3d) of the computing device 10* presenting, via the computing device 10*, the one or more items (e.g., email applications) in one or more formats that allow one or more functionalities (e.g., send or transmit, save, and so forth) of the one or more items to be available for execution, the one or more formats of the one or more items to be presented being in response, at least in part, to said determining which of the plurality of users 20* detected in the proximate vicinity of the computing device 10* has primary control of the computing device 10*.

In some implementations, operation 672 may further include an operation 673 for presenting, via the computing device, the one or more items in one or more formats that allow one or more selective functionalities from a plurality of functionalities available through the one or more items to be available for execution while not making available for execution one or more other functionalities from the plurality of functionalities, the one or more formats of the one or more items to be presented being in response, at least in part, to said determining. For instance, the functional format presenting module 254 (see FIG. 3d) of the computing device 10* presenting, via the computing device 10*, the one or more items (e.g., email applications) in one or more formats that allow one or more selective functionalities (e.g., open an email) from a plurality of functionalities available through the one or more items to be available for execution while not making available for execution one or more other functionalities (e.g., sending an email) from the plurality of functionalities, the one or more formats of the one or more items to be presented being in response, at least in part, to said determining.

As further illustrated in FIG. 6f, in some alternative implementations, operation 672 may include an operation 674 for presenting, via the computing device, the one or more items in one or more formats that allow all functionalities available through the one or more items to be available for execution, the one or more formats of the one or more items to be presented being in response, at least in part, to said determining. For instance, the functional format presenting module 254 (see FIG. 3d) of the computing device 10* presenting, via the computing device 10*, the one or more items (e.g., word processing application) in one or more formats that allow all functionalities available through the one or more items (e.g., all functionalities of the word processing application) to be available for execution, the one or more formats of the one or more items to be presented being in response, at least in part, to said determining.

Figure 6G:
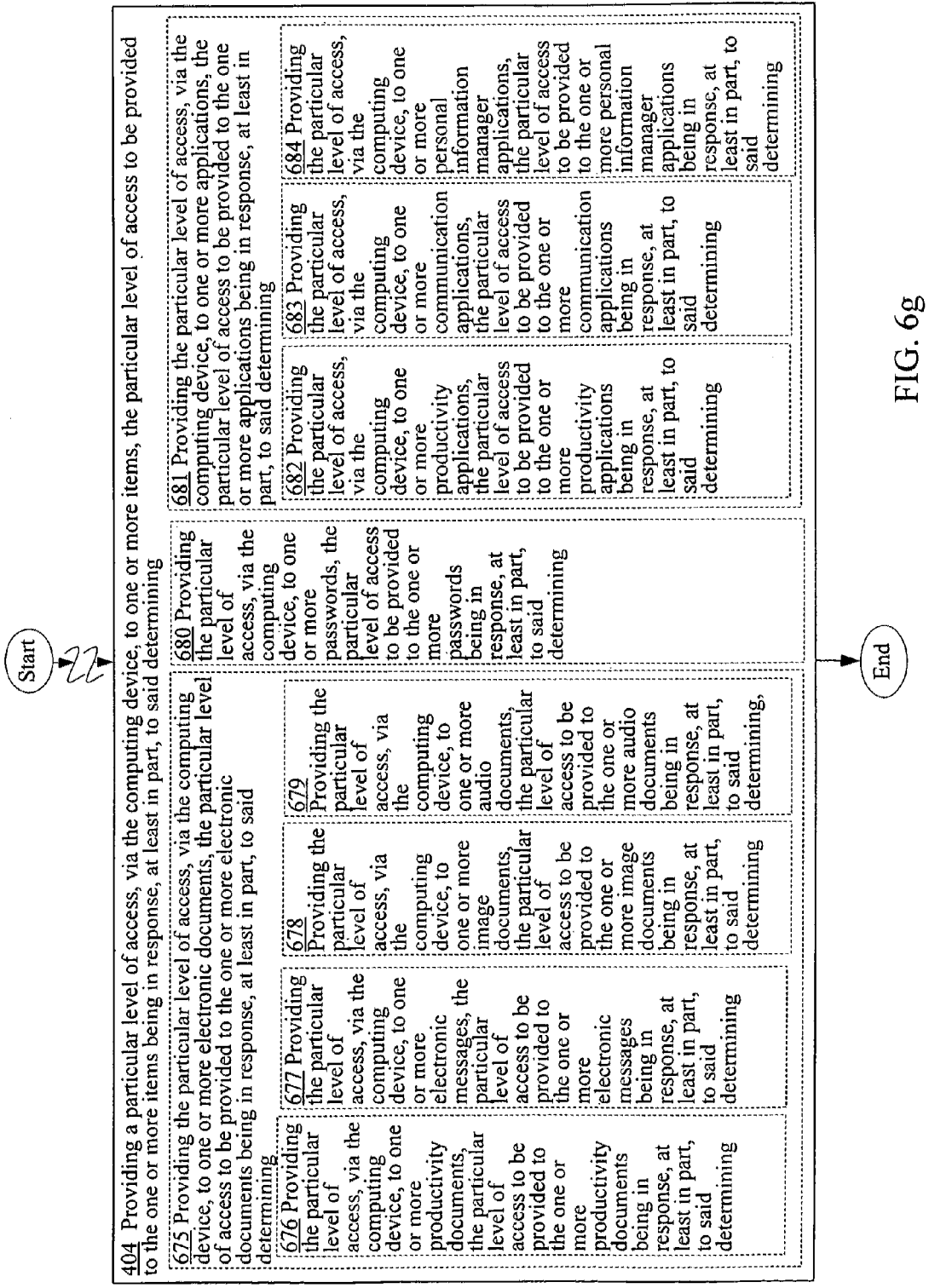
FIG. 6g is a high-level logic flowchart of a process depicting alternate implementations of the access providing operation 404 of FIG. 4.

Turning now to FIG. 6g, in various implementations, the access providing operation 404 of FIG. 4 may include an operation 675 for providing the particular level of access, via the computing device, to one or more electronic documents, the particular level of access to be provided to the one or more electronic documents being in response, at least in part, to said determining. For instance, the access providing module 104* of the computing device 10* providing the particular level of access, via the computing device 10*, to one or more electronic documents (e.g., textual documents, image files, audio files, video files, and so forth), the particular level of access to be provided to the one or more electronic documents being in response, at least in part, to said determining which of the plurality of users 20* detected in the proximate vicinity of the computing device 10* has primary control of the computing device 10*.

As further illustrated in FIG. 6g, in some implementations operation 675 may further include an operation 676 for providing the particular level of access, via the computing device, to one or more productivity documents, the particular level of access to be provided to the one or more productivity documents being in response, at least in part, to said determining. For instance, the access providing module 104* of the computing device 10* providing the particular level of access, via the computing device 10*, to one or more productivity documents (e.g., word processing documents, spreadsheet documents, presentation documents, and so forth), the particular level of access to be provided to the one or more productivity documents being in response, at least in part, to said determining.

In the same or different implementations, operation 675 may include an operation 677 for providing the particular level of access, via the computing device, to one or more electronic messages, the particular level of access to be provided to the one or more electronic messages being in response, at least in part, to said determining. For instance, the access providing module 104* of the computing device 10* providing the particular level of access, via the computing device 10*, to one or more electronic messages (e.g., email messages, voice messages, IM messages, and so forth), the particular level of access to be provided to the one or more electronic messages being in response, at least in part, to said determining.

In the same or different implementations, operation 675 may include an operation 678 for providing the particular level of access, via the computing device, to one or more image documents, the particular level of access to be provided to the one or more image documents being in response, at least in part, to said determining. For instance, the access providing module 104* of the computing device 10* providing the particular level of access, via the computing device 10*, to one or more image documents (e.g., digital photos, video files, and so forth), the particular level of access to be provided to the one or more image documents being in response, at least in part, to said determining.

In the same or different implementations, operation 675 may include an operation 679 for providing the particular level of access, via the computing device, to one or more audio documents, the particular level of access to be provided to the one or more audio documents being in response, at least in part, to said determining. For instance, the access providing module 104* of the computing device 10* providing the particular level of access, via the computing device 10*, to one or more audio documents (e.g., audio recordings, voice messages, and so forth), the particular level of access to be provided to the one or more audio documents being in response, at least in part, to said determining.

In some instances, the access providing operation 404 may include an operation 680 for providing the particular level of access, via the computing device, to one or more passwords, the particular level of access to be provided to the one or more passwords being in response, at least in part, to said determining. For instance, the access providing module 104* of the computing device 10* providing the particular level of access, via the computing device 10*, to one or more passwords (e.g., passwords to open a document or use an application), the particular level of access to be provided to the one or more passwords being in response, at least in part, to said determining.

In some implementations, the access providing operation 404 may include an operation 681 for providing the particular level of access, via the computing device, to one or more applications, the particular level of access to be provided to the one or more applications being in response, at least in part, to said determining. For instance, the access providing module 104* of the computing device 10* providing the particular level of access, via the computing device 10*, to one or more applications (e.g., software applications), the particular level of access to be provided to the one or more applications being in response, at least in part, to said determining.

In various implementations, operation 681 may include one or more additional operations including, for example, an operation 682 for providing the particular level of access, via the computing device, to one or more productivity applications, the particular level of access to be provided to the one or more productivity applications being in response, at least in part, to said determining. For instance, the access providing module 104* of the computing device 10* providing the particular level of access, via the computing device 10*, to one or more productivity applications (e.g., word processing applications, spreadsheet applications, graphics applications, presentation applications, and so forth), the particular level of access to be provided to the one or more productivity applications being in response, at least in part, to said determining.

In the same or different implementations, operation 681 may additionally or alternatively include an operation 683 for providing the particular level of access, via the computing device, to one or more communication applications, the particular level of access to be provided to the one or more communication applications being in response, at least in part, to said determining. For instance, the access providing module 104* of the computing device 10* providing the particular level of access, via the computing device 10*, to one or more communication applications (e.g., email application, text messaging application, instant messaging or IM application, and so forth), the particular level of access to be provided to the one or more communication applications being in response, at least in part, to said determining.

In the same or different implementations, operation 681 may additionally or alternatively include an operation 684 for providing the particular level of access, via the computing device, to one or more personal information manager applications, the particular level of access to be provided to the one or more personal information manager applications being in response, at least in part, to said determining. For instance, the access providing module 104* of the computing device 10* providing the particular level of access, via the computing device 10*, to one or more personal information manager applications, the particular level of access to be provided to the one or more personal information manager applications being in response, at least in part, to said determining.

Figure 6H:
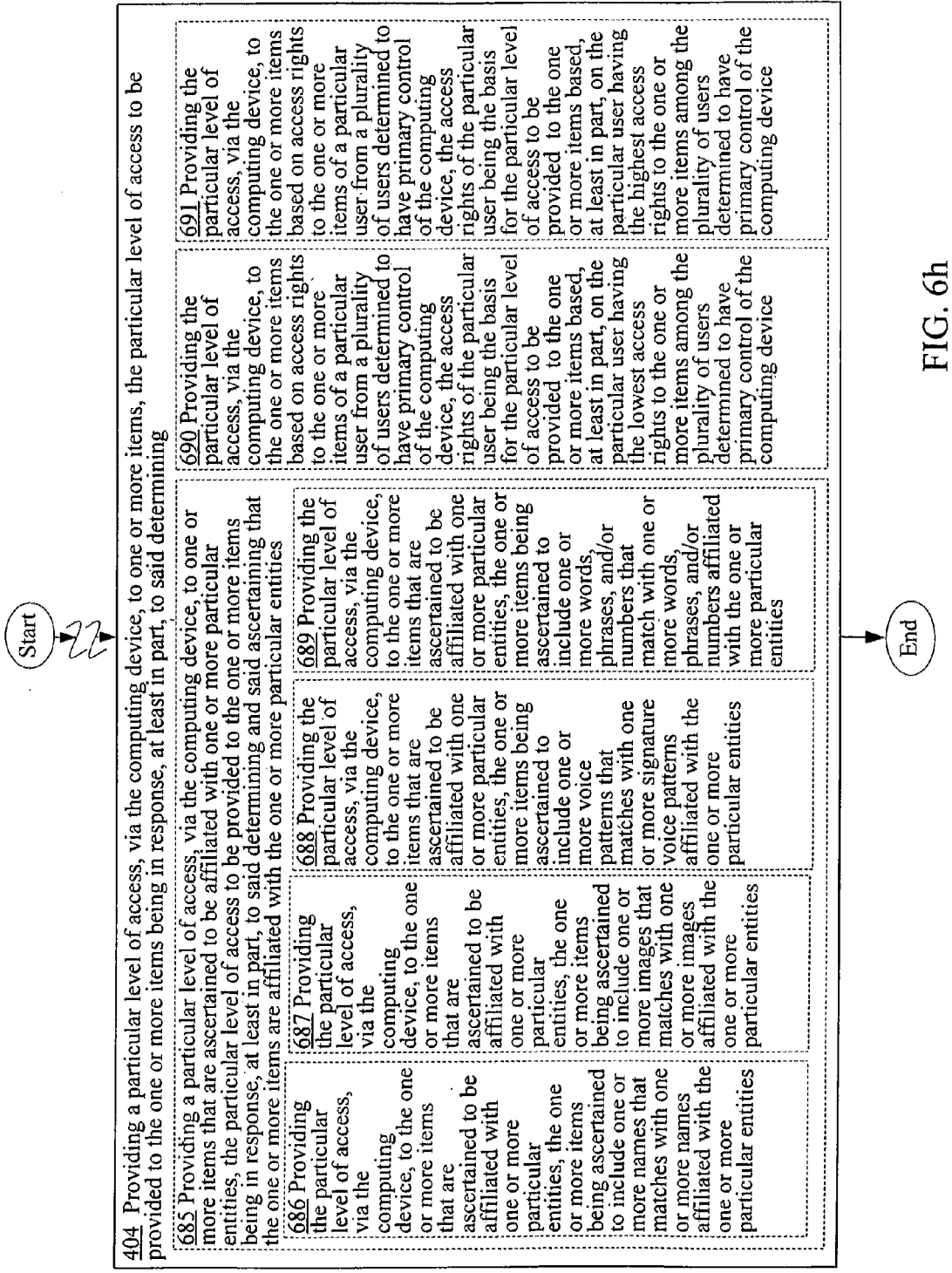
FIG. 6h is a high-level logic flowchart of a process depicting alternate implementations of the access providing operation 404 of FIG. 4.

Turning now to FIG. 6h, in various implementations, the access providing operation 404 of FIG. 4 may include an operation 685 for providing a particular level of access, via the computing device, to one or more items that are ascertained to be affiliated with one or more particular entities, the particular level of access to be provided to the one or more items being in response, at least in part, to said determining and said ascertaining that the one or more items are affiliated with the one or more particular entities. For instance, the access providing module 104* including the entity affiliation ascertaining module 256 (see FIG. 3d) of the computing device 10* providing a particular level of access, via the computing device 10*, to one or more items that are ascertained by the entity affiliation ascertaining module 256 to be affiliated with one or more particular entities (e.g., third parties), the particular level of access to be provided to the one or more items being in response, at least in part, to said determining and said ascertaining that the one or more items are affiliated with the one or more particular entities.

As further illustrated in FIG. 6h, operation 685 may include one or more additional operations in various alternative implementations. For example, in some implementations, operation 685 may include an operation 686 for providing the particular level of access, via the computing device, to the one or more items that are ascertained to be affiliated with one or more particular entities, the one or more items being ascertained to include one or more names that matches with one or more names affiliated with the one or more particular entities. For instance, the access providing module 104* including the entity affiliation ascertaining module 256 of the computing device 10* providing the particular level of access, via the computing device 10*, to the one or more items that are ascertained by the entity affiliation ascertaining module 256 to be affiliated with one or more particular entities, the one or more items being ascertained to include one or more names that matches with one or more names (e.g., usernames, legal names, business names, and so forth) affiliated with the one or more particular entities.

In the same or different implementations, operation 685 may additionally or alternatively include an operation 687 for providing the particular level of access, via the computing device, to the one or more items that are ascertained to be affiliated with one or more particular entities, the one or more items being ascertained to include one or more images that matches with one or more images affiliated with the one or more particular entities. For instance, the access providing module 104* including the entity affiliation ascertaining module 256 of the computing device 10* providing the particular level of access, via the computing device 10*, to the one or more items that are ascertained by the entity affiliation ascertaining module 256 to be affiliated with one or more particular entities, the one or more items (e.g., digital photographs) being ascertained to include one or more images (e.g., facial images) that matches with one or more images affiliated with the one or more particular entities.

In the same or different implementations, operation 685 may additionally or alternatively include an operation 688 for providing the particular level of access, via the computing device, to the one or more items that are ascertained to be affiliated with one or more particular entities, the one or more items being ascertained to include one or more voice patterns that matches with one or more signature voice patterns affiliated with the one or more particular entities. For instance, the access providing module 104* including the entity affiliation ascertaining module 256 of the computing device 10* providing the particular level of access, via the computing device 10*, to the one or more items (e.g. audio recordings or voice messages) that are ascertained by entity affiliation ascertaining module 256 to be affiliated with one or more particular entities, the one or more items being ascertained to include one or more voice patterns that matches with one or more signature voice patterns affiliated with the one or more particular entities.

In the same or different implementations, operation 685 may additionally or alternatively include an operation 689 for providing the particular level of access, via the computing device, to the one or more items that are ascertained to be affiliated with one or more particular entities, the one or more items being ascertained to include one or more words, phrases, and/or numbers that match with one or more words, phrases, and/or numbers affiliated with the one or more particular entities. For instance, the access providing module 104* including the entity affiliation ascertaining module 256 of the computing device 10* providing the particular level of access, via the computing device 10*, to the one or more items (e.g., word processing documents) that are ascertained by the entity affiliation ascertaining module 256 to be affiliated with one or more particular entities, the one or more items being ascertained to include one or more words, phrases, and/or numbers that match with one or more words, phrases, and/or numbers affiliated with the one or more particular entities.

In some instances, the access providing operation 404 of FIG. 4 may additionally or alternatively include an operation 690 for providing the particular level of access, via the computing device, to the one or more items based on access rights to the one or more items of a particular user from a plurality of users determined to have primary control of the computing device, the access rights of the particular user being the basis for the particular level of access to be provided to the one or more items based, at least in part, on the particular user having the lowest access rights to the one or more items among the plurality of users determined to have primary control of the computing device. For instance, the access providing module 104\* of the computing device 10\* providing the particular level of access, via the computing device, to the one or more items based on access rights to the one or more items of a particular user from a plurality of users (e.g., users 20s and 20t of FIG. 2d) determined by the primary control determining module 102\* to have primary control of the computing device 10\*, the access rights of the particular user 20\* being the basis for the particular level of access to be provided to the one or more items based, at least in part, on the particular user 20\* having the lowest access rights to the one or more items among the plurality of users 20\* determined to have primary control of the computing device 10\*.

In other alternative implementations, however, the access providing operation 404 of FIG. 4 may include an operation 691 for providing the particular level of access, via the computing device, to the one or more items based on access rights to the one or more items of a particular user from a plurality of users determined to have primary control of the computing device, the access rights of the particular user being the basis for the particular level of access to be provided to the one or more items based, at least in part, on the particular user having the highest access rights to the one or more items among the plurality of users determined to have primary control of the computing device. For instance, the access providing module 104\* of the computing device 10\* providing the particular level of access, via the computing device, to the one or more items based on access rights to the one or more items of a particular user from a plurality of users (e.g., users 20s and 20t of FIG. 2d) determined by the primary control determining module 102\* to have primary control of the computing device 20\*, the access rights of the particular user 20\* being the basis for the particular level of access to be provided to the one or more items based, at least in part, on the particular user 20\* having the highest access rights to the one or more items among the plurality of users 20\* determined to have primary control of the computing device 10\*.

Figure 7:
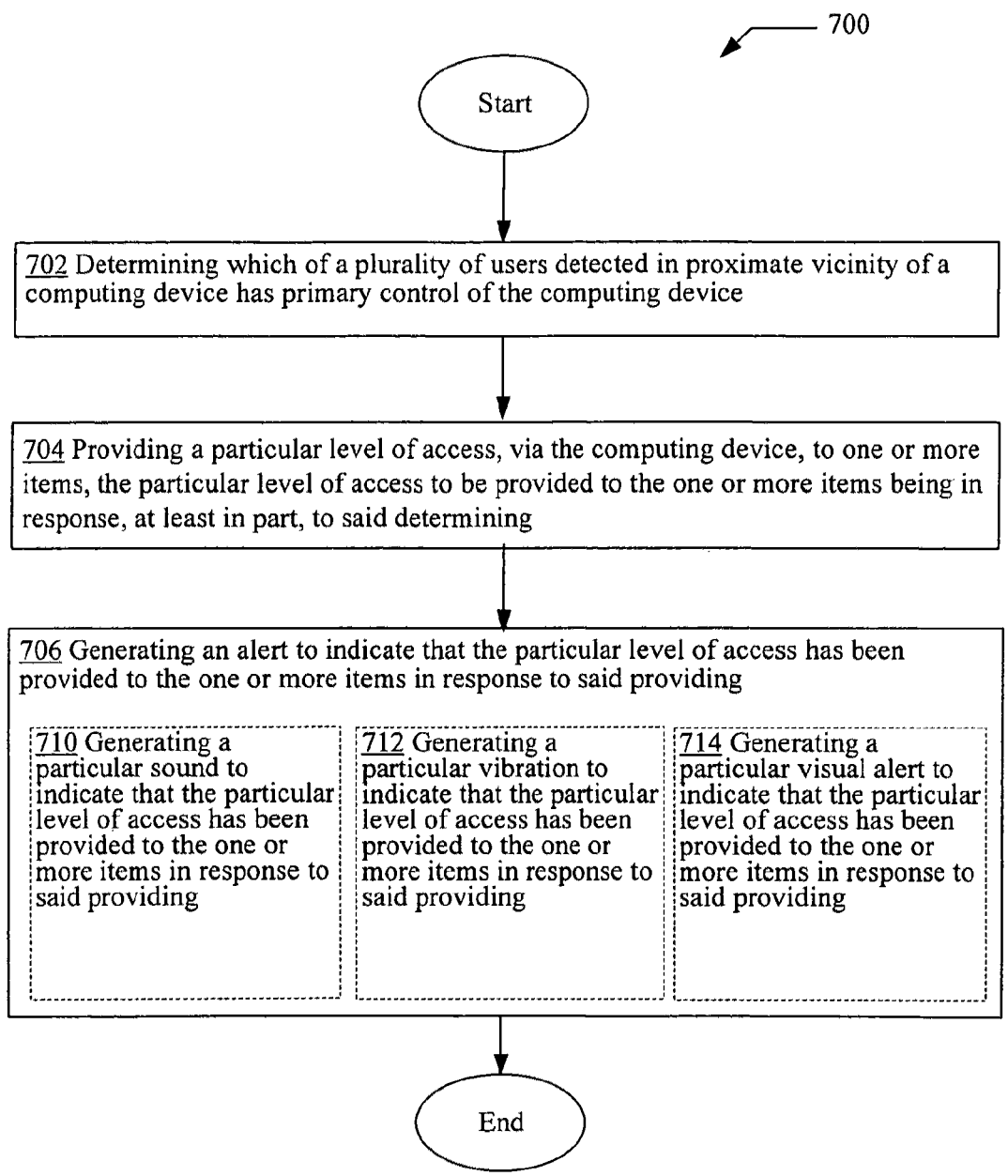
FIG. 7 is another high-level logic flowchart of another process.

Turning now to FIG. 7 illustrating another operational flow 700. Operational flow 700 includes certain operations that mirror the operations included in operational flow 400 of FIG. 4. These operations include a primary control determining operation 702 and an access providing operation 704 that corresponds to and mirror the primary control determining operation 402 and the access providing operation 404, respectively, of FIG. 4.

In addition, operational flow 700 may include an alert generating operation 706 for generating an alert to indicate that the particular level of access has been provided to the one or more items in response to said providing. For instance, the alert generating module 106\* of the computing device 10\* (e.g., the computing device 10' of FIG. 3a or the computing device 10" of FIG. 3b) generating an alert (e.g., a visual and/or audio alert), via user interface 110 (e.g., a display screen, a speaker, and/or vibration generator), to indicate that the particular level of access has been provided to the one or more items in response to said providing. By providing such an alert, users may be alerted that the computing device 10\* has been reconfigured as a result of detecting change in primary control of the computing device 10\*.

As further illustrated in FIG. 7, in some cases operation 706 may include one or more additional operations including, for example, an operation 710 for generating a particular sound to indicate that the particular level of access has been provided to the one or more items in response to said providing. For instance, the sound generating module 280 (see FIG. 3f) of the computing device 10 generating (e.g., via user interface 110, which may include one or more speakers) a particular sound to indicate that the particular level of access has been provided to the one or more items in response to providing the particular level of access to the one or more items.

In the same or different implementations, the alert generating operation 706 may include an operation 712 for generating a particular vibration to indicate that the particular level of access has been provided to the one or more items in response to said providing. For instance, the vibration generating module 282 (see FIG. 3f) of the computing device 10\* generating (via the user interface 110, which may include a vibration generator in the form of, for example, a miniature motor) a particular vibration to indicate that the particular level of access has been provided to the one or more items in response to providing the particular level of access to the one or more items.

In the same or different implementations, the alert generating operation 706 may include an operation 714 for generating a particular visual alert to indicate that the particular level of access has been provided to the one or more items in response to said providing. For instance, the visual alert generating module 284 (see FIG. 3f) of the computing device 10\* generating (e.g., via the user interface 110, which may include a display monitor such as a touch screen) a particular visual alert to indicate that the particular level of access has been provided to the one or more items in response to providing the particular level of access to the one or more items.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware in one or more machines or articles of manufacture), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation that is implemented in one or more machines or articles of manufacture; or, yet again alternatively, the implementer may opt for some combination of hardware, software, and/or firmware in one or more machines or articles of manufacture. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware_in one or more machines or articles of manufacture.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A system, comprising:
(a) a primary control determining module, including one or more hardware processing devices, configured to determine which of a plurality of users in proximate vicinity of a computing device has primary control of the computing device, wherein the primary control determining module includes at least:
(i) the primary control determining module configured to determine automatically which of the plurality of users detected in the proximate vicinity of the computing device has primary control of the computing device, wherein the primary control determining module configured to determine automatically which of the plurality of users detected in the proximate vicinity of the computing device has primary control of the computing device includes at least:
(A) the primary control determining module including a user relinquishment detecting module, including the at least one or more hardware processing devices, configured to determine automatically which of the plurality of users detected in the proximate vicinity of the computing device has primary control of the computing device in response to the user relinquishment detecting module detecting that a user has relinquished primary control of the computing device including at least:
(1) the user relinquishment detecting module for determining automatically which of the plurality of users detected in the proximate vicinity of the computing device has primary control of the computing device in response to detecting that a user has relinquished primary control of the computing device, the user relinquishment detecting module being configured for detecting that a user has relinquished primary control of the computing device based at least in part on one or more movements of the computing device, one or more visual cues, and/or one or more audio cues that when detected allow an inference of a transfer of the computing device from the user; and
(b) an access providing module, including the one or more hardware processing devices, configured to provide a particular level of access to one or more items via the computing device, the access providing module being responsive at least in part to the primary control determining module configured to determine which of a plurality of users in proximate vicinity of a computing device has primary control of the computing device.

2. An article of manufacture, comprising:
a non-transitory medium bearing:
(a) one or more instructions for determining which of a plurality of users detected in proximate vicinity of a computing device has primary control of the computing device, the one or more instructions for determining including at least:
(i) one or more instructions for determining automatically which of the plurality of users detected in the proximate vicinity of the computing device has primary control of the computing device, the one or more instructions for determining automatically including at least:
(A) one or more instructions for determining automatically which of the plurality of users detected in the proximate vicinity of the computing device has primary control of the computing device in response to detecting that a user has relinquished primary control of the computing device; including at least:
(1) one or more instructions for determining automatically which of the plurality of users detected in the proximate vicinity of the computing device has primary control of the computing device in response to detecting that a user has relinquished primary control of the computing device, the detecting that a user has relinquished primary control of the computing device being based at least in part on one or more movements of the computing device, one or more visual cues, and/or one or more audio cues that when detected allow an inference of a transfer of the computing device from the user; and
(b) one or more instructions for providing a particular level of access, via the computing device, to one or more items, the one or more instructions for providing a particular level of access being responsive, at least in part, to said one or more instructions for determining which of a plurality of users detected in proximate vicinity of a computing device has primary control of the computing device.

3. The article of manufacture of claim 2, wherein said one or more instructions for determining automatically which of the plurality of users detected in the proximate vicinity of the computing device has primary control of the computing device comprises:

one or more instructions for determining automatically which of the plurality of users detected in the proximate vicinity of the computing device has primary control of the computing device in response to detecting presence of the plurality of users in the proximate vicinity of the computing device.

4. The article of manufacture of claim 2, wherein said one or more instructions for determining which of a plurality of users detected in proximate vicinity of a computing device has primary control of the computing device comprises:
one or more instructions for detecting the plurality of users being in the proximate vicinity of the computing device based, at least in part, on data provided by one or more sensors.

5. The article of manufacture of claim 4, wherein said one or more instructions for detecting the plurality of users being in the proximate vicinity of the computing device based, at least in part, on data provided by one or more sensors comprises:
one or more instructions for detecting the plurality of users being in the proximate vicinity of the computing device based, at least in part, on data provided by one or more movement sensors.

6. The article of manufacture of claim 4, wherein said one or more instructions for detecting the plurality of users being in the proximate vicinity of the computing device based, at least in part, on data provided by one or more sensors comprises:
one or more instructions for detecting the plurality of users being in the proximate vicinity of the computing device based, at least in part, on data provided by one or more visual sensors.

7. The article of manufacture of claim 4, wherein said one or more instructions for detecting the plurality of users being in the proximate vicinity of the computing device based, at least in part, on data provided by one or more sensors comprises:
one or more instructions for detecting the plurality of users being within a distance from the computing device from which a user can be at least visually detected using the one or more sensors included with the computing device.

8. The article of manufacture of claim 4, wherein said one or more instructions for detecting the plurality of users being in the proximate vicinity of the computing device based, at least in part, on data provided by one or more sensors comprises:
one or more instructions for detecting the plurality of users being within a distance from the computing device from which a user can at least be audibly detected using the one or more sensors included with the computing device.

9. The article of manufacture of claim 4, wherein said one or more instructions for detecting the plurality of users being in the proximate vicinity of the computing device based, at least in part, on data provided by one or more sensors comprises:
one or more instructions for detecting the plurality of users being in the proximate vicinity of the computing device by detecting presence of all users who are within a predefined distance from the computing device.

10. The article of manufacture of claim 2, wherein said one or more instructions for determining which of a plurality of users detected in proximate vicinity of a computing device has primary control of the computing device comprises:
one or more instructions for detecting spatial locations of the plurality of users with respect to the computing device.

11. The article of manufacture of claim 10, wherein said one or more instructions for detecting spatial locations of the plurality of users with respect to the computing device comprises:
one or more instructions for detecting which of the plurality of users is or are spatially nearest to the computing device.

12. The article of manufacture of claim 11, wherein said one or more instructions for detecting which of the plurality of users is or are spatially nearest to the computing device comprises:
one or more instructions for detecting visually which of the plurality of users is or are spatially nearest to the computing device.

13. The article of manufacture of claim 12, wherein said one or more instructions for detecting visually which of the plurality of users is or are spatially nearest to the computing device comprises:
one or more instructions for detecting visually that one or more particular detected faces from a plurality of detected faces belonging to the plurality of users detected in the proximate vicinity of the computing device as being visually nearest to the computing device.

14. The article of manufacture of claim 11, wherein said one or more instructions for detecting which of the plurality of users is or are spatially nearest to the computing device comprises:
one or more instructions for detecting audibly which of the plurality of users is or are audibly nearest to the computing device.

15. The article of manufacture of claim 14, wherein said one or more instructions for detecting audibly which of the plurality of users is or are audibly nearest to the computing device comprises:
one or more instructions for detecting audibly that one or more particular detected voices from a plurality of detected voices associated with the plurality of users detected in the proximate vicinity of the computing device as being audibly nearest to the computing device.

16. The article of manufacture of claim 10, wherein said one or more instructions for detecting spatial locations of the plurality of users with respect to the computing device comprises:
one or more instructions for detecting spatial locations of the plurality of the users relative to specific orientation of the computing device, the computing device having at least a first side and a second side opposite of the first side, the first side having at least a display screen.

17. The article of manufacture of claim 16, wherein said one or more instructions for detecting spatial locations of the plurality of the users relative to specific orientation of the computing device, the computing device having at least a first side and a second side opposite of the first side, the first side having at least a display screen comprises:
one or more instructions for detecting which of the plurality of users is or are spatially located principally on the side of the first side of the computing device.

18. The article of manufacture of claim 17, wherein said one or more instructions for detecting which of the plurality of users is or are spatially located principally on the side of the first side of the computing device comprises:
one or more instructions for detecting which of the users is spatially located centered on the first side or spatially centered closest to center of the first side.

19. The article of manufacture of claim 18, wherein said one or more instructions for detecting which of the users is spatially located centered on the first side or spatially centered closest to center of the first side comprises:

one or more instructions for detecting an eye or a pair of eyes that are centered or nearest to center of the first side of the computing device, the eye or the pair of eyes that are detected belonging to one of the plurality of users.

20. The article of manufacture of claim 18, wherein said one or more instructions for detecting which of the users is spatially located centered on the first side or spatially centered closest to center of the first side comprises:

one or more instructions for detecting a face that is centered or nearest to center of the first side of the computing device, the face that is detected belonging to one of the plurality of users.

21. The article of manufacture of claim 2, wherein said one or more instructions for determining which of a plurality of users detected in proximate vicinity of a computing device has primary control of the computing device comprises:

one or more instructions for detecting that the computing device is exhibiting one or more movements that at least substantially matches with one or more signature movements of a particular user from the plurality of users detected in the proximate vicinity of the computing device.

22. The article of manufacture of claim 2, wherein said one or more instructions for determining which of a plurality of users detected in proximate vicinity of a computing device has primary control of the computing device comprises:

one or more instructions for detecting that the computing device is exhibiting one or more movements that although is determined to be associated with a human does not match with signature movements of one or more primary users of the computing device, the one or more primary users having greater access rights to the computing device than one or more secondary users of the computing device.

23. The article of manufacture of claim 2, wherein said one or more instructions for providing a particular level of access, via the computing device, to one or more items, the one or more instructions for providing a particular level of access being responsive, at least in part, to said one or more instructions for determining which of a plurality of users detected in proximate vicinity of a computing device has primary control of the computing device comprises:

one or more instructions for providing a first level of access, via the computing device, to the one or more items, the first level of access to be provided to the one or more items being in response, at least in part, to said determining, and the first level of access to the one or more items being a lower level of access to the one or more items than a second level of access to the one or more items that was provided at least immediately prior to said determining.

24. The article of manufacture of claim 2, wherein said one or more instructions for providing a particular level of access, via the computing device, to one or more items, the one or more instructions for providing a particular level of access being responsive, at least in part, to said one or more instructions for determining which of a plurality of users detected in proximate vicinity of a computing device has primary control of the computing device comprises:

one or more instructions for providing a first level of access, via the computing device, to the one or more items, the first level of access to be provided to the one or more items being in response, at least in part, to said determining, and the first level of access to the one or more items being a higher level of access to the one or more items than a second level of access to the one or more items that was provided at least immediately prior to said determining.

25. The article of manufacture of claim 2, wherein said one or more instructions for providing a particular level of access, via the computing device, to one or more items, the one or more instructions for providing a particular level of access being responsive, at least in part, to said one or more instructions for determining which of a plurality of users detected in proximate vicinity of a computing device has primary control of the computing device comprises:

one or more instructions for providing a particular level of viewing access, via the computing device, to the one or more items, the particular level of viewing access to be provided to the one or more items being in response, at least in part, to said determining.

26. The article of manufacture of claim 25, wherein said one or more instructions for providing a particular level of viewing access, via the computing device, to the one or more items, the particular level of viewing access to be provided to the one or more items being in response, at least in part, to said determining comprises:

one or more instructions for providing at least limited viewing access, via a user interface, to the one or more items, the at least limited viewing access to be provided to the one or more items being in response, at least in part, to said determining.

27. The article of manufacture of claim 26, wherein said one or more instructions for providing at least limited viewing access, via a user interface, to the one or more items, the at least limited viewing access to be provided to the one or more items being in response, at least in part, to said determining comprises:

one or more instructions for hiding visually, via the user interface, at least one or more visual representations of the one or more items, the hiding visually of the at least one or more visual representations of the one or more items being in response, at least in part, to said determining.

28. The article of manufacture of claim 27, wherein said one or more instructions for hiding visually, via the user interface, at least one or more visual representations of the one or more items, the hiding visually of the at least one or more visual representations of the one or more items being in response, at least in part, to said determining comprises:

one or more instructions for replacing visually, via the user interface, at least one or more visual representations of the one or more items with one or more obfuscating locum tenentes, the replacing visually of the at least one or more visual representations with the obfuscating locum tenentes being in response, at least in part, to said determining.

29. The article of manufacture of claim 25, wherein said one or more instructions for providing a particular level of viewing access, via the computing device, to the one or more items, the particular level of viewing access to be provided to the one or more items being in response, at least in part, to said determining comprises:

one or more instructions for providing at least greater viewing access, via a user interface, to the one or more items, the at least greater viewing access to be provided to the one or more items being in response, at least in part, to said determining.

30. The article of manufacture of claim 29, wherein said one or more instructions for providing at least greater viewing access, via a user interface, to the one or more items, the at least greater viewing access to be provided to the one or more items being in response, at least in part, to said determining comprises:

one or more instructions for providing visually, via the user interface, at least one or more visual representations of the one or more items, the providing visually of the one or more visual representations being in response, at least in part, to said determining.

31. The article of manufacture of claim 30, wherein said one or more instructions for providing visually, via the user interface, at least one or more visual representations of the one or more items, the providing visually of the one or more visual representations being in response, at least in part, to said determining comprises:

one or more instructions for providing visually, via the user interface, one or more of the visual representations of the one or more items, the one or more of the visual representations not being previously provided via the user interface at least immediately prior to said determining.

32. The article of manufacture of claim 31, wherein said one or more instructions for providing visually, via the user interface, one or more of the visual representations of the one or more items, the one or more of the visual representations not being previously provided via the user interface at least immediately prior to said determining comprises:

one or more instructions for replacing visually, via the user interface, one or more obfuscating locum tenentes of the one or more items with the one or more of the visual representations of the one or more items, the one or more obfuscating locum tenentes being available for presentation via the user interface at least immediately prior to said determining.

33. The article of manufacture of claim 2, wherein said one or more instructions for providing a particular level of access, via the computing device, to one or more items, the one or more instructions for providing a particular level of access being responsive, at least in part, to said one or more instructions for determining which of a plurality of users detected in proximate vicinity of a computing device has primary control of the computing device comprises:

one or more instructions for providing a particular level of audio access, via the computing device, to the one or more items, the particular level of audio access to be provided to the one or more items being in response, at least in part, to said determining.

34. The article of manufacture of claim 2, wherein said one or more instructions for providing a particular level of access, via the computing device, to one or more items, the one or more instructions for providing a particular level of access being responsive, at least in part, to said one or more instructions for determining which of a plurality of users detected in proximate vicinity of a computing device has primary control of the computing device comprises:

one or more instructions for presenting, via the computing device, the one or more items in one or more formats that allow one or more editorial actions to be available for execution on one or more parts of the one or more items, the one or more formats of the one or more items to be presented being in response, at least in part, to said determining.

35. The article of manufacture of claim 2, wherein said one or more instructions for providing a particular level of access, via the computing device, to one or more items, the one or more instructions for providing a particular level of access being responsive, at least in part, to said one or more instructions for determining which of a plurality of users detected in proximate vicinity of a computing device has primary control of the computing device comprises:

one or more instructions for presenting, via the computing device, the one or more items in one or more formats that allow one or more functionalities of the one or more items to be available for execution, the one or more formats of the one or more items to be presented being in response, at least in part, to said determining.

36. The article of manufacture of claim 2, wherein said one or more instructions for providing a particular level of access, via the computing device, to one or more items, the one or more instructions for providing a particular level of access being responsive, at least in part, to said one or more instructions for determining which of a plurality of users detected in proximate vicinity of a computing device has primary control of the computing device comprises:

one or more instructions for providing a particular level of access, via the computing device, to one or more items that are ascertained to be affiliated with one or more particular entities, the particular level of access to be provided to the one or more items being in response, at least in part, to said determining and said ascertaining that the one or more items are affiliated with the one or more particular entities.

37. The article of manufacture of claim 36, wherein said one or more instructions for providing a particular level of access, via the computing device, to one or more items that are ascertained to be affiliated with one or more particular entities, the particular level of access to be provided to the one or more items being in response, at least in part, to said determining and said ascertaining that the one or more items are affiliated with the one or more particular entities comprises:

one or more instructions for providing the particular level of access, via the computing device, to the one or more items that are ascertained to be affiliated with one or more particular entities, the one or more items being ascertained to include one or more voice patterns that matches with one or more signature voice patterns affiliated with the one or more particular entities.

38. The article of manufacture of claim 36, wherein said one or more instructions for providing a particular level of access, via the computing device, to one or more items that are ascertained to be affiliated with one or more particular entities, the particular level of access to be provided to the one or more items being in response, at least in part, to said determining and said ascertaining that the one or more items are affiliated with the one or more particular entities comprises:

one or more instructions for providing the particular level of access, via the computing device, to the one or more items that are ascertained to be affiliated with one or more particular entities, the one or more items being ascertained to include one or more words, phrases, and/or numbers that match with one or more words, phrases, and/or numbers affiliated with the one or more particular entities.

39. The article of manufacture of claim 2, wherein said one or more instructions for providing a particular level of access, via the computing device, to one or more items, the one or more instructions for providing a particular level of access being responsive, at least in part, to said one or more instructions for determining which of a plurality of users detected in proximate vicinity of a computing device has primary control of the computing device comprises:

one or more instructions for providing the particular level of access, via the computing device, to the one or more items based on access rights to the one or more items of a particular user from a plurality of users determined to have primary control of the computing device, the access rights of the particular user being the basis for the particular level of access to be provided to the one or more items based, at least in part, on the particular user having the lowest access rights to the one or more items among the plurality of users determined to have primary control of the computing device.

40. The article of manufacture of claim 2, wherein said one or more instructions for providing a particular level of access, via the computing device, to one or more items, the one or more instructions for providing a particular level of access being responsive, at least in part, to said one or more instructions for determining which of a plurality of users detected in proximate vicinity of a computing device has primary control of the computing device comprises:
   one or more instructions for providing the particular level of access, via the computing device, to the one or more items based on access rights to the one or more items of a particular user from a plurality of users determined to have primary control of the computing device, the access rights of the particular user being the basis for the particular level of access to be provided to the one or more items based, at least in part, on the particular user having the highest access rights to the one or more items among the plurality of users determined to have primary control of the computing device.

41. The article of manufacture of claim 2, wherein said non-transitory medium further bearing:
   one or more instructions for generating an alert to indicate that the particular level of access has been provided to the one or more items in response to said providing.

42. The article of manufacture of claim 2, wherein said one or more instructions for determining automatically which of the plurality of users detected in the proximate vicinity of the computing device has primary control of the computing device in response to detecting that a user has relinquished primary control of the computing device comprise:
   one or more instructions for determining automatically which of the plurality of users detected in the proximate vicinity of the computing device has primary control of the computing device in response to detecting that a user has relinquished primary control of the computing device, the detecting that a user has relinquished primary control of the computing device being based at least in part on one or more movements of the computing device.

43. The article of manufacture of claim 42, wherein said one or more instructions for determining automatically which of the plurality of users detected in the proximate vicinity of the computing device has primary control of the computing device in response to detecting that a user has relinquished primary control of the computing device, the detecting that a user has relinquished primary control of the computing device being based at least in part on one or more movements of the computing device comprise:
   one or more instructions for detecting that a user has relinquished primary control of the computing device, the detecting that a user has relinquished primary control of the computing device being based at least in part on one or more movements of the computing device that are sensed at least in part with one or more movement sensors configured to sense the one or more movements of the computing device.

44. The article of manufacture of claim 43, wherein said one or more instructions for detecting that a user has relinquished primary control of the computing device, the detecting that a user has relinquished primary control of the computing device being based at least in part on one or more movements of the computing device that are sensed at least in part with one or more movement sensors configured to sense the one or more movements of the computing device comprises:
   one or more instructions for detecting that a user has relinquished primary control of the computing device, the detecting that a user has relinquished primary control of the computing device being based at least in part on one or more movements of the computing device that are sensed at least in part with one or more accelerometers configured to sense the one or more movements of the computing device.

45. The article of manufacture of claim 2, wherein said one or more instructions for determining automatically which of the plurality of users detected in the proximate vicinity of the computing device has primary control of the computing device comprise:
   one or more instructions for automatically, upon the computing device awakening from an off-state or a sleep mode, detecting presence of one or more users in the proximate vicinity of the computing device.

46. The article of manufacture of claim 45, wherein said one or more instructions for automatically, upon the computing device awakening from an off-state or a sleep mode, detecting presence of one or more users in the proximate vicinity of the computing device comprise:
   one or more instructions for automatically, upon the computing device awakening from an off-state or a sleep mode, activating one or more movement sensors, one or more visual sensors, and/or one or more audio sensors in order to detect presence of one or more users in the proximate vicinity of the computing device.

47. The article of manufacture of claim 2, wherein the one or more movements of the computing device, one or more visual cues, and/or one or more audio cues that when detected allow an inference of a transfer of the computing device from the user comprises:
   the one or more movements of the computing device, one or more visual cues, and/or one or more audio cues signaling a transfer of the computing device from the user.

48. The article of manufacture of claim 2, wherein the one or more movements of the computing device, one or more visual cues, and/or one or more audio cues that when detected allow an inference of a transfer of the computing device from the user comprises:
   the one or more movements of the computing device, one or more visual cues, and/or one or more audio cues constituting or contemporaneous with a transfer of the computing device from the user.

49. The article of manufacture of claim 2, wherein the one or more movements of the computing device, one or more visual cues, and/or one or more audio cues that when detected allow an inference of a transfer of the computing device from the user comprises:
   the one or more movements of the computing device, one or more visual cues, and/or one or more audio cues constituting or contemporaneous with input indicating that a transfer of the computing device from the user has occurred.

* * * * *